(12) United States Patent
Miller et al.

(10) Patent No.: US 11,705,583 B2
(45) Date of Patent: Jul. 18, 2023

(54) BATTERY SEPARATORS WITH IMPROVED CONDUCTANCE, IMPROVED BATTERIES, SYSTEMS, AND RELATED METHODS

(71) Applicant: Daramic, LLC, Charlotte, NC (US)

(72) Inventors: Eric H. Miller, Philpot, KY (US); Nicholas R. Shelton, Owensboro, KY (US); William L. Walter, Owensboro, KY (US)

(73) Assignee: Daramic, LLC, Charlotte, NC (US)

( * ) Notice: Subject to any disclaimer, the term of this patent is extended or adjusted under 35 U.S.C. 154(b) by 0 days.

(21) Appl. No.: 17/697,987

(22) Filed: Mar. 18, 2022

(65) Prior Publication Data
US 2022/0278420 A1 Sep. 1, 2022

Related U.S. Application Data

(62) Division of application No. 16/328,043, filed as application No. PCT/US2017/049820 on Sep. 1, 2017, now Pat. No. 11,316,231.

(Continued)

(51) Int. Cl.
| *H01M 10/06* | (2006.01) |
| *H01M 10/12* | (2006.01) |
| *H01M 50/446* | (2021.01) |
| *H01M 50/489* | (2021.01) |
| *H01M 50/491* | (2021.01) |
| *H01M 50/417* | (2021.01) |
| *H01M 50/449* | (2021.01) |

(52) U.S. Cl.
CPC ........... *H01M 10/12* (2013.01); *H01M 10/06* (2013.01); *H01M 50/417* (2021.01); *H01M 50/446* (2021.01); *H01M 50/489* (2021.01); *H01M 50/491* (2021.01); *H01M 50/449* (2021.01); *H01M 2220/20* (2013.01); *Y02E 60/10* (2013.01); *Y02T 10/70* (2013.01)

(58) Field of Classification Search
CPC .... H01M 10/12; H01M 10/06; H01M 50/489; H01M 50/417; H01M 50/491; H01M 50/446; H01M 50/449; H01M 2220/20
See application file for complete search history.

(56) References Cited

U.S. PATENT DOCUMENTS

| 3,967,978 A | 7/1976 | Honda et al. |
| 2007/0090844 A1 | 4/2007 | Klang |

(Continued)

FOREIGN PATENT DOCUMENTS

JP 2012102199 5/2012

*Primary Examiner* — Jane J Rhee
(74) *Attorney, Agent, or Firm* — Hammer & Associates, P.C.

(57) ABSTRACT

In accordance with at least selected embodiments, the present disclosure or invention is directed to improved battery separators, high conductance separators, improved lead-acid batteries, such as flooded lead-acid batteries, high conductance batteries, improved systems, and/or, improved vehicles including such batteries, and/or methods of manufacture or use of such separators or batteries, and/or combinations thereof. In accordance with at least certain embodiments, the present disclosure or invention is directed to improved lead acid batteries incorporating the improved separators and which exhibit increased conductance. Particular, non-limiting examples may include lead acid battery separators having structure or features designed to improve conductance, lower ER, lower water loss, and the like.

9 Claims, 40 Drawing Sheets

Related U.S. Application Data

(60) Provisional application No. 62/385,576, filed on Sep. 9, 2016, provisional application No. 62/383,076, filed on Sep. 2, 2016.

(56) References Cited

U.S. PATENT DOCUMENTS

| | | |
|---|---|---|
| 2011/0020692 A1 | 1/2011 | Ikemoto et al. |
| 2012/0015229 A1 | 1/2012 | Ohashi et al. |
| 2012/0009418 A1 | 4/2012 | Deiters et al. |
| 2012/0237832 A1 | 9/2012 | Nakagiri et al. |

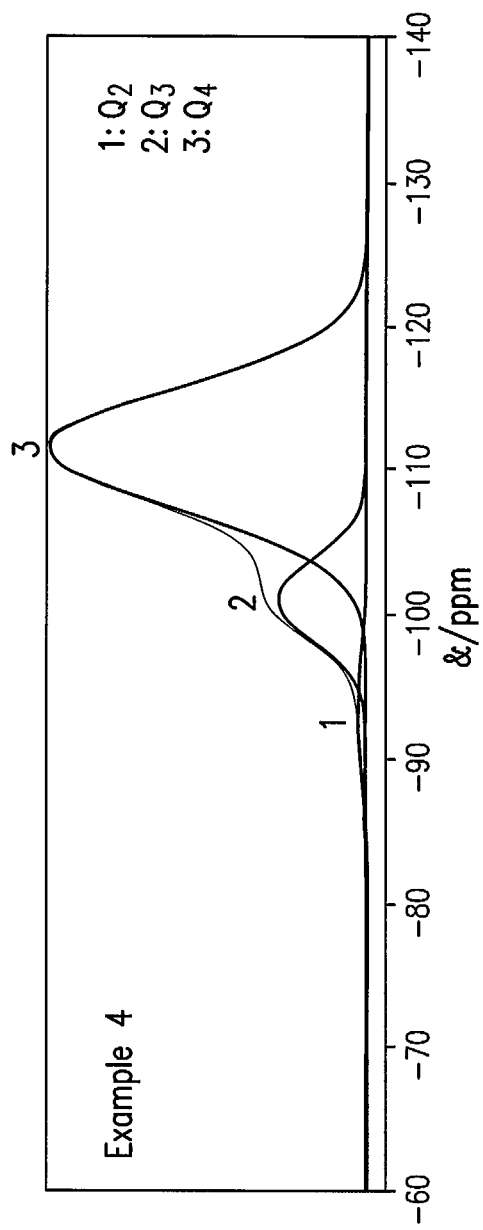
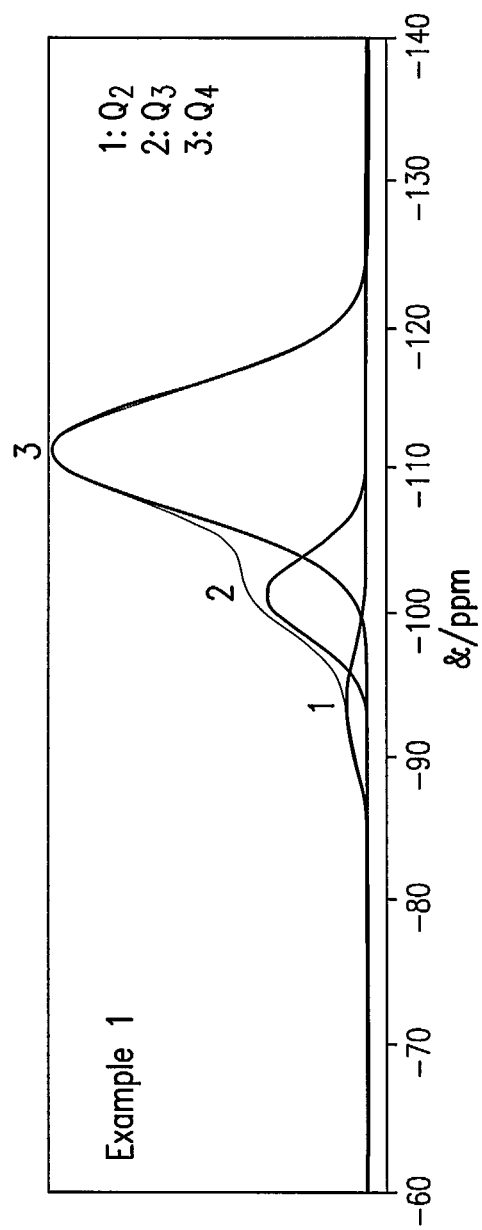
FIG. 24A
FIG. 24B

BATTERY SEPARATORS WITH IMPROVED CONDUCTANCE, IMPROVED BATTERIES, SYSTEMS, AND RELATED METHODS

CROSS REFERENCE TO RELATED APPLICATIONS

This application is a divisional application claiming priority to U.S. application Ser. No. 16,328,043, filed on Feb. 25, 2019; which claims priority to PCT Application No. PCTUS2017049820, filed on Sep. 1, 2017, which claims the benefit of U.S. Provisional Patent App. Nos. 62/383,076 filed on Sep. 2, 2016, and 62/385,576 filed Sep. 9, 2016.

FIELD

In accordance with at least selected embodiments, the present disclosure or invention is directed to improved battery separators, high conductance separators, separators with improved conductance, improved lead-acid batteries, such as flooded lead-acid batteries, high conductance batteries, improved systems, and/or improved vehicles including such batteries, and/or methods of manufacture or use of such separators, systems, or batteries, and/or combinations thereof. In accordance with at least certain embodiments, the present disclosure or invention is directed to improved lead acid batteries incorporating the improved separators and which exhibit increased or acceptable conductance especially when subjected to modern battery performance or battery health testing, and preferably even after a certain period of battery storage or usage (such as cycles, months or years).

In accordance with at least selected embodiments, the present disclosure or invention is directed to novel or improved separators, battery separators, enhanced flooded battery separators, batteries, cells, and/or methods of manufacture and/or use of such separators, battery separators, enhanced flooded battery separators, cells, batteries, systems, methods, and/or vehicles using the same. In accordance with at least certain embodiments, the present disclosure or invention is directed to novel or improved battery separators, flooded lead acid battery separators, or enhanced flooded lead acid battery separators for starting lighting ignition ("SLI") batteries, flooded batteries for deep cycle applications, and enhanced flooded batteries ("EFB") and/or improved methods of making and/or using such improved separators, cells, batteries, systems, vehicles, or any combination thereof. In accordance with at least certain embodiments, the present disclosure or invention is directed to an improved separator for enhanced flooded batteries and/or improved methods of making and/or using such batteries having such improved separators. In accordance with at least selected embodiments, the present disclosure or invention is directed to separators, particularly separators for enhanced flooded batteries having reduced electrical resistance and/or increased cold cranking amps. In addition, disclosed herein are methods, systems, and battery separators for enhancing battery life, reducing water loss, reducing internal resistance, increasing wettability, reducing acid stratification, improving acid diffusion, improving cold cranking amps, improving uniformity, or any combination thereof in at least enhanced flooded batteries. In accordance with at least particular embodiments, the present disclosure or invention is directed to an improved separator for enhanced flooded batteries wherein the separator includes performance enhancing additives or coatings, increased porosity, increased void volume, amorphous silica, higher oil absorption silica, higher silanol group silica, silica with an OH to Si ratio of 21:100 to 35:100, reduced electrical resistance, a shish-kebab structure or morphology, a polyolefin microporous membrane containing particle-like filler in an amount of 40% or more by weight of the membrane and polymer, such as ultrahigh molecular weight polyethylene, having shish-kebab formations with extended chain crystal (shish formation) and folded chain crystal (kebab formation) and the average repetition periodicity of the kebab formation from 1 nm to 150 nm, decreased sheet thickness, decreased tortuosity, and/or the like.

BACKGROUND

A lead acid battery separator is used to separate the battery's positive and negative electrodes or plates in order to prevent an electrical short. Such a battery separator is typically a microporous insulator filled with liquid electrolyte so that acid and ions may pass through the pores thereof. Separators can be fashioned from polyolefins such as polyethylene and polypropylene, wood, paper, rubber, PVC, and fiberglass. In lead/acid storage batteries, such as automotive, industrial and/or deep cycle batteries, the battery separator is typically a microporous polyethylene separator having a backweb and a plurality of ribs standing on one or both sides of the backweb. See: Besenhard, J. O., Editor, Handbook of Battery Materials, Wiley-VCH Verlag GmbH, Weinheim, Germany (1999), Chapter 9, pp. 245-292. The separators for automotive batteries are typically made in continuous lengths and rolled, subsequently folded, and sealed along the edges to form pouches or envelopes that receive the electrodes for the batteries. The separators for industrial (or traction or deep cycle storage) batteries are typically cut to a size about the same as an electrode plate (pieces or leaves).

Separators made from polyolefins like polyethylene typically contain silica filler to facilitate separator wetting with the hydrophilic electrolyte. In some instances, a hydrophilic material, such as a glass mat, is attached to the separator to assist with wetting and to retain active material coated on the positive electrode. However, contact between the membrane and electrode can lead to increased resistance over time.

There remains a need for lead acid batteries that do not suffer substantial conductivity loss over time. There also remains a need for improved battery components, including separators that provide lead-acid batteries that do not exhibit conductivity loss or exhibit a reduced conductivity loss over time.

SUMMARY

In accordance with at least selected embodiments, the present disclosure or invention may address the above issues or needs. In accordance with at least certain objects, the present disclosure or invention may provide an improved separator and/or battery which overcomes the aforementioned problems, for instance by providing enhanced flooded batteries having reduced internal electrical resistance and increased cold cranking amps.

In accordance with at least selected embodiments, the present disclosure or invention may address the above issues or needs and/or may provide novel or improved separators and/or enhanced flooded batteries. In accordance with at least selected embodiments, the present disclosure or invention is directed to improved battery separators, high conductance separators, separators with improved conductance, improved lead-acid batteries, such as flooded lead-acid batteries, high conductance batteries, improved systems, and/or improved vehicles including such batteries, and/or methods of manufacture or use of such separators, systems, or batteries, and/or combinations thereof. In accordance with at least certain embodiments, the present disclosure or invention is directed to improved lead acid batteries incorporating the improved separators and which exhibit increased or acceptable conductance especially when subjected to modern battery performance or battery health testing, and preferably even after a certain period of battery storage or usage (such as cycles, months or years).

In accordance with at least selected embodiments, the present disclosure or invention is directed to novel or improved separators, battery separators, enhanced flooded battery separators, batteries, cells, and/or methods of manufacture and/or use of such separators, battery separators, enhanced flooded battery separators, cells, and/or batteries. In accordance with at least certain embodiments, the present disclosure or invention is directed to novel or improved battery separators, flooded lead acid battery separators, or enhanced flooded battery separators for automobile applications, for idle start stop ("ISS") batteries, for batteries with high power requirements, such as uninterrupted power supply ("UPS") or valve regulated lead acid ("VRLA"), and/or for batteries with high CCA requirements, and/or improved methods of making and/or using such improved separators, cells, batteries, systems, and/or the like. In accordance with at least certain embodiments, the present disclosure or invention is directed to an improved separator for enhanced flooded batteries and/or improved methods of using such batteries having such improved separators. In addition, disclosed herein are methods, systems and battery separators for enhancing battery performance and life, reducing acid stratification, reducing internal electrical resistance, increasing cold cranking amps, and/or improving uniformity in at least enhanced flooded batteries. In accordance with at least particular embodiments, the present disclosure or invention is directed to an improved separator for enhanced flooded batteries wherein the separator includes decreased electrical resistance, performance enhancing additives or coatings, improved fillers, increased porosity, decreased tortuosity, reduced thickness, reduced oil content, increased wettability, increased acid diffusion, and/or the like.

In accordance with at least one embodiment, a microporous separator with decreased tortuosity is provided. Tortuosity refers to the degree of curvature/turns that a pore takes over its length. Thus, a microporous separator with decreased tortuosity will present a shorter path for ions to travel through the separator, thereby decreasing electrical resistance. Microporous separators in accordance with such embodiments can have decreased thickness, increased pore size, more interconnected pores, and/or more open pores.

In accordance with at least certain selected embodiments, a microporous separator with increased porosity, or a separator with a different pore structure whose porosity is not significantly different from a known separator, and/or decreased thickness is provided. An ion will travel more rapidly though a microporous separator with increased porosity, increased void volume, reduced tortuosity, and/or decreased thickness, thereby decreasing electrical resistance. Such decreased thickness may result in decreased overall weight of the battery separator, which in turn decreases the weight of the enhanced flooded battery in which the separator is used, which in turn decreases the weight of the overall vehicle in which the enhanced flooded battery is used. Such decreased thickness may alternatively result in increased space for the positive active material ("PAM") or the negative active material ("NAM") in the enhanced flooded battery in which the separator is used.

In accordance with at least certain selected embodiments, a microporous separator with increased wettability (in water or acid) is provided. The separator with increased wettability will be more accessible to the electrolyte ionic species, thus facilitating their transit across the separator and decreasing electrical resistance.

In accordance with at least one embodiment, a microporous separator with decreased final oil content is provided. Such a microporous separator will also facilitate lowered ER (electrical resistance) in an enhanced flooded battery or system.

The separator may contain improved fillers that have increased friability, and that may increase the porosity, pore size, internal pore surface area, wettability, and/or the surface area of the separator. In some embodiments, the improved fillers have high structural morphology and/or reduced particle size and/or a different amount of silanol groups than previously known fillers and/or are more hydroxylated than previously known fillers. The improved fillers may absorb more oil and/or may permit incorporation of a greater amount of processing oil during separator formation, without concurrent shrinkage or compression when the oil is removed after extrusion. The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (such as polar species, such as metals) that increase the ionic diffusion, and facilitate the flow of electrolyte and ions across the separator. Such also leads to decreased overall electrical resistance as such a separator is used in a flooded battery, such as an enhanced flooded battery.

The microporous separator further comprises a novel and improved pore morphology and/or novel and improved fibril morphology such that the separator contributes to significantly decreasing the electrical resistance in a flooded lead acid battery when such a separator is used in such a flooded lead acid battery. Such improved pore morphology and/or fibril morphology may result in a separator whose pores and/or fibrils approximate a shish-kebab (or shish kabob) type morphology. Another way to describe the novel and improved pore shape and structure is a textured fibril morphology in which silica nodes or nodes of silica are present at the kebab-type formations on the polymer fibrils (the fibrils sometimes called shishes) within the battery separator. Additionally, in certain embodiments, the silica structure and pore structure of a separator according to the present invention may be described as a skeletal structure or a vertebral structure or spinal structure, where silica nodes on the kebabs of polymer, along the fibrils of polymer, appear like vertebrae or disks (the "kebabs"), and sometimes are oriented substantially perpendicularly to, an elongate central spine or fibril (extended chain polymer crystal) that approximates a spinal column-like shape (the "shish").

In some instances, the improved battery comprising the improved separator with the improved pore morphology and/or fibril morphology may exhibit 20% lower, in some instances, 25% lower, in some instances, 30% lower electrical resistance, and in some instances, even more than a 30% drop in electrical resistance ("ER") (which may reduce battery internal resistance) while such a separator retains and maintains a balance of other key, desirable mechanical properties of lead acid battery separators. Further, in certain embodiments, the separators described herein have a novel and/or improved pore shape such that more electrolyte flows through or fills the pores and/or voids as compared to known separators.

In addition, the present disclosure provides improved enhanced flooded lead acid batteries comprising one or more improved battery separators for an enhanced flooded battery, which separator combines for the battery the desirable features of decreased acid stratification, lowered voltage drop (or an increase in voltage drop durability), and increased CCA, in some instances, more than 8%, or more than 9%, or in some embodiments, more than 10%, or more than 15%, increased CCA. Such an improved separator may result in an enhanced flooded battery whose performance matches or even exceeds the performance of an AGM battery. Such low electrical resistance separator may also be treated so as to result in an enhanced flooded lead acid battery having reduced water loss.

The separator may contain one or more performance enhancing additives, such as a surfactant, along with other additives or agents, residual oil, and fillers. Such performance enhancing additives can reduce separator oxidation and/or even further facilitate the transport of ions across the membrane contributing to the overall lowered electrical resistance for the enhanced flooded battery described herein.

The separator for a lead acid battery described herein may comprise a polyolefin microporous membrane, wherein the polyolefin microporous membrane comprises: polymer, such as polyethylene, such as ultrahigh molecular weight polyethylene, particle-like filler, and processing plasticizer (optionally with one or more additional additives or agents). The polyolefin microporous membrane may comprise the particle-like filler in an amount of 40% or more by weight of the membrane. And the ultrahigh molecular weight polyethylene may comprise polymer in a shish-kebab formation comprising a plurality of extended chain crystals (the shish formations) and a plurality of folded chain crystals (the kebab formations), wherein the average repetition or periodicity of the kebab formations is from 1 nm to 150 nm, preferably, from 10 nm to 120 nm, and more preferably, from 20 nm to 100 nm (at least on portions of the rib side of the separator).

The average repetition or periodicity of the kebab formations is calculated in accordance with the following definition:
  The surface of the polyolefin microporous membrane is observed using a scanning electron microscope ("SEM") after being subjected to metal vapor deposition, and then the image of the surface is taken at, for example 30,000 or 50,000-fold magnification at 1.0 kV accelerating voltage.
  In the same visual area of the SEM image, at least three regions where shish-kebab formations are continuously extended in the length of at least 0.5 μm or longer are indicated. Then, the kebab periodicity of each indicated region is calculated.
  The kebab periodicity is specified by Fourier transform of concentration profile (contrast profile) obtained by projecting in the vertical direction to the shish formation of the shish-kebab formation in each indicated region to calculate the average of the repetition periods.
  The images are analyzed using general analysis tools, for example, MATLAB (R2013a).
  Among the spectrum profiles obtained after the Fourier transform, spectrum detected in the short wavelength region is considered as noise. Such noise is mainly caused by deformation of contrast profile. The contrast profiles obtained for separators in accordance with the present invention appear to generate square-like waves (rather than sinusoidal waves). Further, when the contrast profile is a square-like wave, the profile after the Fourier transform becomes a Sine function and therefore generates plural peaks in the short wavelength region besides the main peak indicating the true kebab periodicity. Such peaks in the short wavelength region can be detected as noise.

In some embodiments, the separator for a lead acid battery described herein comprises a filler selected from the group consisting of silica, precipitated silica, fumed silica, and precipitated amorphous silica; wherein the molecular ratio of OH to Si groups within said filler, measured by $^{29}$Si-NMR, is within a range of from 21:100 to 35:100, in some embodiments, 23:100 to 31:100, in some embodiments, 25:100 to 29:100, and in certain preferred embodiments, 27:100 or higher.

Silanol groups change a silica structure from a crystalline structure to an amorphous structure, since the relatively stiff covalent bond network of Si—O has partially disappeared. The amorphous-like silicas such as $Si(-O-Si)_2(-OH)_2$ and $Si(-O-Si)_3(-OH)$ have plenty of distortions, which may function as various oil absorption points. Therefore oil absorbability becomes high when the amount of silanol groups (Si—OH) is increased for the silica. Additionally, the separator described herein may exhibit increased hydrophilicity and/or may have higher void volume and/or may have certain aggregates surrounded by large voids when it comprises a silica comprising a higher amount of silanol groups and/or hydroxyl groups than a silica used with a known lead acid battery separator.

In accordance with at least selected embodiments, aspects or objects, the present disclosure or invention may address the above needs and/or may be directed to improving the membrane-electrode contact and continuity, improving the membrane-electrode interfacial resistance, improving conductivity, providing lead acid batteries that do not suffer substantial conductivity loss over time, providing improved battery components, including separators that provide lead-acid batteries that do not exhibit conductivity loss over time, or combinations thereof.

In accordance with at least certain embodiments, the present disclosure or invention is directed to improved battery separators, high conductance separators, improved lead-acid batteries, such as flooded lead-acid batteries, high conductance batteries, and/or, improved vehicles including such batteries, and/or methods of manufacture or use of such separators or batteries, and/or combinations thereof. In accordance with at least certain selected embodiments, the present disclosure or invention is directed to improved lead acid batteries incorporating the improved separators and which exhibit increased conductance.

In accordance with at least selected embodiments, aspects, or objects, the present disclosure or invention may provide improved battery separators, high conductance separators, improved lead-acid batteries, such as flooded lead-acid batteries, high conductance batteries, and/or, improved vehicles including such batteries, and/or methods of manufacture or use of such separators or batteries, and/or combinations thereof. In accordance with at least certain selected embodiments, aspects, or objects, the present disclosure or invention may provide improved lead acid batteries incorporating the improved separators and which exhibit increased conductance. Particular, non-limiting examples may include lead acid battery separators having topological features designed to improve conductance, low ER membranes, low water loss membranes, and/or the like.

In an exemplary embodiment of the present invention, a separator for a lead acid battery is provided with a microporous membrane having a polyolefin polymer, a particle-like filler, and a processing plasticizer; wherein the particle-like filler is present in an amount of 40% or more by weight; and wherein the polyethylene comprises polymer in a shish-kebab formation having a plurality of extended chain crystals (the shish formations) and a plurality of folded chain crystals (the kebab formations) and wherein the average repetition or periodicity of the kebab formations is from 1 nm to 150 nm, preferably less than 120 nm. Further, the separator has a shelf life estimated static conductance loss as compared to an initial value of less than approximately 9%, less than approximately 8%, less than approximately 7%, less than approximately 6%, and less than approximately 5%. One aspect of the present invention provides that the shelf life estimated static conductance is measured at greater than 30 days of resting at standard conditions.

In certain embodiments, the average repetition or periodicity of the kebab formations is defined by: taking an image of the surface of the polyolefin microporous membrane with a SEM, indicating at least three rectangular regions where the shish-kebab formation is continuously extended in the length of at least 0.5 µm or longer in the same SEM image, and specifying the repetition or periodicity by Fourier Transform of contrast profile projected in the vertical direction to the length direction of the each indicated rectangular region to calculate the average of the repetition periods.

In select embodiments, the filler is selected from the group consisting of silica, precipitated silica, fumed silica, and precipitated amorphous silica; and wherein the molecular ratio of OH to Si groups within the filler, measured by $^{29}$Si-NMR, is within a range of from 21:100 to 35:100, preferably 27:100 or more. In certain aspects of the present invention, silica is present at the kebab formations of polymer.

In certain selected aspects of the present invention, the microporous membrane may be characterized by one of the following: a) an average pore size of no greater than 1 µm; b) an electrical resistance less than 75 mΩ·cm$^2$, or less than 70 mΩ·cm$^2$, or less than 65 mΩ·cm$^2$, or less than 60 mΩ·cm$^2$, or less than 55 mΩ·cm$^2$, or less than 50 mΩ·cm$^2$, or less than 45 mΩ·cm$^2$, or less than 40 mΩ·cm$^2$, or less than 35 mΩ·cm$^2$, or even less; cyan electrical resistance more than 20% less than an electrical resistance of a known separator for a flooded lead acid battery; d) a porosity greater than 50%; e) a final oil content of between about 10-20% by weight, in some embodiments, about 14-20% by weight; and f) ribbing, serrated ribbing, embossed ribbing, and/or negative cross ribs; and combinations thereof.

In other aspects of the present invention, the microporous membrane may be provided with a filler having high structural morphology. The filler may be characterized by a) an average particle size of 5 µm or less; b) a surface area of at least 100 m$^2$/g; c) an oil absorption rate of at least 150 ml/100 mg, or combinations thereof.

The polyolefin polymer microporous membrane may be a polyolefin, polyethylene (such as, for example, ultra-high molecular weight polyethylene), polypropylene, rubber, polyvinyl chloride, phenolic resins, cellulosic, synthetic wood pulp, glass fibers, synthetic fibers, natural rubbers, synthetic rubbers, latex, bisphenol formaldehyde, and combinations thereof.

The microporous membrane may be provided with a filler to polymer weight ratio of 1.5:1 to 6:1. The filler may be precipitated silica. Furthermore, the particle-like silica may be friable to such a degree that after 30 seconds of ultra-sonication, the median silica particle size is approximately 5.2 µm or less. In addition, the particle-like filler may be friable to such a degree that after 60 seconds of ultra-sonication, the median silica particle size is approximately 0.5 µm or less.

In some exemplary embodiments, exemplary embodiments of separators of the present invention may have one or more of the following: a mean pore size of at least approximately 120 nm; a diffusion coefficient of at least approximately 1.6·10-10 at −5° C., and an electrical resistance of approximately 40 mΩ·cm2 or lower; a diffusion coefficient of at least approximately 8.8·10-10 at 30° C., and an electrical resistance of approximately 40 mΩ·cm2 or lower.

In certain embodiments of the present invention, a separator may be provided with one or more of the following: a polyolefin microporous membrane, wherein the polyolefin microporous membrane comprises polyethylene, a particle-like filler, and a processing plasticizer, wherein the particle-like filler is friable to such a degree that after 30 seconds of ultra-sonication, the median silica particle size is approximately 5.2 µm or less; a polyolefin microporous membrane, wherein the polyolefin microporous membrane comprises polyethylene, a particle-like filler, and a processing plasticizer, wherein the particle-like filler is friable to such a degree that after 60 seconds of ultra-sonication, the median silica particle size is approximately 0.5 µm or less; a polyolefin microporous membrane, wherein the polyolefin microporous membrane comprises polyethylene, a particle-like filler, and a processing plasticizer, a diffusion coefficient of at least approximately $1.6·10^{-10}$ at −5° C., and an electrical resistance of approximately 40 mΩ·cm$^2$ or lower; a polyolefin microporous membrane, wherein the polyolefin microporous membrane comprises polyethylene, a particle-like filler, and a processing plasticizer, a diffusion coefficient of at least approximately $8.8·10^{-10}$ at 30° C., and an electrical resistance of approximately 40 mΩ·cm$^2$ or lower; a polyolefin microporous membrane, wherein the polyolefin microporous membrane comprises polyethylene, a particle-like filler, and a processing plasticizer, a diffusion coefficient of at least approximately $1.6·10^{-10}$ at −5° C., and the particle-like filler is friable to such a degree that after 30 seconds of ultra-sonication, the median silica particle size is approximately 5 µm or less; a polyolefin microporous membrane, wherein the polyolefin microporous membrane comprises polyethylene, a particle-like filler, and a processing plasticizer, a diffusion coefficient of at least approximately $8.8·10^{-10}$ at 30° C., and the particle-like filler is friable to such a degree that after 60 seconds of ultra-sonication, the median silica particle size is approximately 0.5 µm or less; a polyolefin microporous membrane, wherein the polyolefin microporous membrane comprises polyethylene, a particle-like filler, and a processing plasticizer, a diffusion coefficient of at least approximately $1.6·10^{-10}$ at −5° C., and a mean pore size of at least approximately 120 nm; and a polyolefin microporous membrane, wherein the polyolefin microporous membrane comprises polyethylene, a particle-like filler, and a processing plasticizer, a diffusion coefficient of at least approximately $8.8·10^{-10}$ at 30° C., a mean pore size of at least approximately 120 nm; and combinations thereof.

The separator above wherein the separator comprises at least one of:
one or more of a surfactant, coating, wetting agent, colorant, antistatic additive, antioxidant, agent for reducing oxidation, and combinations thereof; and at least one surfactant, wherein such surfactant is a non-ionic surfactant, an anionic surfactant, or a combination thereof.

In accordance with at least certain aspects of the present invention, lead acid batteries may be provided utilizing separators as generally described herein.

In particular embodiments disclosed herein, a lead acid battery may be provided with a polyolefin microporous membrane having polyethylene, preferably, ultrahigh molecular weight polyethylene, a particle-like filler, and a processing plasticizer; wherein the particle-like filler is present in an amount of 40% or more by weight; and wherein the polyethylene comprises polymer in a shish-kebab formation having a plurality of extended chain crystals (the shish formations) and a plurality of folded chain crystals (the kebab formations) and wherein the average repetition or periodicity of the kebab formations is from 1 nm to 150 nm, preferably less than 120 nm. The battery may further be provided with a shelf life estimated cold cranking amps loss as compared to an initial value of less than approximately 9%, less than approximately 8%, less than approximately 7%, less than approximately 6%, and less than approximately 5%. One aspect of the present invention provides that the shelf life estimated static cold cranking amps is measured at greater than approximately 30 days of resting at standard conditions.

In select embodiments of the present invention, the lead acid battery may be any one of the following: a flat-plate battery, a flooded lead acid battery, an enhanced flooded lead acid battery, a deep-cycle battery, an absorptive glass mat battery, a tubular battery, an inverter battery, a vehicle battery, a SLI battery, an ISS battery, an automobile battery, a truck battery, a motorcycle battery, an all-terrain vehicle battery, a forklift battery, a golf cart battery, a hybrid-electric vehicle battery, an electric vehicle battery, an e-rickshaw battery, an e-trike battery, and an e-bike battery.

In accordance with at least certain aspects of the present invention, vehicles may be provided utilizing batteries and separators as generally described herein.

In particular embodiments disclosed herein, a vehicle may be provided with a lead acid battery having a polyolefin microporous membrane having polyethylene, preferably, ultrahigh molecular weight polyethylene, a particle-like filler, and a processing plasticizer; wherein the particle-like filler is present in an amount of 40% or more by weight; and wherein the polyethylene comprises polymer in a shish-kebab formation having a plurality of extended chain crystals (the shish formations) and a plurality of folded chain crystals (the kebab formations) and wherein the average repetition or periodicity of the kebab formations is from 1 nm to 150 nm, preferably less than 120 nm. The battery may further be provided with a shelf life estimated cold cranking amps loss as compared to an initial value of less than approximately 9%, less than approximately 8%, less than approximately 7%, less than approximately 6%, and less than approximately 5%. One aspect of the present invention provides that the shelf life estimated static cold cranking amps is measured at greater than approximately 30 days of resting at standard conditions.

In select embodiments of the present invention, the vehicle may be one of the following: an automobile, a truck, a motorcycle, an all-terrain vehicle, a forklift, a golf cart, a hybrid-electric vehicle, an electric vehicle, an e-rickshaw, an e-trike, and an e-bike.

In accordance with at least certain aspects of the present invention, a system may be provided utilizing batteries, separators, and battery analyzers as generally described herein.

In particular embodiments disclosed herein, a system may be provided with a lead acid battery having a polyolefin microporous membrane having polyethylene, preferably, ultrahigh molecular weight polyethylene, a particle-like filler, and a processing plasticizer; wherein the particle-like filler is present in an amount of 40% or more by weight; and wherein the polyethylene comprises polymer in a shish-kebab formation having a plurality of extended chain crystals (the shish formations) and a plurality of folded chain crystals (the kebab formations) and wherein the average repetition or periodicity of the kebab formations is from 1 nm to 150 nm, preferably less than 120 nm. The system may further be provided with a battery analyzer capable of measuring battery conductance. The battery may further be provided with a shelf life estimated cold cranking amps loss as measured by said battery analyzer, and as compared to an initial value, of less than approximately 9%, less than approximately 8%, less than approximately 7%, less than approximately 6%, and less than approximately 5%. One aspect of the present invention provides that the shelf life estimated static cold cranking amps is measured at greater than approximately 30 days of resting at standard conditions.

In accordance with at least selected embodiments, aspects, or objects, the present disclosure or invention may provide improved battery separators, high conductance separators, improved lead-acid batteries, such as flooded lead-acid batteries, high conductance batteries, and/or, improved vehicles including such batteries, and/or methods of manufacture or use of such separators or batteries, and/or combinations thereof; improved lead acid batteries incorporating the improved separators and which exhibit increased conductance; lead acid battery separators having topological features designed to improve conductance, low ER membranes, low water loss membranes, and/or the like; and combinations thereof as shown or described herein.

In accordance with at least selected embodiments, aspects, or objects, the present disclosure or invention may provide an improved conductance battery separator comprising a microporous polymeric membrane providing high conductance, wherein the membrane comprises one selected from the group consisting of: Low ER, Low Water Loss, a profile providing limited contact with or obstruction of the positive plate or PAM, a profile providing a large acid volume adjacent the positive plate or PAM, and combinations thereof.

In accordance with at least selected embodiments, aspects, or objects, the present disclosure or invention may provide an improved separator, improving the membrane-electrode contact and continuity, improving the membrane-electrode interfacial resistance, improving conductivity, providing lead acid batteries that exhibit reduced conductivity loss over time, providing improved battery components, and combinations thereof.

In accordance with at least selected embodiments, aspects, or objects, the present disclosure or invention may provide an improved high conductance battery.

In accordance with at least selected embodiments, aspects, or objects, the present disclosure or invention may provide improved battery separators, high conductance separators, improved lead-acid batteries, such as flooded lead-acid batteries, high conductance batteries, improved vehicles including such batteries, methods of manufacture or use of such separators or batteries, improved lead acid batteries incorporating the improved separators and which exhibit increased effective static conductance, and combinations thereof as shown or described herein.

The details of one or more embodiments are set forth in the descriptions below. Other features, objects, and advantages will be apparent from the description and from the claims.

BRIEF DESCRIPTION OF THE DRAWINGS

FIG. 7 includes an SEM image of an embodiment of a separator of the instant invention at 50,000× magnification, while

FIG. 9A is for a control separator, while FIG. 9B is for a low ER separator with desirable mechanical properties according to one embodiment of the present invention. Note that FIG. 9B can also be seen as part of FIG. 1.

In FIG. 10, the bubble flow rate difference is significant in that it is measuring the through-pores of the separator and measuring the ability of such through-pores to functionally transport ions all the way through the separator. While the mean pore size and the minimum pore size are not significantly different, the maximum pore size is greater for the separator according to the present invention, and the bubble flow rate is significantly higher for the separator according to the present invention.

FIG. 12 includes two SEMs at two different magnifications of a control separator made by Daramic, LLC. In these SEMs, relatively thick fibrils or strands of hydrophobic polymer are observed.

FIG. 13 includes two SEMs at two different magnifications of another control separator made by Daramic, LLC. In these SEMs, areas that appear to be polymer webbing can be observed.

FIG. 24A and FIG. 24B include deconvolution of the component peaks from the spectra of FIG. 23 to determine the Q2:Q3:Q4 ratios for the separator samples of CE4 and Example 1, respectively.

FIG. 34B depicts the particle size distribution of the new silica used in inventive separator and FIG. 34A depicts the particle size distribution of a standard silica used in a commercially available separator before sonication and after 30 seconds and after 60 seconds of sonication. (See upper figures for graphical representation.

FIG. 36D depicts a profile of a longitudinal serrated rib pattern. FIG. 36E illustrates a profile of a diagonal offset rib pattern. The negative face could have no ribs (smooth), the same ribs, smaller such ribs, mini-ribs, longitudinal mini-ribs, transverse or cross mini-ribs or negative cross ribs (NCRs), diagonal ribs, or combinations thereof.

DETAILED DESCRIPTION

Figure 1:
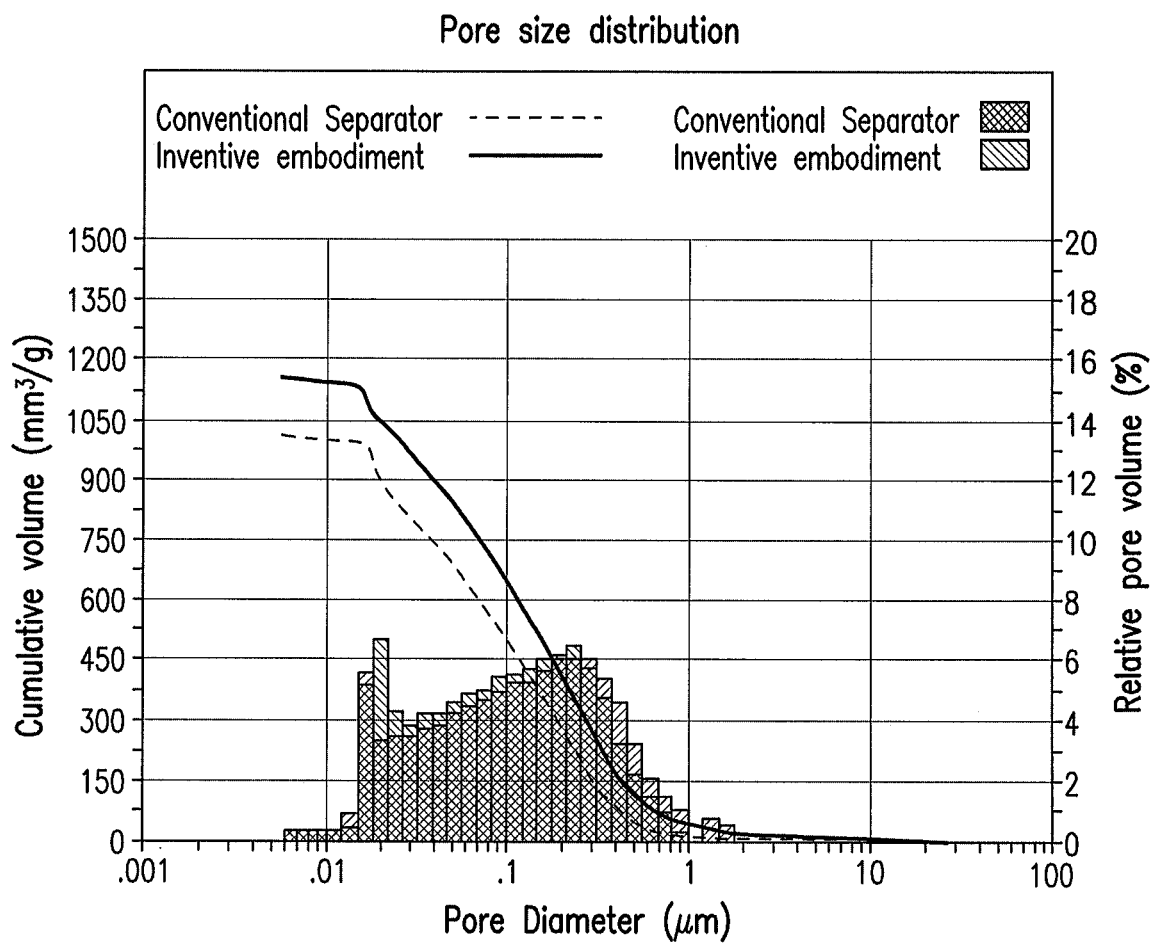
FIG. 1 includes a depiction of the pore size distribution of an embodiment of the instant invention, a lower ER separator, in comparison with a conventional separator.
Figure 2:
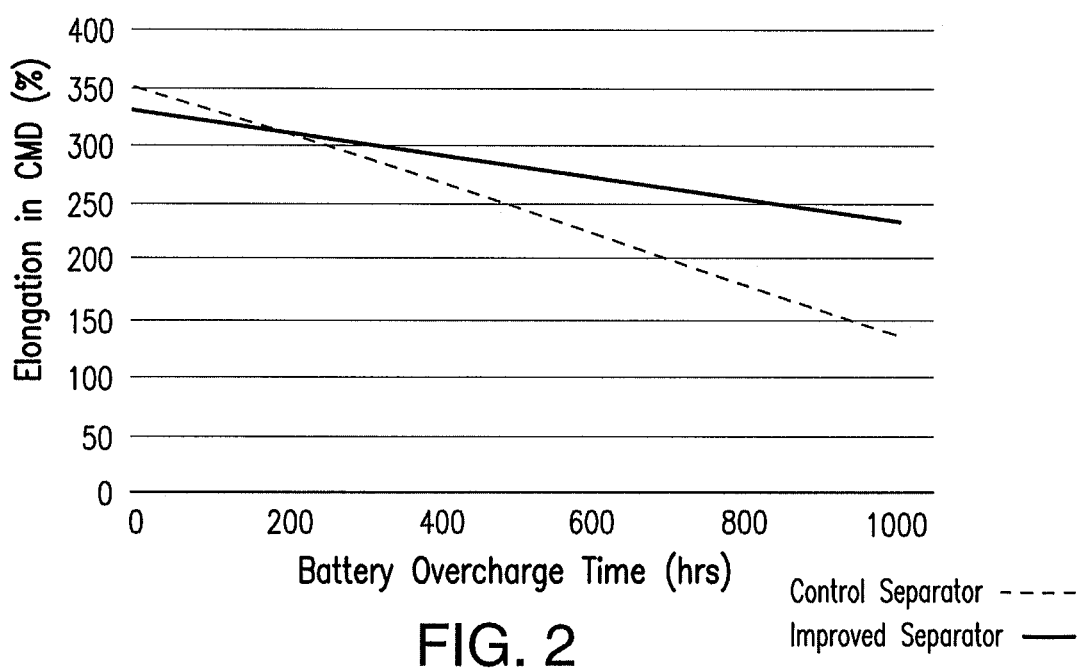
FIG. 2 includes a depiction of the oxidation stability of an embodiment of the instant invention (sometimes referred to as the "EFS" product, an Enhanced Flooded Separator™) in comparison with a conventional separator. In the battery overcharge test, after 1,000 hours, the separator according to the present invention is less brittle than the control separator and thus exhibits higher elongation.
Figure 3:
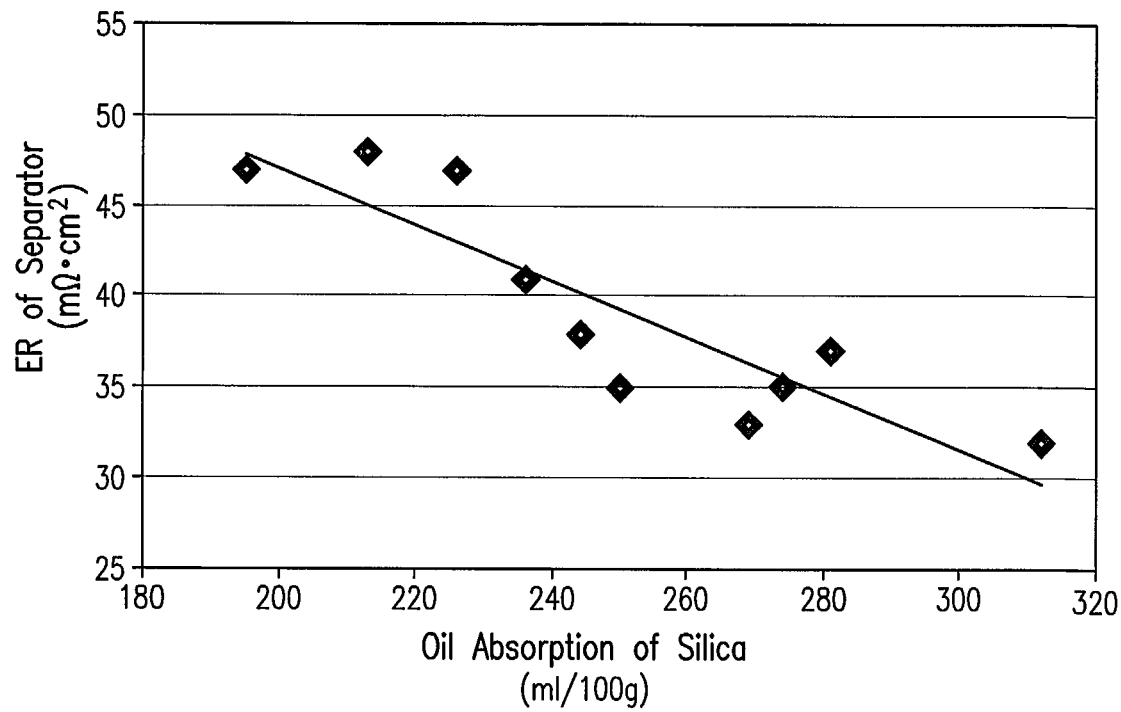
FIG. 3 includes a depiction of the electrical resistance data of separators prepared with different silica fillers. The silica fillers differ in their intrinsic oil absorption. In certain embodiments of the present invention, the improved separator is formed using a silica having an intrinsic oil absorption value of about 175-350 ml/100 g, in some embodiments, 200-350 ml/100 g, in some embodiments, 250-350 ml/100 gm, and in some further embodiments, 260-320 ml/100 g, though other oil absorption values are possible as well.
Figure 4:
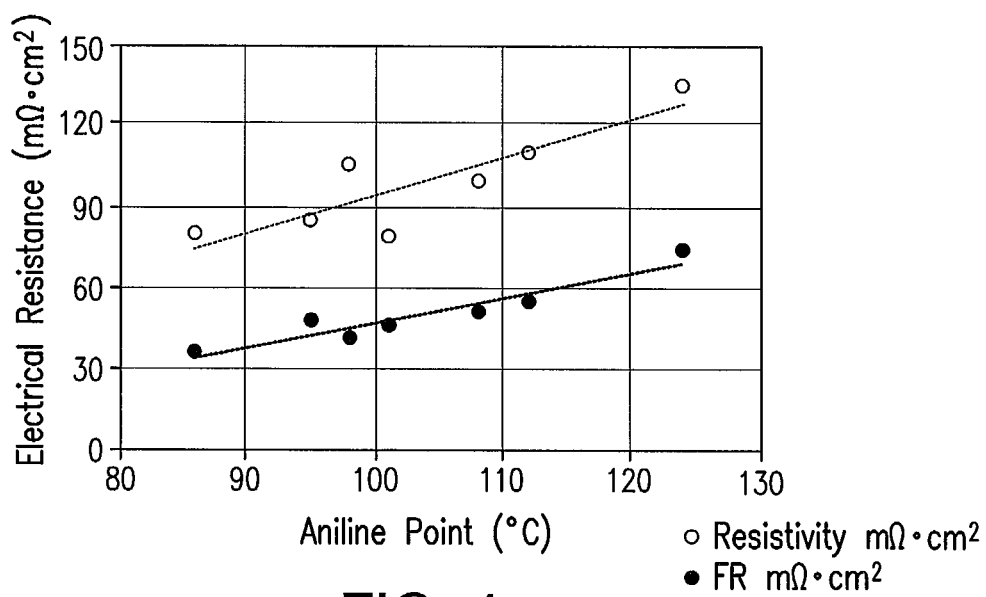
FIG. 4 includes a depiction of the electrical resistance data of separators prepared with different process oils. The oils differ in their aniline point.
Figure 5:
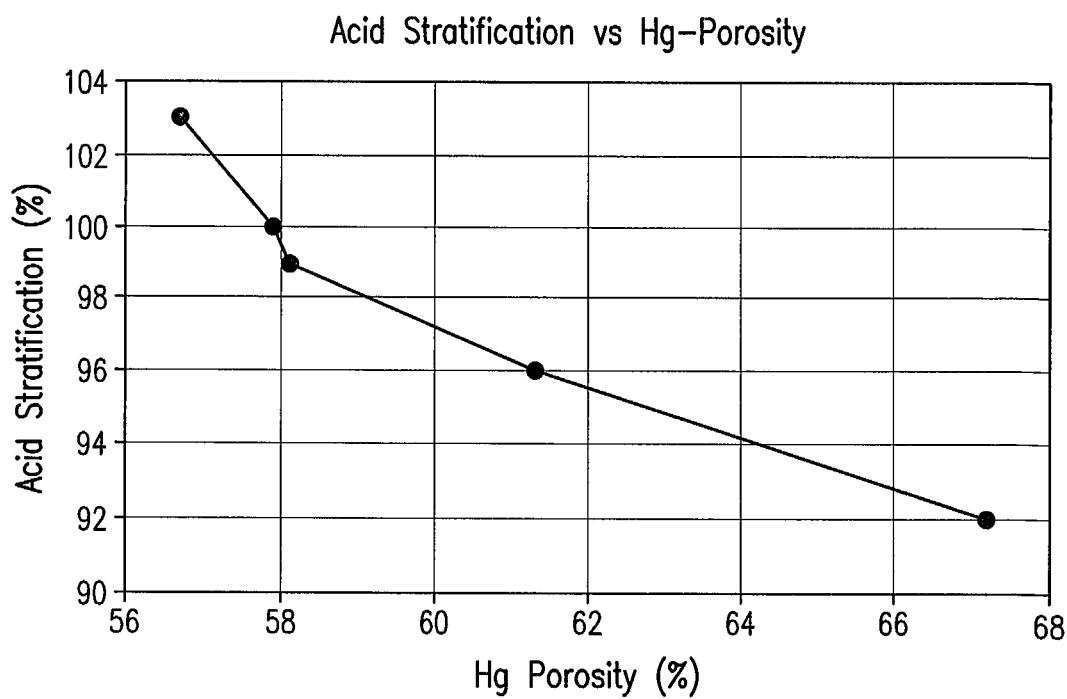
FIG. 5 includes a depiction of acid stratification (%) versus Hg porosity (%) for separators according to the present invention.
Figure 6:
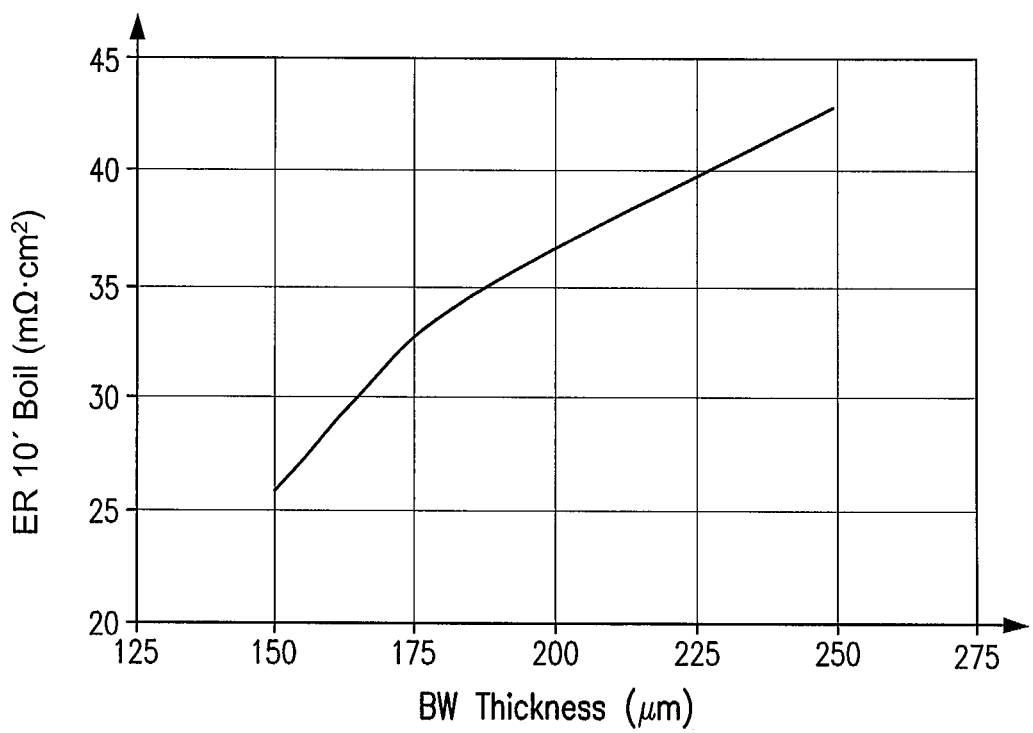
FIG. 6 includes a depiction of ER boil versus backweb thickness.
Figure 7:
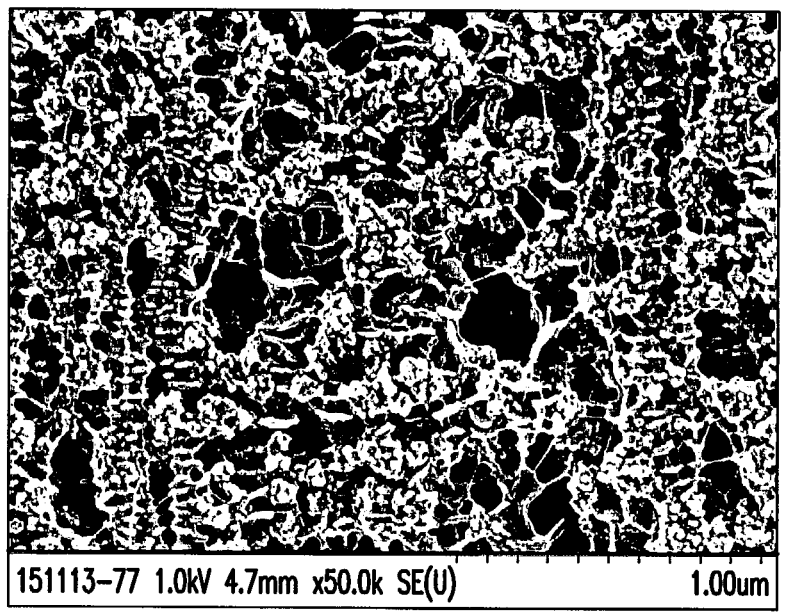
Figure 8A:
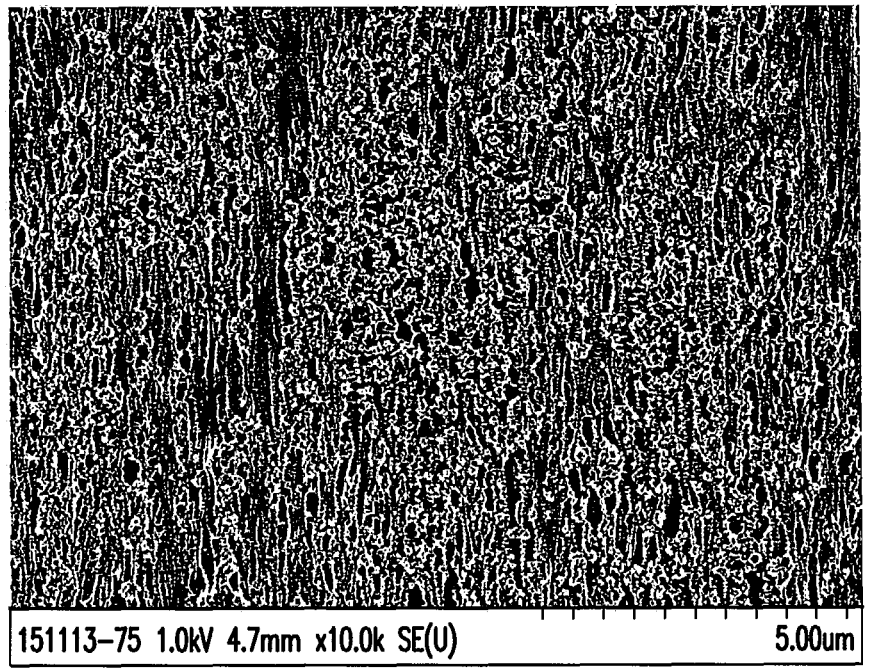
FIGS. 8A and 8B are SEM images of the same separator at 10,000× magnification. In the SEM of FIG. 7, the shish kebab-type morphology or textured fibril-type structure is observed, and the pore and silica structure leaves certain cavities or pores with much less polymer webbing (in some cases almost no polymer webbing) and much fewer thick fibrils or strands of hydrophobic polymer (in some cases almost no or no thick fibrils or strands of hydrophobic polymer). Electrolyte and/or acid, and therefore ions pass much more readily through the pore structure observed in this separator shown in FIGS. 7-8B. The structure of the separator provides free space in which acid freely moves.
Figure 8B:
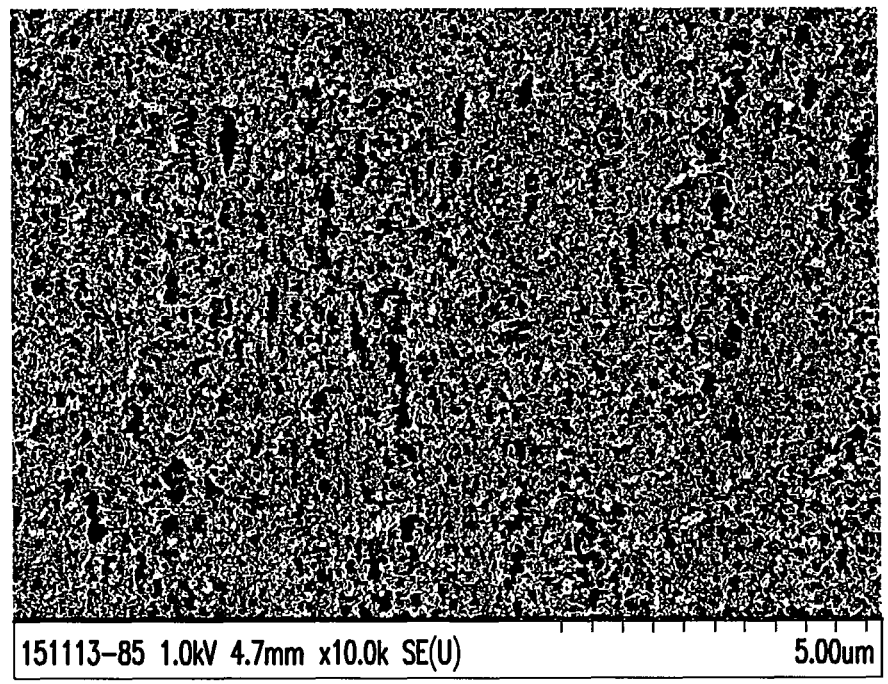
Figure 9A:
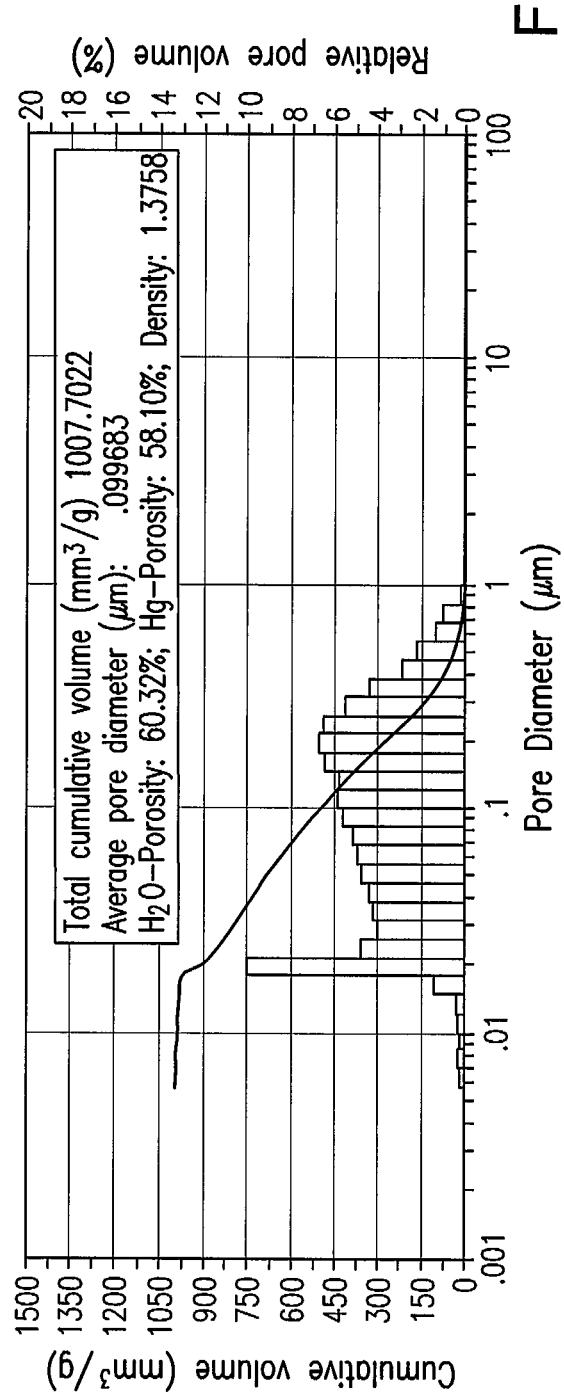
FIGS. 9A and 9B include depictions of the pore size distribution of separator embodiments.
Figure 9B:
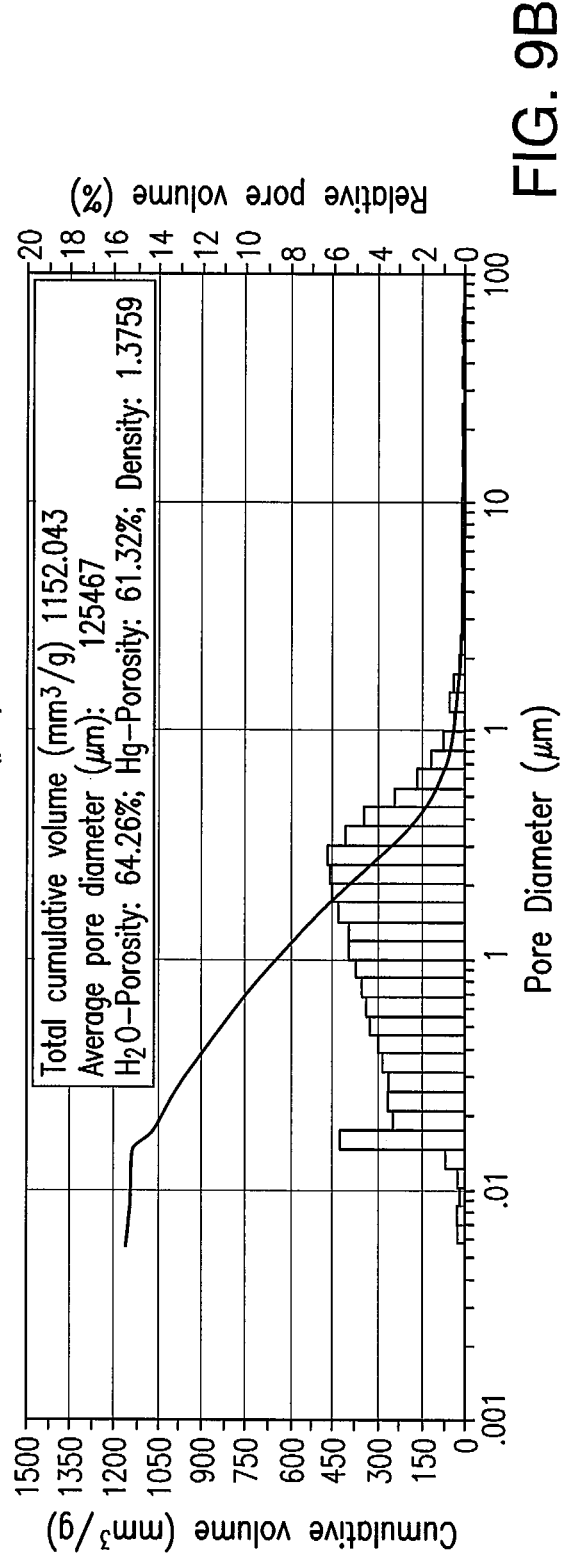
Figure 10:
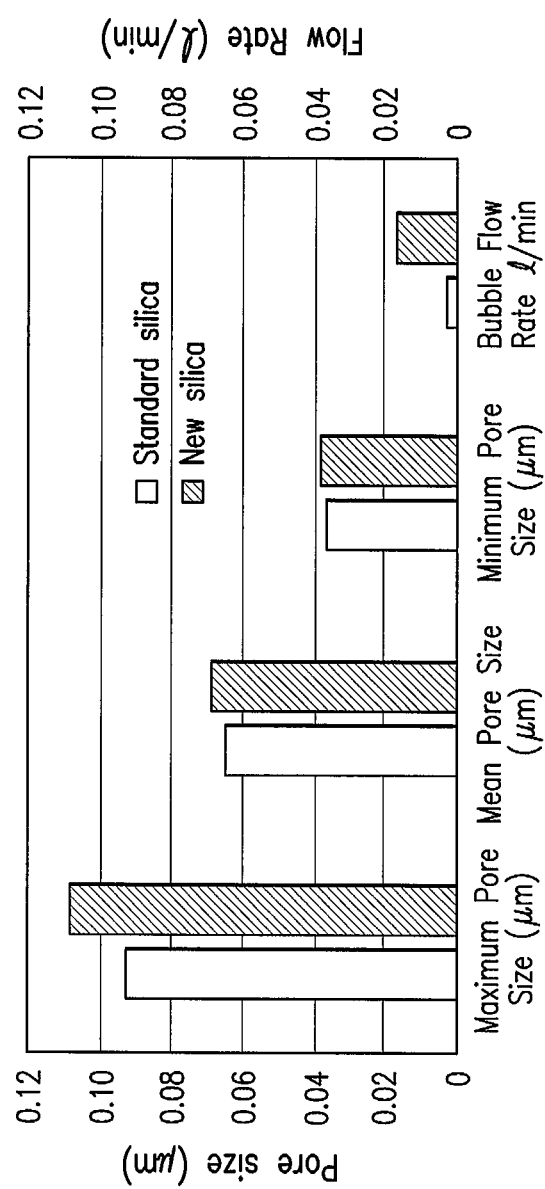
FIG. 10 includes a comparison of various pore size measurements for a separator according to the instant invention with a conventional separator.
Figure 11A:
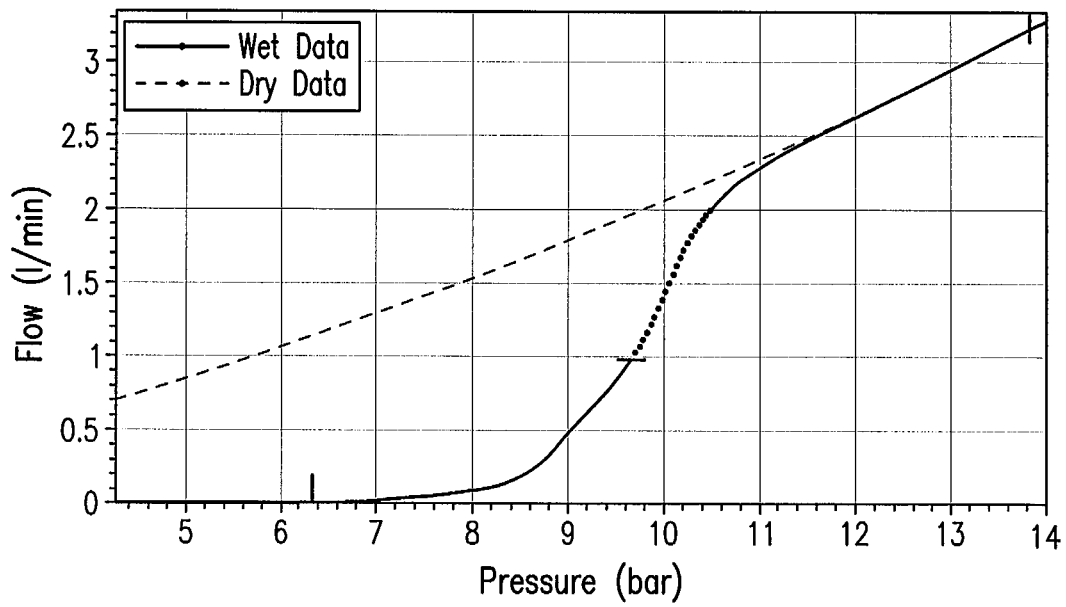
FIGS. 11A and 11B show porometry data and a depiction of the flow of liquid through a separator in accordance with an embodiment of the invention (FIG. 11A) in comparison with flow of liquid through a control separator (FIG. 11B).
Figure 11B:
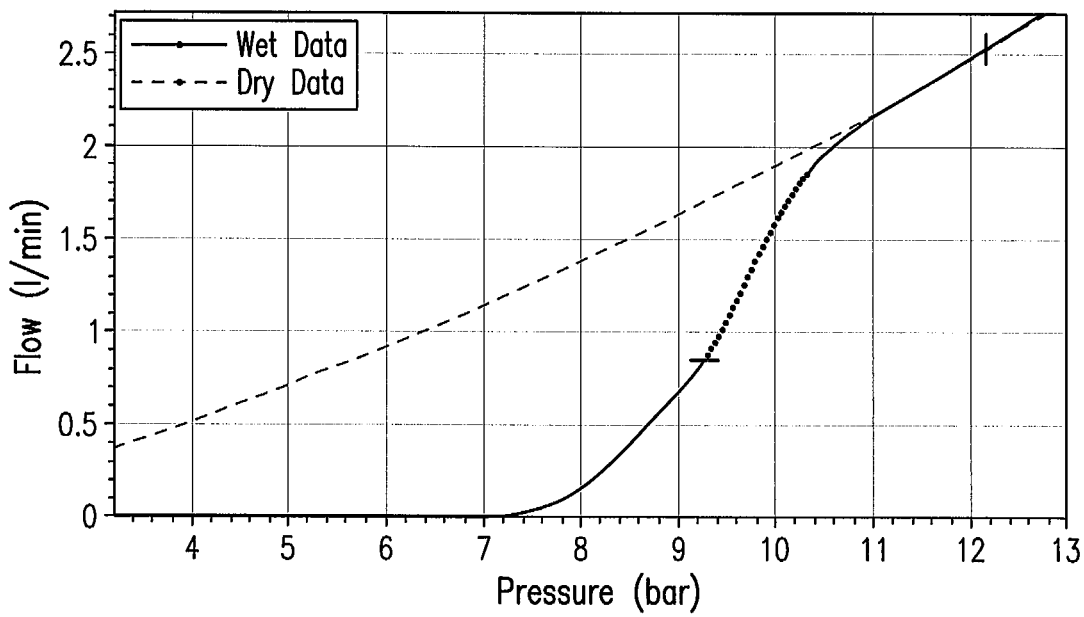
Figure 12A:
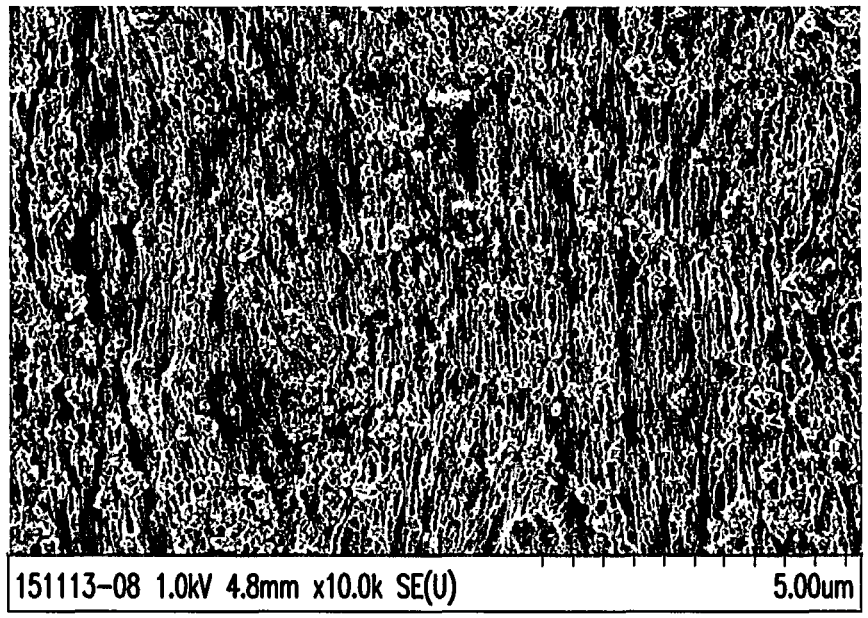
FIG. 12A is taken at a lower magnification as shown in the numbers at the base of the figure.
Figure 12B:
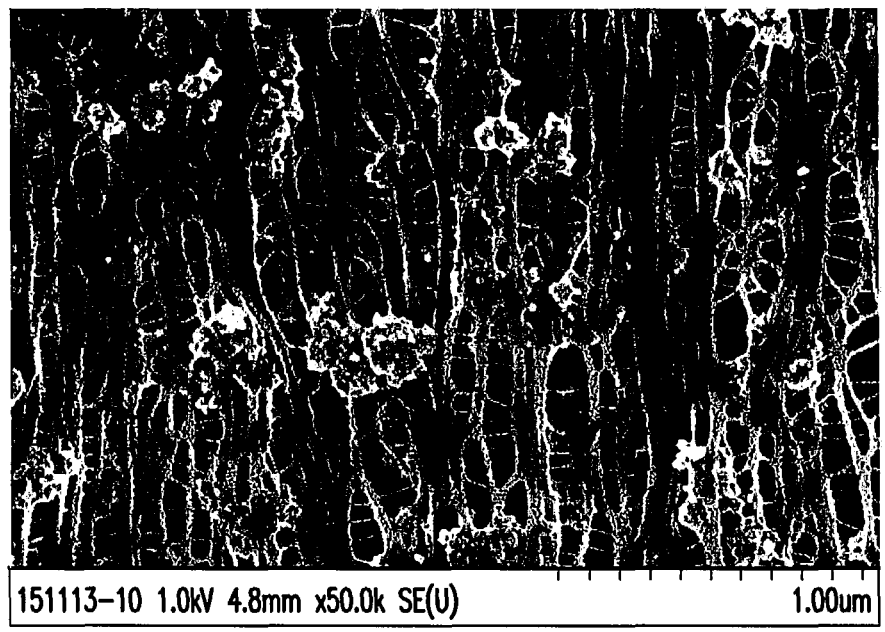
FIG. 12B is taken at a higher magnification as shown in the numbers at the base of the figure.
Figure 13A:
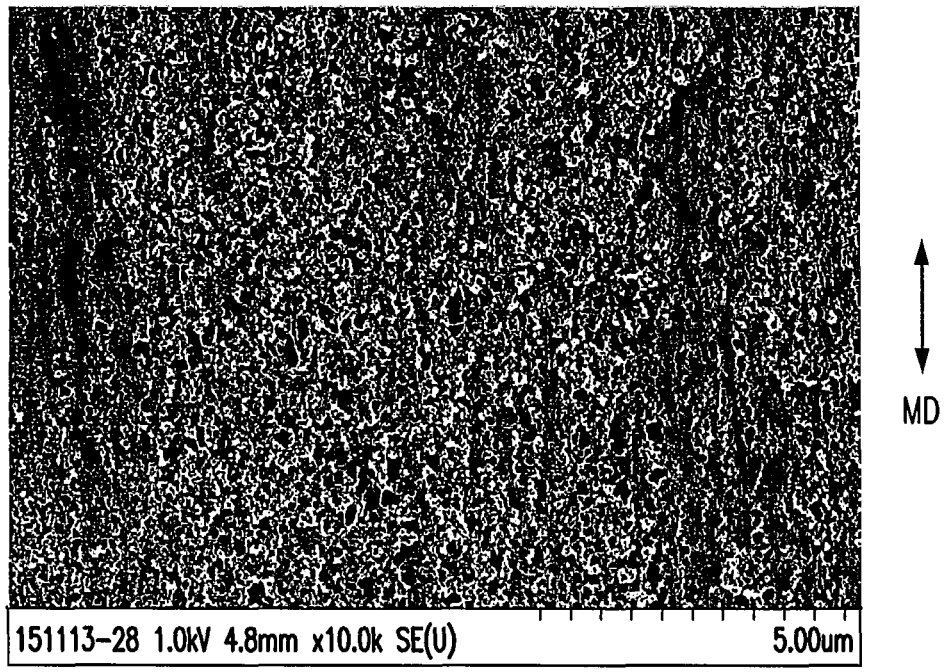
FIG. 13A is taken at a lower magnification as shown in the numbers at the base of the figure.
Figure 13B:
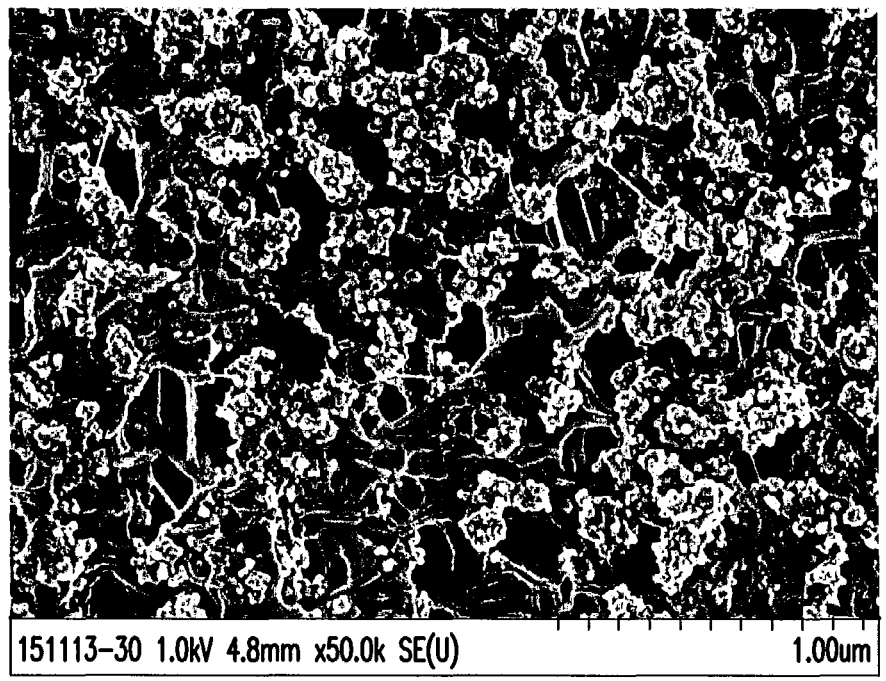
FIG. 13B is taken at a higher magnification as shown in the numbers at the base of the figure.
Figure 14A:
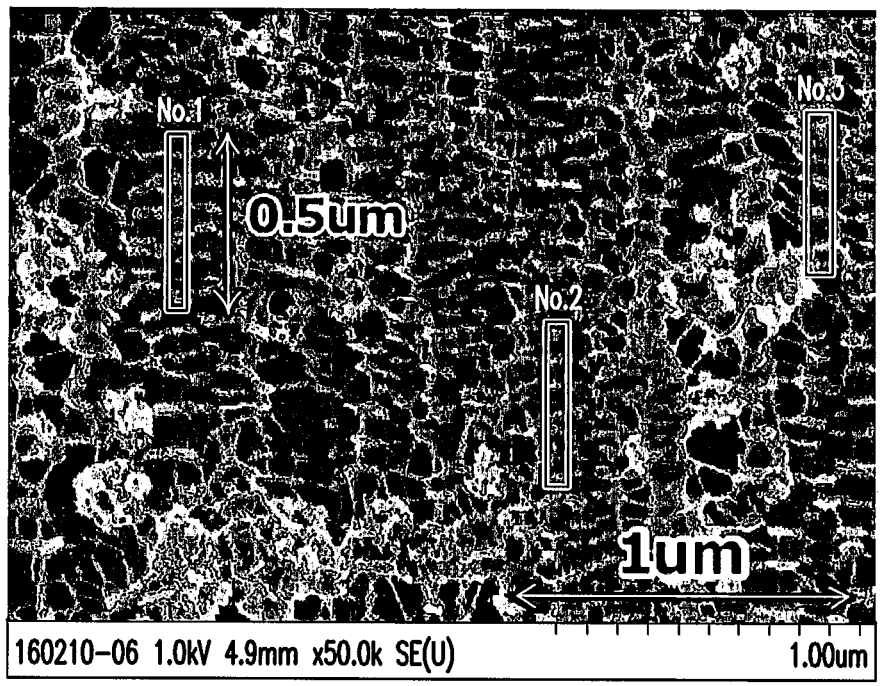
FIG. 14A includes an SEM of a separator formed according to an embodiment of the present invention, wherein the shish-kebab polymer formation(s) are observed.
Figure 14B:
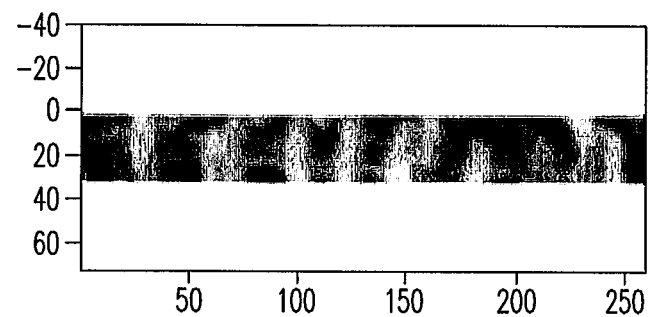
FIG. 14B portrays how a Fourier transform contrast profile (spectrum at the bottom of FIG. 14B) helps determine the repetition or periodicity of the shish-kebab formations (see shish-kebab formation at the top of FIG. 14B) in the separator.
Figure 14C:
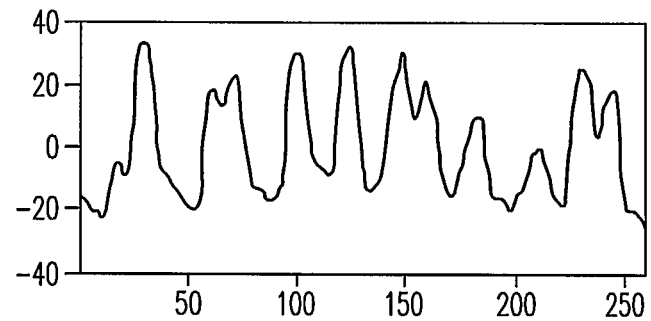
FIG. 14C represents FIG. 14B in graphical manner.

Exemplary separators as disclosed herein are preferably characterized by having or by providing improved conductance over time. Conductance may be determined as cold-cranking amps ("CCA") measured by a battery analyzer for determining battery conductance and estimating the CCA. Such a battery analyzer may be, for instance, the MDX-600 made by Midtronics, Inc. of Willowbrook, Ill., USA. For instance, a lead-acid battery equipped with the inventive separator can exhibit a decrease of less than 10%, less than 9%, less than 8%, less than 7%, less than 6%, less than 5%, less than 4%, less than 3%, less than 2%, less than 1%, or less than 0.5% CCA over a period of 30 days or more at standard conditions with no load on the battery as measured by a CCA tester.

Separators as disclosed herein are characterized by improved conductance over time. Conductance may be determined as cold-cranking amps, measured for instance in a CCA tester. For instance, a lead-acid battery equipped with the inventive separator can exhibit a decrease of less than 10%, less than 9%, less than 8%, less than 7%, less than 6%, less than 5%, less than 4%, less than 3%, less than 2%, less than 1%, or less than 0.5% CCA over a period of 30 days or more at standard conditions with no load on the battery as measured by a CCA tester. In contrast, the CCA decrease observed for conventional batteries under similar conditions is often much greater.

The separators provided herein permit the production of batteries with reduced water loss and float currents in batteries compared to batteries made from conventional separators. In some embodiments, water loss can be reduced by more than 10%, 20%, 30%, 40%, 50%, 60%, 70% or 80%. In some embodiments, float current can be reduced by more than 10%, 20%, 30%, 40%, 50%, 60%, 70% or 80%. Batteries prepared using the disclosed separators exhibit reduced internal resistance increase over time, and in some cases exhibit no increased internal resistance.

In accordance with at least selected embodiments, the present disclosure or invention is directed to improved battery separators, high conductance separators, improved lead-acid batteries, such as flooded lead-acid batteries, high conductance batteries, and/or, improved vehicles including such batteries, and/or methods of manufacture or use of such separators or batteries, and/or combinations thereof. In accordance with at least certain embodiments, the present disclosure or invention is directed to improved lead acid batteries incorporating the improved separators and which exhibit increased conductance.

In some instances, the enhanced separators used in the present disclosure may have optimized profiles that have a rib surface area, compared with the rib surface area of a conventional rib profile such as a solid vertical rib profile, that is 10-90% of that conventional rib surface area, preferably 30-70% of that conventional rib surface area, and more preferably, in some instances, 40-60% of that conventional rib surface area. All of this depends on the rib geometry, rib spacing and the final goal of improving the acid mixing and preventing the acid stratification, all of which are optimized.

Physical Description

An exemplary separator of the present invention may be provided with a web of a porous membrane, such as a microporous membrane having pores less than about 5 μm, preferably less than about 1 μm, a mesoporous membrane, or a macroporous membrane having pores greater than about 1 μm. The porous membrane may preferably have a pore size that is sub-micron up to 100 μm, and in certain embodiments between about 0.1 μm to about 10 μm. Porosity of the separator membrane described herein may be greater than 50% to 60% in certain embodiments. In certain select embodiments, the porous membrane may be flat or possess ribs that extend from a surface thereof. The separator may be defined by a variety of dimensions, which will be explained in detail hereinafter. For instance, exemplary dimensions may include a backweb thickness, a total thickness, a positive rib height, and a negative rib height.

An exemplary separator is provided with a web of a porous membrane. The separator and membrane have a machine direction ("MD") and a cross-machine direction ("CMD"), a top edge and a bottom edge (both substantially parallel to the CMD), and lateral side edges (both substantially parallel to the MD).

The separator is provided with a positive surface, named so because it faces a positive electrode when the separator is disposed within a battery. One or more sets of primary or positive ribs may be provided and extend from at least a portion of the positive surface of the porous membrane. The ribs may be solid and disposed on the membrane substantially longitudinal, which is substantially parallel to the separator MD. The positive ribs may also extend uniformly across the entire separator width from a lateral edge to the other lateral edge, this is known as a "universal profile." The separator has a width that may range from, depending upon the type of battery in which the separator will be used, approximately 40 mm to approximately 170 mm in at least selected embodiments.

The separator is provided with a negative surface, named so because it faces a negative electrode when the separator is disposed within a battery. One or more sets of secondary or negative ribs may be provided and extend from at least a portion of the negative surface of the porous membrane. The ribs may be solid and disposed in an orientation that is orthogonal to the positive ribs, which substantially parallel to the separator CMD. As such, the ribs may be said to be disposed transversely, laterally, or be referred to as cross ribs, or negative-cross ribs ("NCR" or "NCRs"). The negative ribs however, need not be orthogonal to the positive ribs. They may be the same size, larger, smaller, in the same or different pattern, or combinations thereof.

Ribs

The ribs may be a uniform set, an alternating set, or a mix or combination of solid, discrete broken ribs, continuous, discontinuous, angled, linear, longitudinal ribs extending substantially in a MD of the separator, lateral ribs extending substantially in a cross-machine direction CMD of the separator, transverse ribs extending substantially in a CMD of the separator, cross ribs extending substantially in a cross-machine direction of the separator, serrations or serrated ribs, battlements or battlemented ribs, curved or sinusoidal, disposed in a solid or broken zig-zag-like fashion, grooves, channels, textured areas, embossments, dimples, porous, non-porous, mini ribs or cross-mini ribs, and/or the like, and combinations thereof. Further, the ribs may extend from or into the positive side, the negative side, or both sides.

Referring now to FIGS. 36A-36E, several embodiments of ribbed separators with different rib profiles are depicted. It may be preferred that the shown ribs are positive ribs. The angled rib pattern of FIGS. 36A-36C may be a possibly preferred Daramic® RipTide™ acid mixing rib profile that can help reduce or eliminate acid stratification in certain batteries. In some embodiments, the ribs may be discrete broken ribs with an angular orientation relative to the separator MD. The angular orientation may be an angle between greater than zero degrees (0°) and less than 180 degrees (180°) or greater than 180 degrees (180°) and less than 360 degrees (360°). As further shown in FIGS. 36A-36C, the ribs may possess one or more sets of ribs, with each set having varying angular orientations and locations on the separator. The negative face could have no ribs (smooth), the same ribs, smaller ribs, longitudinal mini-ribs, cross mini-ribs or NCRs, diagonal ribs, or combinations thereof.

Figure 36A:
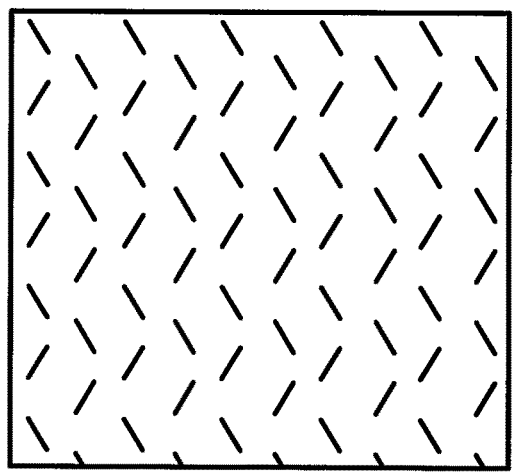
FIGS. 36A-36E are surface images of several embodiments of ribbed separators with different rib profiles depicted. It may be preferred that the shown ribs are positive ribs. The angled rib pattern of FIGS. 36A-36C may be a possibly preferred Daramic® RipTide™ acid mixing rib profile that can help reduce or eliminate acid stratification in certain batteries. As further shown in FIGS. 36A-36C, the ribs may possess one or more sets of ribs, with each set having varying angular orientations and locations on the separator.
Figure 36B:
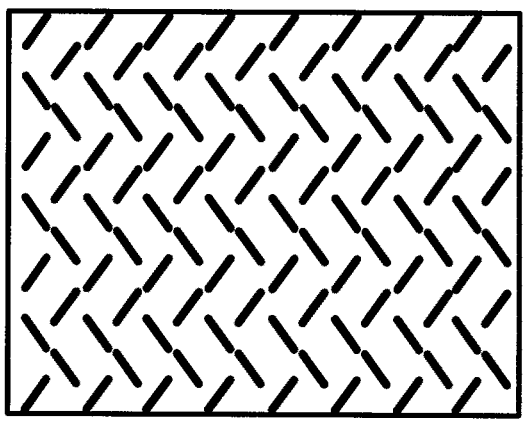
Figure 36C:
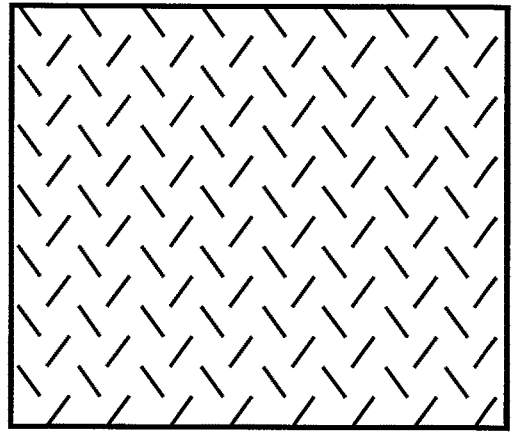
Figure 36D:
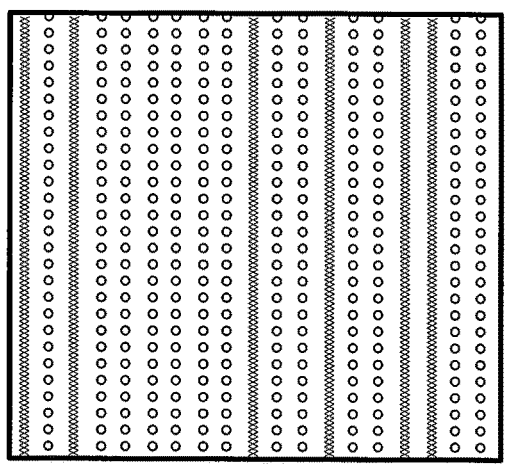
Figure 36E:
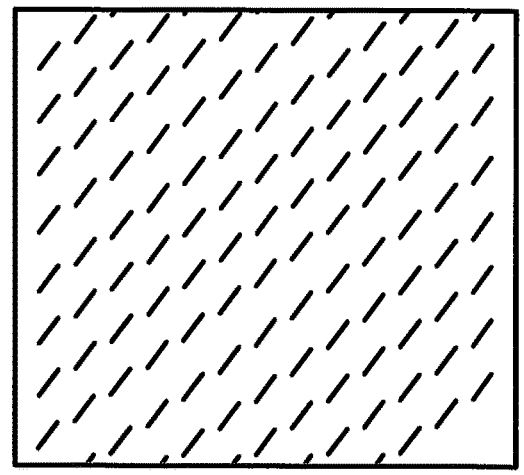

FIG. 36D depicts a profile of a longitudinal serrated rib pattern. FIG. 36E illustrates a profile of a diagonal offset rib pattern. The negative face could have no ribs (smooth), the same ribs, smaller ribs, longitudinal mini-ribs, cross mini-ribs or NCRs, diagonal ribs, or combinations thereof.

As discussed above, the ribs may extend uniformly across the width of the separator, from lateral edge to lateral edge. This is known as a universal profile. Alternatively, the separator may have side panels adjacent to the lateral edges with minor ribs disposed in the side panel. These minor ribs may be more closely spaced and smaller than the primary ribs. For instance, the minor ribs may be 25% to 50% of the height of the primary ribs. The side panels may alternatively be flat. The side panels may assist in sealing an edge of the separator to another edge of the separator as done when enveloping the separator, which is discussed hereinbelow.

In select exemplary embodiments, at least a portion of the positive ribs may preferably have a height of approximately 50 μm to approximately 2.0 mm. In some exemplary embodiments, the positive rib height may be approximately 50 μm, 100 μm, 200 μm, 300 μm, 400 μm, 500 μm, 600 μm, 700 μm, 800 μm, 900 μm, 1.0 mm, 1.2 mm, 1.4 mm, 1.6 mm, 1.8 mm, or 2.0 mm. In other exemplary embodiments, the positive rib height may be no greater than approximately 2.0 mm, 1.8 mm, 1.6 mm, 1.4 mm, 1.2 mm, 1.0 mm, 900 μm, 800 μm, 700 μm, 600 μm, 500 μm, 400 μm, 300 μm, 200 μm, 100 μm, or 50 μm.

In certain select embodiments, the positive ribs may preferably have a base width of approximately 300 μm to approximately 750 μm. In some exemplary embodiments, the positive rib base width may be approximately 300 μm, 400 μm, 500 μm, 600 μm, 700 μm, or 750 μm. In some exemplary embodiments, the positive rib base width may be no greater than approximately 750 μm, 700 μm, 600 μm, 500 μm, 400 μm, or 300 μm.

Should a portion of the positive ribs be substantially straight and substantially parallel to one another, they may possess a spacing length or pitch of approximately 50 μm to approximately 20 mm. In some exemplary embodiments, the positive rib pitch may be approximately 50 μm, 100 μm, 200 μm, 300 μm, 400 μm, 500 μm, 600 μm, 700 μm, 800 μm, 900 μm, 1.0 mm, 2.0 mm, 3.0 mm, 4.0 mm, or 5.0 mm, 6.0 mm, 7.0 mm, 8.0 mm, 9.0 mm, or 10.0 mm, 11.0 mm, 12.0 mm, 13.0 mm, 14.0 mm, or 15.0 mm, 16.0 mm, 17.0 mm, 18.0 mm, 19.0 mm, or 20.0 mm. In other exemplary embodiments, the positive rib pitch may be no greater than approximately 20.0 mm, 19.0 mm, 18.0 mm, 17.0 mm, or 16.0 mm, 15.0 mm, 14.0 mm, 13.0 mm, 12.0 mm, or 11.0 mm, 10.0 mm, 9.0 mm, 8.0 mm, 7.0 mm, or 6.0 mm 5.0 mm, 4.0 mm, 3.0 mm, 2.0 mm, 1.0 mm, 900 μm, 800 μm, 700 μm, 600 μm, 500 μm, 400 μm, 300 μm, 200 μm, 100 μm, or 50 μm.

In select exemplary embodiments, at least a portion of the negative ribs may preferably have a height of approximately 5% to approximately 100% of the height of the positive ribs. In some exemplary embodiments, the negative rib height may be approximately 5%, 10%, 15%, 20%, 25%, 30%, 35%, 40%, 45%, 50%, 55%, 60%, 65%, 70%, 75%, 80%, 95%, or 100% compared to the positive rib height. In other exemplary embodiments, the negative rib height may no greater than approximately 100%, 95%, 90%, 85%, 80%, 75%, 70%, 65%, 60%, 55%, 50%, 45%, 40%, 35%, 30%, 25%, 20%, 15%, 10%, or 5% compared to the positive rib height.

In select exemplary embodiments, at least a portion of the negative ribs may preferably have a height of approximately 5 μm to approximately 1.0 mm. In certain embodiments, the negative rib height may be approximately 5 μm, 10 μm, 25 μm, 50 μm, 100 μm, 200 μm, 300 μm, 400 μm, 500 μm, 600 μm, 700 μm, 800 μm, 900 μm, 1.0 mm, 1.2 mm, 1.4 mm, 1.6 mm, 1.8 mm, or 2.0 mm. In other exemplary embodiments, the positive rib height may be no greater than approximately 2.0 mm, 1.8 mm, 1.6 mm, 1.4 mm, 1.2 mm, 1.0 mm, 900 μm, 800 μm, 700 μm, 600 μm, 500 μm, 400 μm, 300 μm, 200 μm, 100 μm, or 50 μm, 25 μm, 10 μm, or 5 μm.

In certain exemplary embodiments, at least a portion of the negative ribs may preferably have a base width of approximately 5 µm to approximately 1.0 mm. For instance, the negative base width may be approximately 5 µm, 10 µm, 25 µm, 25 µm, 75 µm, 100 µm, 150 µm, 200 µm, 250 µm, 300 µm, 350 µm, 400 µm, 450 µm, 500 µm, 550 µm, 600 µm, 650 µm, 700 µm, 750 µm, 800 µm, 850 µm, 900 µm, 950 µm, or 1.0 mm. In other embodiments, the negative base width may be no greater than approximately 1.0 mm, 900 µm, 800 µm, 700 µm, 600 µm, 500 µm, 400 µm, 300 µm, 200 µm, 150 µm, 100 µm, 75 µm, 50 µm, 25 µm, 10 µm, or 5 µm.

Should a portion of the negative ribs be substantially straight and substantially parallel to one another, they may possess a spacing length or pitch of approximately 50 µm to approximately 20.0 mm. In some exemplary embodiments, the negative rib pitch may be approximately 50 µm, 100 µm, 200 µm, 300 µm, 400 µm, 500 µm, 600 µm, 700 µm, 800 µm, 900 µm, 1.0 mm, 2.0 mm, 3.0 mm, 4.0 mm, or 5.0 mm, 6.0 mm, 7.0 mm, 8.0 mm, 9.0 mm, or 10.0 mm, 11.0 mm, 12.0 mm, 13.0 mm, 14.0 mm, or 15.0 mm, 16.0 mm, 17.0 mm, 18.0 mm, 19.0 mm, or 20.0 mm. In other embodiments, the negative rib pitch may be no greater than approximately 20.0 mm, 19.0 mm, 18.0 mm, 17.0 mm, or 16.0 mm, 15.0 mm, 14.0 mm, 13.0 mm, 12.0 mm, or 11.0 mm, 10.0 mm, 9.0 mm, 8.0 mm, 7.0 mm, or 6.0 mm 5.0 mm, 4.0 mm, 3.0 mm, 2.0 mm, 1.0 mm, 900 µm, 800 µm, 700 µm, 600 µm, 500 µm, 400 µm, 300 µm, 200 µm, 100 µm, or 50 µm.

In some select embodiments, at least a portion of the porous membrane may have negative ribs that are longitudinal or transverse or cross-ribs. The negative ribs may be parallel to the top edge of the separator, or may be disposed at an angle thereto. For instance, the negative ribs may be oriented approximately 0°, 5°, 15°, 30°, 45°, 60°, 70°, 80°, or 90° relative to the top edge. The cross-ribs may be oriented approximately 0° to approximately 30°, approximately 30° to approximately 45°, approximately 45° to approximately 60°, approximately 30° to approximately 60°, approximately 30° to approximately 90°, or approximately 60° to approximately 90° relative to the top edge.

Certain exemplary embodiments may possess serrations or serrated ribs. If present, they may have an average tip length of from approximately 50 µm to approximately 1.0 mm. For example, the average tip length may be greater than or equal to approximately 50 µm, 100 µm, 200 µm, 300 µm, 400 µm, 500 µm, 600 µm, 700 µm, 800 µm, 900 µm, or 1.0 mm. Alternatively, they may be no greater than or equal to 1.0 mm, 900 µm, 800 µm, 700 µm, 600 µm, 500 µm, 400 µm, 300 µm, 200 µm, 100 µm, or 50 µm.

At least a portion of the serrations or serrated ribs may have an average base length of from approximately 50 µm to approximately 1.0 mm. For example, the average base length may be approximately 50 µm, 100 µm, 200 µm, 300 µm, 400 µm, 500 µm, 600 µm, 700 µm, 800 µm, 900 µm, or 1.0 mm. Alternatively, they may be no greater than or equal to approximately 1.0 mm, 900 µm, 800 µm, 700 µm, 600 µm, 500 µm, 400 µm, 300 µm, 200 µm, 100 µm, or 50 µm.

At least a portion of the serrations or serrated ribs may have an average height of from approximately 50 µm to approximately 1.0 mm. For example, the average height may be approximately 50 µm, 100 µm, 200 µm, 300 µm, 400 µm, 500 µm, 600 µm, 700 µm, 800 µm, 900 µm, or 1.0 mm. Alternatively, they may be no greater than or equal to approximately 1.0 mm, 900 µm, 800 µm, 700 µm, 600 µm, 500 µm, 400 µm, 300 µm, 200 µm, 100 µm, or 50 µm. For embodiments in which the serration height is the same as the rib height, the serrated ribs may also be referred to as protrusions. Such ranges may apply to separators for industrial traction-type start/stop batteries, where the total thickness $T_{TOTAL}$ of the separator may typically be about 1 mm to about 4 mm, as well as automotive start/stop batteries, where the total thickness $T_{TOTAL}$ of the separator may be a little less (e.g., typically about 0.3 mm to about 1 mm).

At least a portion of the serrations or serrated ribs may have an average center-to-center pitch within a column in the machine direction of from approximately 100 µm to approximately 50 mm. For example, the average center-to-center pitch may be greater than or equal to approximately 50 µm, 100 µm, 200 µm, 300 µm, 400 µm, 500 µm, 600 µm, 700 µm, 800 µm, 900 µm, or 1.0 mm, and in similar increments up to 50 mm. Alternatively, they may be no greater than or equal to approximately 50 µm, 100 µm, 200 µm, 300 µm, 400 µm, 500 µm, 600 µm, 700 µm, 800 µm, 900 µm, or 1.0 mm, and in similar increments up to 50 mm. In addition, adjacent columns of serrations or serrated ribs may be identically disposed at the same position in a machine direction or offset. In an offset configuration, adjacent serrations or serrated ribs are disposed at different positions in the machine direction.

At least a portion of the serrations or serrated ribs may have an average height to base width ratio of from approximately 0.1:1.0 to approximately 500:1.0. For example, the average height to base width ratio may be approximately 0.1:1.0, 25:1.0, 50:1.0, 100:1.0, 150:1.0, 200:1.0, 250:1.0, 300:1.0, 350:1, 450:1.0, or 500:1.0. Alternatively, the average height to base width ratio may be no greater than or equal to approximately 500:1.0, 450:1.0, 400:1.0, 350:1.0, 300:1.0, 250:1.0, 200:1.0, 150:1.0, 100:1.0, 50:1.0, 25:1.0, or 0.1:1.0.

At least a portion of the serrations or serrated ribs can have average base width to tip width ratio of from approximately 1,000:1.0 to approximately 0.1:1.0. For example, the average base width to tip width ratio may be approximately 0.1:1.0, 1.0:1.0, 2:1.0, 3:1.0, 4:1.0, 5:1.0, 6:1.0, 7:1.0, 8:1.0, 9:1.0, 10:1.0, 15:1.0, 20:1.0, 25:1.0, 50:1.0, 100:1.0, 150:1.0, 200:1.0, 250:1.0, 300:1.0, 350:1.0, 450:1.0, 500:1.0, 550:1.0, 600:1.0, 650:1.0, 700:1.0, 750:1.0, 800:1.0, 850:1.0, 900:1.0, 950:1.0, or 1,000:1.0. Alternatively, the average base width to tip width ratio may be no greater than approximately 1,000:1.0, 950:1.0, 900:1.0, 850:1.0, 800:1.0, 750:1.0, 700:1.0, 650:1.0, 600:1.0, 550:1.0, 500:1.0, 450:1.0, 400:1.0, 350:1.0, 300:1.0, 250:1.0, 200:1.0, 150:1.0, 100:1.0, 50:1.0, 25:1.0, 20:1.0, 15:1.0, 10:1.0, 9:1.0, 8:1.0, 7:1.0, 6:1.0, 5:1.0, 4:1.0, 3:1.0, 2:1.0, 1.0:1.0, or 0.1:1.0.

Backweb Thickness

In some embodiments, the porous separator membrane can have a backweb thickness $T_{BACK}$ from approximately 50 µm to approximately 1.0 mm. for example, the backweb thickness $T_{BACK}$ may be may be approximately 50 µm, 100 µm, 200 µm, 300 µm, 400 µm, 500 µm, 600 µm, 700 µm, 800 µm, 900 µm, or 1.0 mm. In other exemplary embodiments, the backweb thickness $T_{BACK}$ may be no greater than approximately 1.0 mm, 900 µm, 800 µm, 700 µm, 600 µm, 500 µm, 400 µm, 300 µm, 200 100 µm, or 50 µm. Though in certain embodiments, a very thin flat backweb thickness of 50 µm or thinner is provided, for example, between approximately 10 µm to approximately 50 µm thick.

Envelope/Form

The separator 100 may be provided as a flat sheet, a leaf or leaves, a wrap, a sleeve, or as an envelope or pocket separator. An exemplary envelope separator may envelope a positive electrode ("positive enveloping separator"), such that the separator has two interior sides facing the positive electrode and two exterior sides facing adjacent negative electrodes. Alternatively, another exemplary envelope separator may envelope a negative electrode ("negative enveloping separator"), such that the separator has two interior sides facing the negative electrode and two exterior sides facing adjacent positive electrodes. In such enveloped separators, the bottom edge 103 may be a folded or a sealed crease edge. Further, the lateral edges 105a, 105b may be continuously or intermittently sealed seam edges. The edges may be bonded or sealed by adhesive, heat, ultrasonic welding, and/or the like, or any combination thereof.

Certain exemplary separators may be processed to form hybrid envelopes. The hybrid envelope may be provided by forming one or more slits or openings before, during or after, folding the separator sheet in half and bonding edges of the separator sheet together so as to form an envelope. The length of the openings may be at least 1/50th, 1/25th, 1/20th, 1/15th, 1/10th, 1/8th, 1/5th, 1/4th, or 1/3rd the length of the entire edge. The length of the openings may be 1/50th to 1/3rd, 1/25th to 1/3rd, 1/20th to 1/3rd, 1/20th to 1/4th, 1/15th to 1/4th, 1/15th to 1/5th or 1/10th to 1/5th the length of the entire edge. The hybrid envelope can have 1-5, 1-4, 2-4, 2-3 or 2 openings, which may or may not be equally disposed along the length of the bottom edge. It is preferred that no opening is in the corner of the envelope. The slits may be cut after the separator has been folded and sealed to give an envelope, or the slits may be formed prior to shaping the porous membrane into the envelope.

Some other exemplary embodiments of separator assembly configurations include: the ribs 104 facing a positive electrode; the ribs 104 facing a negative electrode; a negative or positive electrode envelope; a negative or positive electrode sleeve, a negative or positive electrode hybrid envelope; both electrodes may be enveloped or sleeved, and combinations thereof.

Composition

Exemplary embodiments of the present invention may have formulations substantially similar to that disclosed in U.S. patent application Ser. No. 15/482,293, filed on 7 Apr. 2017, which is incorporated herein by reference in its entirety.

The inventive separator is preferably a porous membrane made of natural or synthetic materials, such as polyolefin, polyethylene, polypropylene, phenolic resin, PVC, rubber, synthetic wood pulp (SWP), glass fibers, synthetic fibers, cellulosic fibers, or combinations thereof, more preferably a microporous membrane made from one or more thermoplastic polymers. The thermoplastic polymer may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, including ultrahigh molecular weight polyethylene (UHMWPE), and polypropylene. One preferred embodiment may include UHMWPE and a filler. In general, the preferred separator may be made by mixing, in an extruder, filler, thermoplastic polymer, and processing plasticizer. The processing plasticizer may be a processing oil, such as petroleum oil, paraffin-based mineral oil, mineral oil, and any combination thereof.

The microporous separator is preferably made of a polyolefin, such as polypropylene, ethylene-butene copolymer, and preferably polyethylene, more preferably high molecular weight polyethylene, i.e. polyethylene having a molecular weight of at least 600,000, even more preferably ultrahigh molecular weight polyethylene, i.e. polyethylene having a molecular weight of at least 1,000,000, in particular more than 4,000,000, and most preferably 5,000,000 to 8,000,000 (measured by viscosimetry and calculated by Margolie's equation), a standard load melt index of substantially 0 (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

In accordance with at least one embodiment, the separator is made up of an ultrahigh molecular weight polyethylene (UHMWPE) mixed with a processing oil and filler. In accordance with at least one other embodiment, the separator is made up of an ultrahigh molecular weight polyethylene (UHMWPE) mixed with a processing oil, additive and filler.

In certain selected embodiments, the separator can be prepared by combining, by weight, about 5-15% polymer, in some instances, about 10% polymer, about 10-60% filler, in some instances, about 30% filler, and about 30-80% processing oil, in some instances, about 60% processing oil. In other embodiments, the filler content is reduced, and the oil content is higher, for instance, greater than about 61%, 62%, 63%, 64%, 65%, 66%, 67%, 68%, 69% or 70% by weight. The filler:polymer ratio (by weight) can be about (or can be between about these specific ranges) such as 2:1, 2.5:1, 3:1, 3.5:1, 4.0:1. 4.5:1, 5.0:1, 5.5:1 or 6:1. The filler:polymer ratio (by weight) can be from about 1.5:1 to about 6:1, in some instances, 2:1 to 6:1, from about 2:1 to 5:1, from about 2:1 to 4:1, and in some instances, from about 2:1 to about 3:1.

Filler

The separator can contain a filler having a high structural morphology. Exemplary fillers can include: dry finely divided silica; precipitated silica; amorphous silica; highly friable silica; alumina; talc; fish meal; fish bone meal; and the like, and any combination thereof. In certain preferred embodiments, the filler is one or more silicas. High structural morphology refers to increased surface area. The filler can have a high surface area, for instance, greater than 100 $m^2/g$, 110 $m^2/g$, 120 $m^2/g$, 130 $m^2/g$, 140 $m^2/g$, 150 $m^2/g$, 160 $m^2/g$, 170 $m^2/g$, 180 $m^2/g$, 190 $m^2/g$, 200 $m^2/g$, 210 $m^2/g$, 220 $m^2/g$, 230 $m^2/g$, 240 $m^2/g$, or 250 $m^2/g$. In some embodiments, the filler (e.g., silica) can have a surface area from 100-300 $m^2/g$, 125-275 $m^2/g$, 150-250 $m^2/g$, or preferably 170-220 $m^2/g$. Surface area can be assessed using TriStar 3000™ for multipoint BET nitrogen surface area. High structural morphology permits the filler to hold more oil during the manufacturing process. For instance, a filler with high structural morphology has a high level of oil absorption, for instance, greater than about 150 ml/100 g, 175 ml/100 g, 200 ml/100 g, 225 ml/100 g, 250 ml/100 g, 275 ml/100 g, 300 ml/100 g, 325 ml/100 g, or 350 ml/100 g. In some embodiments the filler (e.g., silica) can have an oil absorption from 200-500 ml/100 g, 200-400 ml/100 g, 225-375 ml/100 g, 225-350 ml/100 g, 225-325 ml/100 g, preferably 250-300 ml/100 g. In some instances, a silica filler is used having an oil absorption of 266 ml/100 g. Such a silica filler has a moisture content of 5.1%, a BET surface area of 178 $m^2/g$, an average particle size of 23 μm, a sieve residue 230 mesh value of 0.1%, and a bulk density of 135 g/L.

Silica with relatively high levels of oil absorption and relatively high levels of affinity for mineral oil becomes desirably dispersible in the mixture of polyolefin (such as polyethylene) and mineral oil when forming a lead acid battery separator of the type shown herein. In the past, some separators have experienced the detriment of poor dispersibility caused by silica aggregation when large amounts of silica are used to make such separators or membranes. In at least certain of the inventive separators shown and described herein, the polyolefin, such as polyethylene, forms a shish-kebab structure, since there are few silica aggregations or agglomerates that inhibit the molecular motion of the polyolefin at the time of cooling the molten polyolefin. All of this contributes to improved ion permeability through the resulting separator membrane, and the formation of the shish-kebab structure or morphology means that mechanical strength is maintained or even improved while a lower overall ER separator is produced.

In some selected embodiments, the filler has an average particle size no greater than 25 µm, in some instances, no greater than 22 µm, 20 µm, 18 µm, 15 µm, or 10 µm. In some instances, the average particle size of the filler particles (such as silica) is 15-25 µm. The particle size of the silica filler contributes to the oil absorption of the silica and/or the surface area of the silica filler.

In some preferred embodiments, the silica used to make the inventive separators has an increased amount of or number of surface silanol groups (surface hydroxyl groups) compared with silica fillers used previously to make lead acid battery separators. For example, the silica fillers that may be used with certain preferred embodiments herein may be those silica fillers having at least 10%, at least 15%, at least 20%, at least 25%, at least 30%, or at least 35% more silanol and/or hydroxyl surface groups compared with known silica fillers used to make known polyolefin lead acid battery separators.

The ratio (Si—OH)/Si of silanol groups (Si—OH) to elemental silicon (Si) can be measured, for example, as follows.

1. Freeze-crush a polyolefin microporous membrane (where certain inventive membranes contain a certain variety of oil-absorbing silica according to the present invention), and prepare the powder-like sample for the solid-state nuclear magnetic resonance spectroscopy ($^{29}$Si-NMR).
2. Perform the $^{29}$Si-NMR to the powder-like sample, and observe the spectrums including the Si spectrum strength which is directly bonding to a hydroxyl group (Spectrum: $Q_2$ and $Q_3$) and the Si spectrum strength which is only directly bonding to an oxygen atom (Spectrum: $Q_4$), wherein the molecular structure of each NMR peak spectrum can be delineated as follows:
   $Q_3$: $(SiO)_3$—Si*—$(OH)_2$: having two hydroxyl groups
   $Q_3$: $(SiO)_3$—Si*—(OH): having one hydroxyl group
   $Q_4$: $(SiO)_4$—Si*: All Si bondings are SiO
   Where Si* is proved element by NMR observation.
3. The conditions for $^{29}$Si-NMR used for observation are as follows:
   Instrument: Bruker BioSpin Avance 500
   Resonance Frequency: 99.36 MHz
   Sample amount: 250 mg
   NMR Tube: 7 mφ
   Observing Method: DD/MAS
   Pulse Width: 45°
   Repetition time: 100 sec
   Scans: 800
   Magic Angle Spinning: 5,000 Hz
   Chemical Shift Reference: Silicone Rubber as −22.43 ppm (External Ref)
4. Numerically, separate peaks of the spectrum, and calculate the area ratio of each peak belonging to $Q_2$, $Q_3$ and $Q_4$. After that, based on the ratios, calculate the molar ratio of hydroxyl groups (—OH) bonding directly to Si. The conditions for the numerical peak separation is conducted in the following manner:
   Fitting region: −80 to −130 ppm
   Initial peak top: −93 ppm for $Q_2$, −101 ppm for $Q_3$, −111 ppm for $Q_4$, respectively.
   Initial full width half maximum: 400 Hz for $Q_2$, 350 Hz for $Q_3$, 450 Hz for $Q_4$, respectively.
   Gaussian function ratio: 80% at initial and 70 to 100% while fitting.
5. The peak area ratios (Total is 100) of $Q_2$, $Q_3$, and $Q_4$ are calculated based on the each peak obtained by fitting. The NMR peak area corresponded to the molecular number of each silicate bonding structure (thus, for the $Q_4$ NMR peak, four Si—O—Si bonds are present within that silicate structure; for the $Q_3$ NMR peak, three Si—O—Si bonds are present within that silicate structure while one Si—OH bond is present; and for the $Q_2$ NMR peak, two Si—O—Si bonds are present within that silicate structure while two Si—OH bonds are present). Therefore each number of the hydroxyl group (—OH) of $Q_2$, $Q_3$, and $Q_4$ is multiplied by two (2) one (1), and zero (0), respectively. These three results are summed. The summed value displays the mole ratio of hydroxyl groups (—OH) directly bonding to Si.

In some selected embodiments, use of the fillers described above permits the use of a greater proportion of processing oil during the extrusion step. As the porous structure in the separator is formed, in part, by removal of the oil after the extrusion, higher initial absorbed amounts of oil results in higher porosity or higher void volume. While processing oil is an integral component of the extrusion step, oil is a non-conducting component of the separator. Residual oil in the separator protects the separator from oxidation when in contact with the positive electrode. The precise amount of oil in the processing step may be controlled in the manufacture of conventional separators. Generally speaking, conventional separators are manufactured using 50-70% processing oil, in some embodiments, 55-65%, in some embodiments, 60-65%, and in some embodiments, about 62% by weight processing oil. Reducing oil below about 59% is known to cause burning due to increased friction against the extruder components. However, increasing oil much above the prescribed amount may cause shrinking during the drying stage, leading to dimensional instability. Although previous attempts to increase oil content resulted in pore shrinkage or condensation during the oil removal, separators prepared as disclosed herein exhibit minimal, if any, shrinkage and condensation during oil removal. Thus, porosity can be increased without compromising pore size and dimensional stability, thereby decreasing electrical resistance.

In certain selected embodiments, the use of the filler described above allows for a reduced final oil concentration in the finished separator. Since oil is a non-conductor, reducing oil content can increase the ionic conductivity of the separator and assist in lowering the ER of the separator. As such, separators having reduced final oil contents can have increased efficiency. In certain selected embodiments are provided separators having a final processing oil content (by weight) less than 20%, for example, between about 14% and 20%, and in some particular embodiments, less than 19%, 18%, 17%, 16%, 15%, 14%, 13%, 12%, 11%, 10%, 9%, 8%, 7%, 6%, or 5%.

Friability

In accordance with at least one embodiment, the separator is made up of polyethylene, such as an ultrahigh molecular weight polyethylene ("UHMWPE"), mixed with a processing oil and filler as well as any desired additive. In accordance with at least one other embodiment, the separator is made up of an ultrahigh molecular weight polyethylene (UHMWPE) mixed with a processing oil and talc. In accordance with at least one other embodiment, the separator is made up of UHMWPE mixed with a processing oil and silica, for instance, precipitated silica, for instance, amorphous precipitated silica. The additive can then be applied to the separator via one or more of the techniques described above.

Besides reducing electrical resistance and increasing cold cranking amps, preferred separators are also designed to bring other benefits. With regard to assembly, the separators are more easily passed through processing equipment, and therefore more efficiently manufactured. To prevent shorts during high speed assembly and later in life, the separators have superior puncture strength and oxidation resistance when compared to standard PE separators. Combined with reduced electrical resistance and increased cold cranking amps, battery manufacturers are likely to find improved and sustained electrical performance in their batteries with these new separators.

In certain select embodiments, exemplary separators may utilize a silica with a higher friability as compared to that used in commercially available separators. Silica with a high friability is believed to increase the dispersibility of the silica within the separator, which in turn allows for more oil to penetrate the separator during formation, and, upon oil extraction, leads to a better distribution of pores within the separator. Lower primary silica particle size is believed to result in greater particle aggregation, which leads to increased oil absorption. This leads to a lower average pore size and high pore volume with a low and narrow particle size distribution. A possibly preferred embodiment has a high silica modulus ($SiO_2/Na_2O$) and a greater concentration of sodium silicate during silica processing.

Figure 32A:
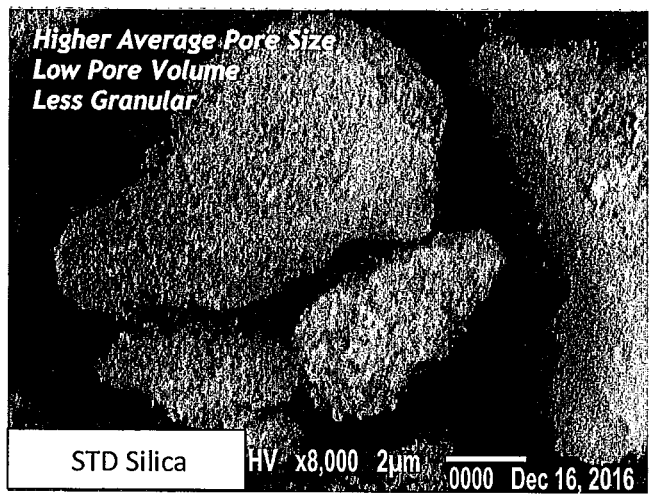
FIG. 32A depicts the size of a standard silica used with commercially available separators.
Figure 32B:
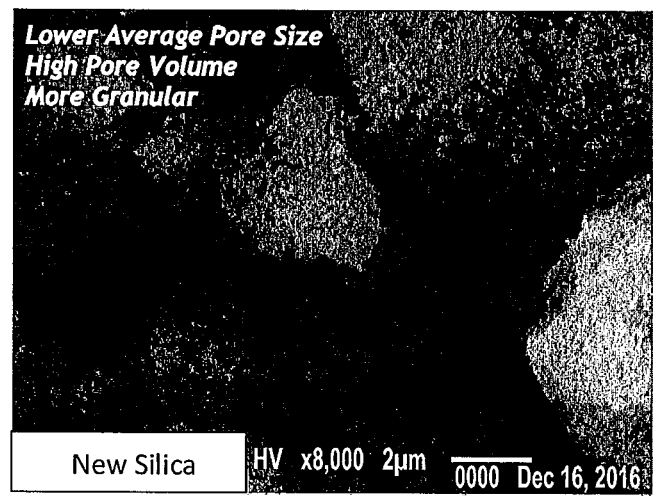
FIG. 32B depicts the size of a silica used in an inventive embodiment of the present invention.
Figure 33:
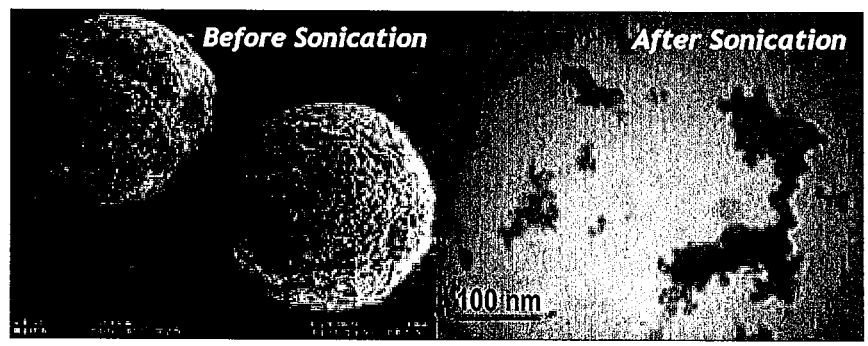
FIG. 33 shows the size of a new silica before and after sonication.
Figures 34A, 34B:
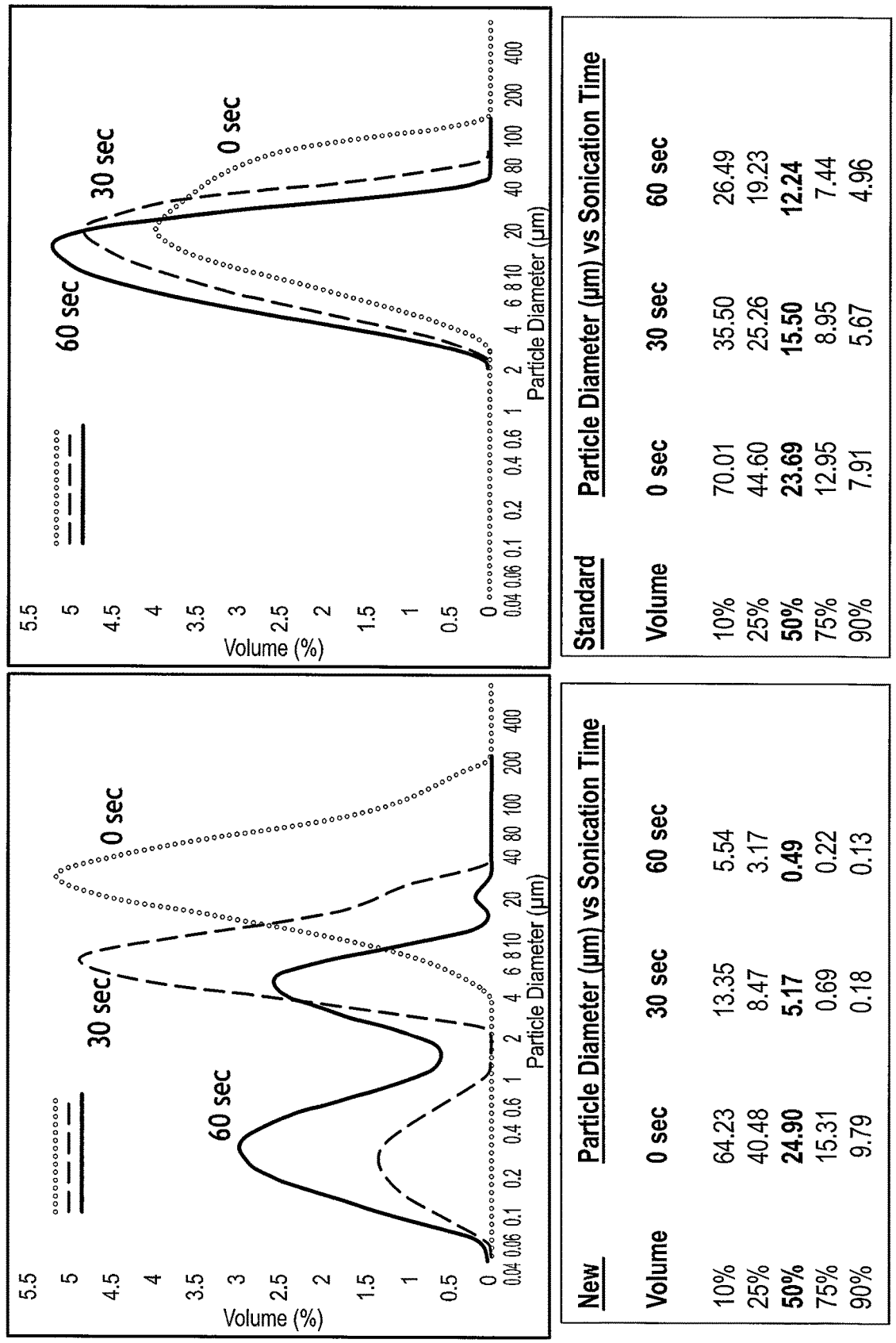
FIG. 34A shows the silica size before and after sonication of a silica used in a commercially available separator.
FIG. 34B shows the silica size before and after sonification of a silica used in an inventive embodiment separator. (See lower tables for tabulated format).

FIG. 32 depicts the size of a standard silica with that of a silica used in an inventive embodiment of the present invention. As can be seen, the new silica possesses a lower particle size. One way to determine the friability of the silica is to subject the silica to an ultrasonic frequency (over 20 kHz). FIG. 33 shows the silica size before and after ultra-sonication, and FIG. 34 depicts the particle size distribution of the new silica and standard silica before ultra-sonication and after 30 seconds and 60 seconds of ultra-sonication.

Exemplary separators in accordance with the present disclosure also show superior shrinkage values in $H_2SO_4$. Table 1, below, shows these values.

TABLE 1

| Sample | Average | Minimum | Maximum | Standard Deviation |
| --- | --- | --- | --- | --- |
| Sample #1 | −1.4% | −2.1% | −0.6% | 0.3 |
| Sample #2 | −1.2% | −1.6% | −0.7% | 0.2 |

In certain selected embodiments, the filler can be an alumina, talc, silica, or a combination thereof. In some embodiments, the filler can be a precipitated silica, and in some embodiments, the precipitated silica is amorphous silica. In some embodiments, it is preferred to use aggregates and/or agglomerates of silica which allow for a fine dispersion of filler throughout the separator, thereby decreasing tortuosity and electrical resistance. In certain preferred embodiments, the filler (e.g., silica) is characterized by a high level of friability. Good friability enhances the dispersion of the filler throughout the polymer during extrusion of the microporous membrane, enhancing porosity and thus overall ionic conductivity through the separator.

Friability may be measured as the ability, tendency or propensity of the silica particles or material (aggregates or agglomerates) to be broken down into smaller sized and more dispersible particles, pieces or components. As shown on the left side of FIG. 34, the NEW silica is more friable (is broken down into smaller pieces after 30 seconds and after 60 seconds of ultra-sonication) than the STANDARD silica. For example, the NEW silica had a 50% volume particle diameter of 24.90 um at 0 seconds ultra-sonication, 5.17 um at 30 seconds and 0.49 um at 60 seconds. Hence, at 30 seconds ultra-sonication there was over a 50% reduction in size (diameter) and at 60 seconds there was over a 75% reduction in size (diameter) of the 50% volume silica particles. Hence, one possibly preferred definition of "high friability" may be at least a 50% reduction in average size (diameter) at 30 seconds of ultra-sonication and at least a 75% reduction in average size (diameter) at 60 seconds of ultra-sonication of the silica particles (or in processing of the resin silica mix to form the membrane). In at least certain embodiments, it may be preferred to use a more friable silica, and may be even more preferred to use a silica that is friable and multi-modal, such as bi-modal or tri-modal, in its friability. With reference to FIG. 34, the STANDARD silica appears single modal in it friability or particle size distribution, while the NEW silica appears more friable, and bi-modal (two peaks) at 30 seconds ultra-sonication and tri-modal (three peaks) at 60 seconds ultra-sonication. Such friable and multi-modal particle size silica or silicas may provide enhanced membrane and separator properties.

The use of a filler having one or more of the above characteristics enables the production of a separator having a higher final porosity. The separators disclosed herein can have a final porosity greater than 60%, 61%, 62%, 63%, 64%, 65%, 66%, 67%, 68%, 69%, or 70%. Porosity may be measured using gas adsorption methods. Porosity can be measured by BS-TE-2060.

In some selected embodiments, the microporous separator can have a greater proportion of larger pores while maintaining the average pore size no greater than about 1 μm, 0.9 μm, 0.8 μm, 0.7 μm, 0.6 μm, 0.5 μm, or 0.1 μm.

Additives

The separator may contain one or more performance enhancing additives, such as surfactants, wetting agents, colorants, antistatic additives, antioxidants, and/or the like, and combinations thereof. The performance enhancing additive may preferably be a surfactant. Certain suitable surfactants are nonionic while other suitable surfactants are anionic. The use of these certain suitable surfactants in conjunction with the inventive separators described herein can lead to even further improved separators that, when used in a lead acid battery, lead to reduced water loss for that lead acid battery. Suitable surfactants include surfactants such as salts of alkyl sulfates; alkylarylsulfonate salts; alkylphenol-alkylene oxide addition products; soaps; alkyl-naphthalenesulfonate salts; one or more sulfo-succinates, such as an anionic sulfo-succinate; dialkyl esters of sulfo-succinate salts; quaternary amines; block copolymers of ethylene oxide and propylene oxide; and salts of mono and dialkyl phosphate esters. The additive can be a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

The battery separators can be provided in various ways with the additive(s), agent(s), and/or filler(s). The additive or additives can for example be applied to the separator when it is finished (e.g., after the extraction of the plasticizer (e.g., processing oil)) and/or added to the mixture used to extrude and ultimately produce the separator. According to certain preferred embodiments, the additive or a solution of the additive is applied to the surface of the separator. This variant is suitable in particular for the application of non-thermostable additives and additives which are soluble in the solvent used for the subsequent extraction. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the separator. Application can also take place during the extraction of the pore forming agent while in a solvent bath.

Certain embodiments of separators according to the present invention do not incorporate an additive such as a non-ionic surfactant or anionic surfactant. In other embodiments, an additive (such as a non-ionic surfactant, or an anionic surfactant) can be present at a density of at least 0.5 g/m², 1.0 g/m², 1.5 g/m², 2.0 g/m², 2.5 g/m², 3.0 g/m², 3.5 g/m², 4.0 g/m², 4.5 g/m², 5.0 g/m², 5.5 g/m², 6.0 g/m², 6.5 g/m², 7.0 g/m², 7.5 g/m², 8.0 g/m², 8.5 g/m², 9.0 g/m², 9.5 g/m², or 10.0 g/m². The additive can be present on the separator at a density between 0.5-10 g/m², 1.0-10.0 g/m², 1.5-10.0 g/m², 2.0-10.0 g/m², 2.5-10.0 g/m², 3.0-10.0 g/m², 3.5-10.0 g/m², 4.0-10.0 g/m², 4.5-10.0 g/m², 5.0-10.0 g/m², 5.5-10.0 g/m², 6.0-10.0 g/m², 6.5-10.0 g/m², 7.0-10.0 g/m², 7.5-10.0 g/m², 5.0-10.5 g/m², 5.0-11.0 g/m², 5.0-12.0 g/m², or 5.0-15.0 g/m².

The application may also take place by dipping the battery separator in the additive or a solution of the additive (solvent bath addition) and subsequently optionally removing the solvent, e.g. by drying. In this way the application of the additive can be combined for example with the extraction often applied during separator production. Other preferred methods are to spray the surface with additive or roller coat or curtain coat additives on the surface of separator.

Another preferred option is to mix the additive or additives into the mixture of thermoplastic polymer and optionally fillers and other agents or additives which is used to produce the battery separators. The additive-containing homogeneous mixture is then formed into a web-shaped material.

In certain embodiments, exemplary separators may contain one or more performance enhancing additives. The performance enhancing additive may be surfactants, wetting agents, colorants, antistatic additives, UV-protection additives, antioxidants, and/or the like, and any combination thereof.

Certain suitable surfactants are non-ionic while other suitable surfactants are anionic. The additive can be a single surfactant or a mixture of two or more surfactants, for instance two or more anionic surfactants, two or more non-ionic surfactants, or at least one ionic surfactant and at least one non-ionic surfactant. Selected suitable surfactants may have HLB values less than 6, preferably less than 3. The use of these certain suitable surfactants in conjunction with the inventive separators described herein can lead to even further improved separators that, when used in a lead acid battery, lead to reduced water loss, reduced antimony poisoning, improved cycling, reduced float current, reduced float potential, and/or the like, or any combination thereof for that lead acid batteries. Suitable surfactants include surfactants such as salts of alkyl sulfates; alkylarylsulfonate salts; alkylphenol-alkylene oxide addition products; soaps; alkyl-naphthalene-sulfonate salts; one or more sulfo-succinates, such as an anionic sulfo-succinate; dialkyl esters of sulfo-succinate salts; amino compounds (primary, secondary or tertiary amines; quaternary amines; block copolymers of ethylene oxide and propylene oxide; various polyethylene oxides; and salts of mono and dialkyl phosphate esters. The additive can include a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments described herein, a reduced amount of, or even very little to no anionic or non-ionic surfactant is added to the inventive separator. In such instances, the ER of the inventive separator may be slightly higher than an inventive separator comprising more of the anionic or non-ionic surfactant; however, the combination of the lower ER versus known separators combined with the desirable feature of lowered total organic carbons (because of the lower amount of surfactant) may produce a desirable inventive separator according to such embodiment.

In certain embodiments, the additive can be represented by a compound of Formula (I)

$$R(OR^1)_n(COOM_{1/x}{}^{x+})_m \quad\quad (I)$$

in which:
R is a non-aromatic hydrocarbon radical with 10 to 4200 carbon atoms, preferably 13 to 4200, which can be interrupted by oxygen atoms;
$R_1$=H, —$(CH_2)_k COOM^{x+}{}_{1/x}$ or —$(CH_2)_k$—$SO_3M^{x+}{}_{1/x}$, preferably H, where k=1 or 2;
M is an alkali metal or alkaline-earth metal ion, $H^+$ or $NH_4{}^+$, where not all the variables M simultaneously have the meaning $H^+$;
n=0 or 1;
m=0 or an integer from 10 to 1400; and
x=1 or 2.

The ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals can be interrupted by oxygen atoms, i.e. contain one or more ether groups.

R is preferably a straight-chain or branched aliphatic hydrocarbon radical which can be interrupted by oxygen atoms. Saturated, uncross-linked hydrocarbon radicals are quite particularly preferred.

Through the use of the compounds of Formula (I) for the production of battery separators, they can be effectively protected against oxidative destruction.

Battery separators are preferred which contain a compound according to Formula (I) in which:
R is a hydrocarbon radical with 10 to 180, preferably 12 to 75 and quite particularly preferably 14 to 40 carbon atoms, which can be interrupted by 1 to 60, preferably 1 to 20 and quite particularly preferably 1 to 8 oxygen atoms, particularly preferably a hydrocarbon radical of formula $R^2$—$[(OC_2H_4)p(OC_3H_6)_q]$—, in which:

$R^2$ is an alkyl radical with 10 to 30 carbon atoms, preferably 12 to 25, particularly preferably 14 to 20 carbon atoms;

P is an integer from 0 to 30, preferably 0 to 10, particularly preferably 0 to 4; and q is an integer from 0 to 30, preferably 0 to 10, particularly preferably 0 to 4;

compounds being particularly preferred in which the sum of p and q is 0 to 10, in particular 0 to 4;

n=1; and m=0.

Formula $R^2-[(OC_2H_4)_p(OC_3H_6)_q]-$ is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)_2$ and/or $OCH_2CH_2CH_3$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which:

R is an alkane radical with 20 to 4200, preferably 50 to 750 and quite particularly preferably 80 to 225 carbon atoms;

M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$;

n=0;

m is an integer from 10 to 1400; and x=1 or 2.

In certain embodiments, suitable additives may include, in particular, polyacrylic acids, polymethacrylic acids and acrylic acid-methacrylic acid copolymers, whose acid groups are at least partly neutralized, such as by preferably 40%, and particularly preferably by 80%. The percentage refers to the number of acid groups. Quite particularly preferred are poly(meth)acrylic acids which are present entirely in the salt form. Suitable salts include Li, Na, K, Rb, Be, Mg, Ca, Sr, Zn, and ammonium ($NR_4$, wherein R is either hydrogen or a carbon functional group). Poly(meth) acrylic acids may include polyacrylic acids, polymethacrylic acids, and acrylic acid-methacrylic acid copolymers. Poly (meth)acrylic acids are preferred and in particular polyacrylic acids with an average molar mass $M_w$ of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40% by weight and preferably at least 80% by weight (meth) acrylic acid monomer; the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable. In addition, a coating and/or additive to enhance the separator may include, for example, a metal alkoxide, wherein the metal may be, by way of example only (not intended to be limiting), Zn, Na, or Al, by way of example only, sodium ethoxide.

In some cases, the additive can include a metal salt. Exemplary metal salts include zinc and bismuth compounds, including mixtures thereof. Suitable counter ions include sulfate, hydroxide, phosphate, tetrafluoroborate and fluoride.

In some embodiments, the metal salt can be a sulfate salt such as $ZnSO_4$ or $Bi_2(SO_4)_3$. Unless specified otherwise, the term "$ZnSO_4$" includes the anhydrous salt as well as hydrates/solvates thereof, such as $ZnSO_4.7H_2O$.

The metal salt can be present at a density of at least about 0.5 g/m², 1.0 g/m², 1.5 g/m², 2.0 g/m², 2.5 g/m², 3.0 g/m², 3.5 g/m², 4.0 g/m², 4.5 g/m², 5.0 g/m², 5.5 g/m², 6.0 g/m², 6.5 g/m², 7.0 g/m², 7.5 g/m², 8.0 g/m², 8.5 g/m², 9.0 g/m², 9.5 g/m² or 10.0 g/m². The metal salt can be present on the separator at a density between about 0.5-10 g/m², 0.5-8.0 g/m², 0.5-7.0 g/m², 1.0-7.0 g/m², 1.0-6.0 g/m², 2.0-6.0 g/m², 2-5 g/m², 2-4.0 g/m², 2.5-4.0 g/m², or 2.5-3.5.0 g/m². In some embodiments, the metal salt is present at a density of about 3.0 g/m².

The microporous polyolefin can be provided in various ways with the additive or additives. The additives can for example be applied to the polyolefin when it is finished (i.e. after the extraction) or added to the mixture used to produce the polyolefin. According to a preferred embodiment the additive or a solution of the additive is applied to the surface of the polyolefin. This variant is suitable in particular for the application of non-thermostable additives and additives which are soluble in the solvent used for the subsequent extraction. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the separator.

In some embodiments, the microporous polyolefin porous membrane may include a coating on one or both sides of such layer. Such a coating may include a surfactant or other material. In some embodiments, the coating may include one or more materials described, for example, in U.S. Patent Publication No. 2012/0094183, which is incorporated by reference herein. Such a coating may, for example, reduce the overcharge voltage of the battery system, thereby extending battery life with less grid corrosion and preventing dry out and/or water loss.

The application may also take place by dipping the microporous membrane in the additive or a solution of the additive and subsequently optionally removing the solvent, e.g. by drying. In this way the application of the additive can be combined for example with the extraction often applied during separator production.

Another preferred option is to mix the additive or additives into the mixture of thermoplastic polymer and optionally fillers and other additives which is used to produce the porous membrane. The additive-containing homogeneous mixture is then formed into a web-shaped material.

Diffusion

Figure 27:
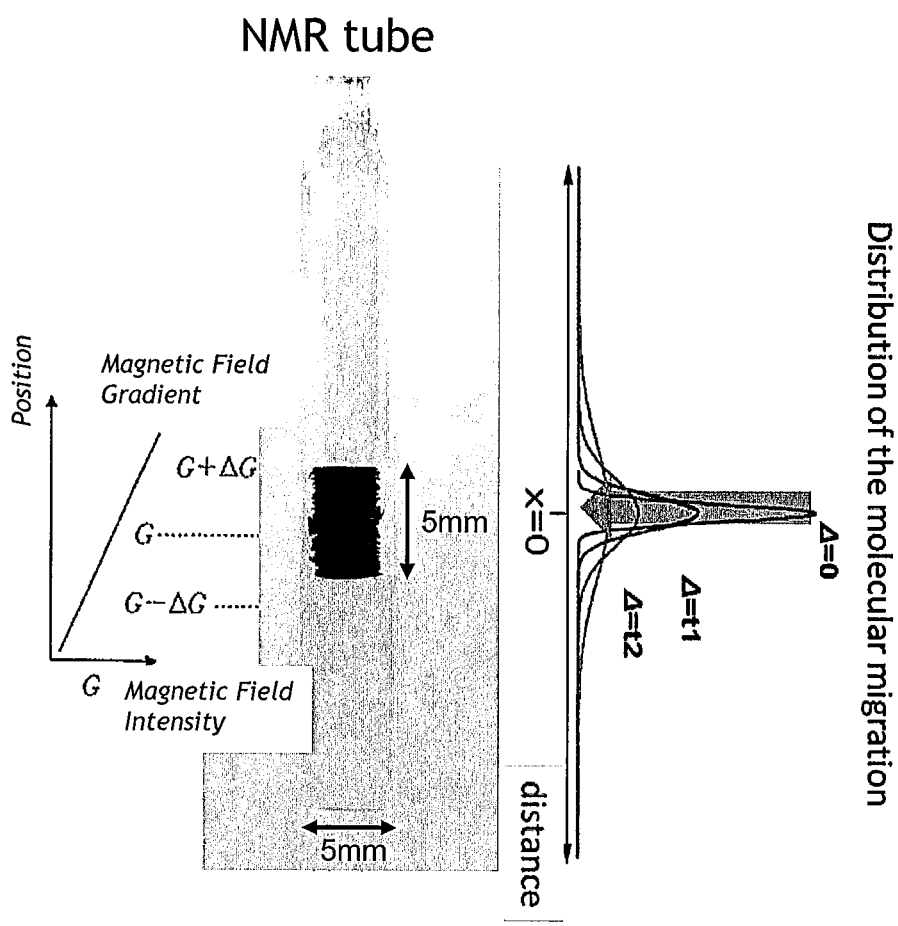
FIG. 27 shows a Nuclear Magnetic Resonance ("NMR") tube with separator samples submerged in $D_2O$.

In certain select embodiments, exemplary separators may be defined as having a higher diffusion rate. The diffusion rate may be measured as the rate at which an ion is able to pass through a separator, thus describing the ionic flow rate through a separator. It is believed that the higher the porosity of a separator, the higher the diffusion coefficient. $D_2O$ diffusion may be analyzed using Pulsed Field Gradient Spin Echo ("PFGSE"). To determine the diffusion coefficient, separator samples are pre-soaked in $D_2O$ with the oil having not been extracted from the separator samples. The separator samples are stacked in a Nuclear Magnetic Resonance ("NMR") tube submerged in $D_2O$ as generally shown in FIG. 27. The NMR tube is placed under a vacuum to remove any air bubbles, and the diffusion coefficient in the vertical direction (through the separator samples) is monitored.

The diffusion may be calculated using the Stejskal Equation, below:

$$E(\delta, g, \Delta) = \ln\frac{E}{E_0} = -\gamma^2 g^2 \delta^2 D(\Delta - \delta/3)$$

where,

E: NMR signal peak intensity
γ: magnetic spin ratio (depends upon nuclides)
g: magnetic field gradient
δ: applying time of field gradient and, $$D_e = \varepsilon/\tau \times D_0$$

where, $D_e$: diffusion coefficient of a molecule inside the separator
$D_0$: diffusion coefficient of a molecule in solution
ε: porosity
τ: index of pore tortuosity.

Table 2, below, shows various diffusion coefficient values at −10° C. and 30° C., for a control separator, an inventive embodiment, and 4 commercially available separators at Δ=20 ms.

TABLE 2

| Sample | −10° C. | 30° C. |
| --- | --- | --- |
| Control Separator | $1.7 \times 10^{-10}$ | $9.1 \times 10^{-10}$ |
| Inventive Embodiment | $1.6 \times 10^{-10}$ | $8.8 \times 10^{-10}$ |
| Commercial Separator #1 | $1.7 \times 10^{-10}$ | $9.0 \times 10^{-10}$ |
| Commercial Separator #2 | $1.8 \times 10^{-10}$ | $9.0 \times 10^{-10}$ |
| Commercial Separator #3 | $2.1 \times 10^{-10}$ | $1.1 \times 10^{-10}$ |
| Commercial Separator #4 | $1.6 \times 10^{-10}$ | $8.6 \times 10^{-10}$ |

Figure 28:
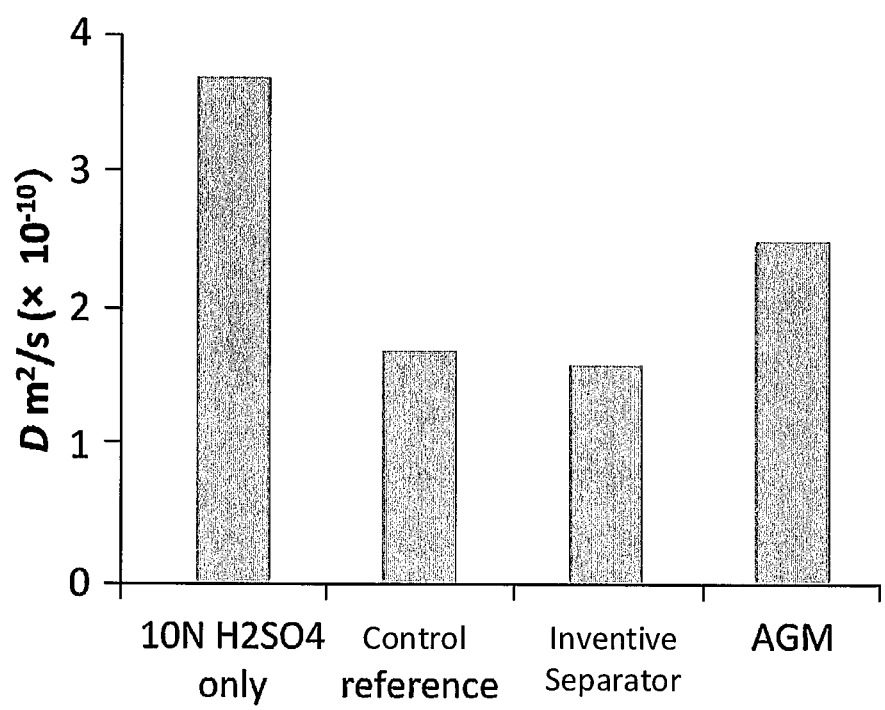
FIG. 28 shows the diffusion coefficients at −10° C. at Δ=20 ms for a solution of $H_2SO_4$ only, a reference separator, an inventive embodiment separator, and an AGM separator.

FIG. 28 shows the diffusion coefficients at −10° C. at Δ=20 ms for a solution of $H_2SO_4$ only, a reference separator, an inventive embodiment separator, and an AGM separator.

Figure 29A:
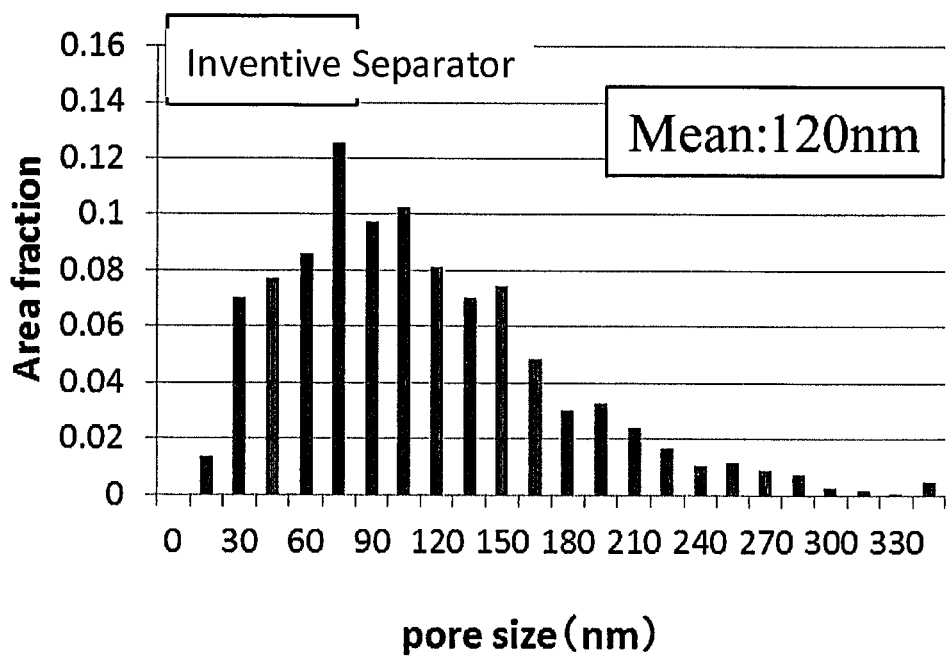
FIG. 29A illustrates a pore size distribution of an inventive embodiment separator.
Figure 29B:
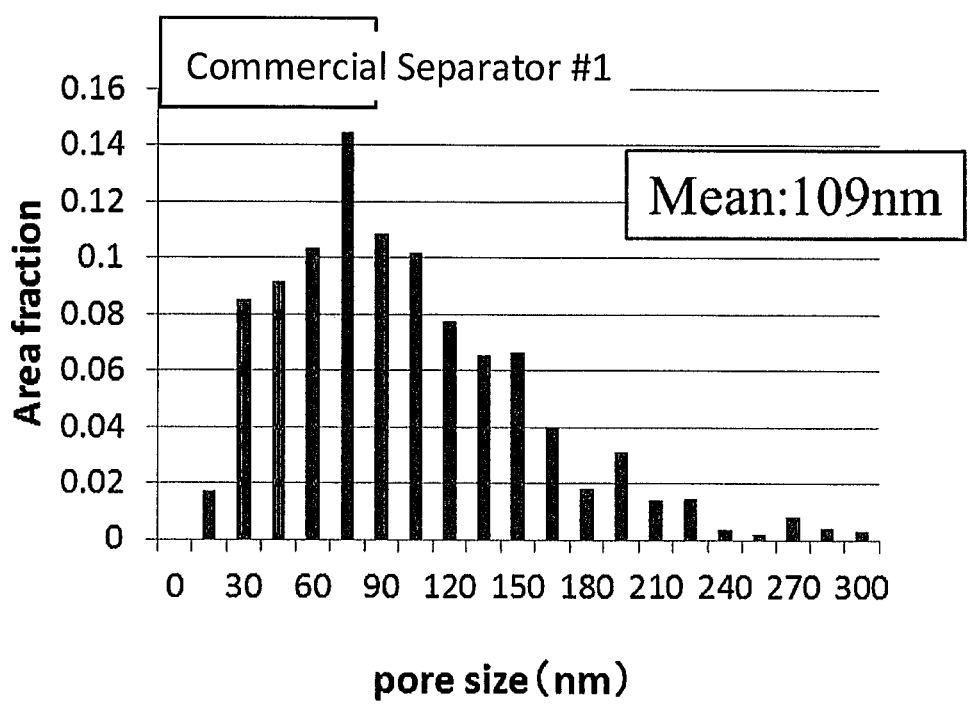
FIG. 29B illustrates a pore size distribution of a commercially available separator.

FIG. 29 illustrates a pore size distribution of an inventive embodiment compared to the commercially available separator #1. This shows that the inventive embodiment has a mean pore size of 120 nm, while the commercially available separator has a mean pore size of only 109 nm.

Figure 30:
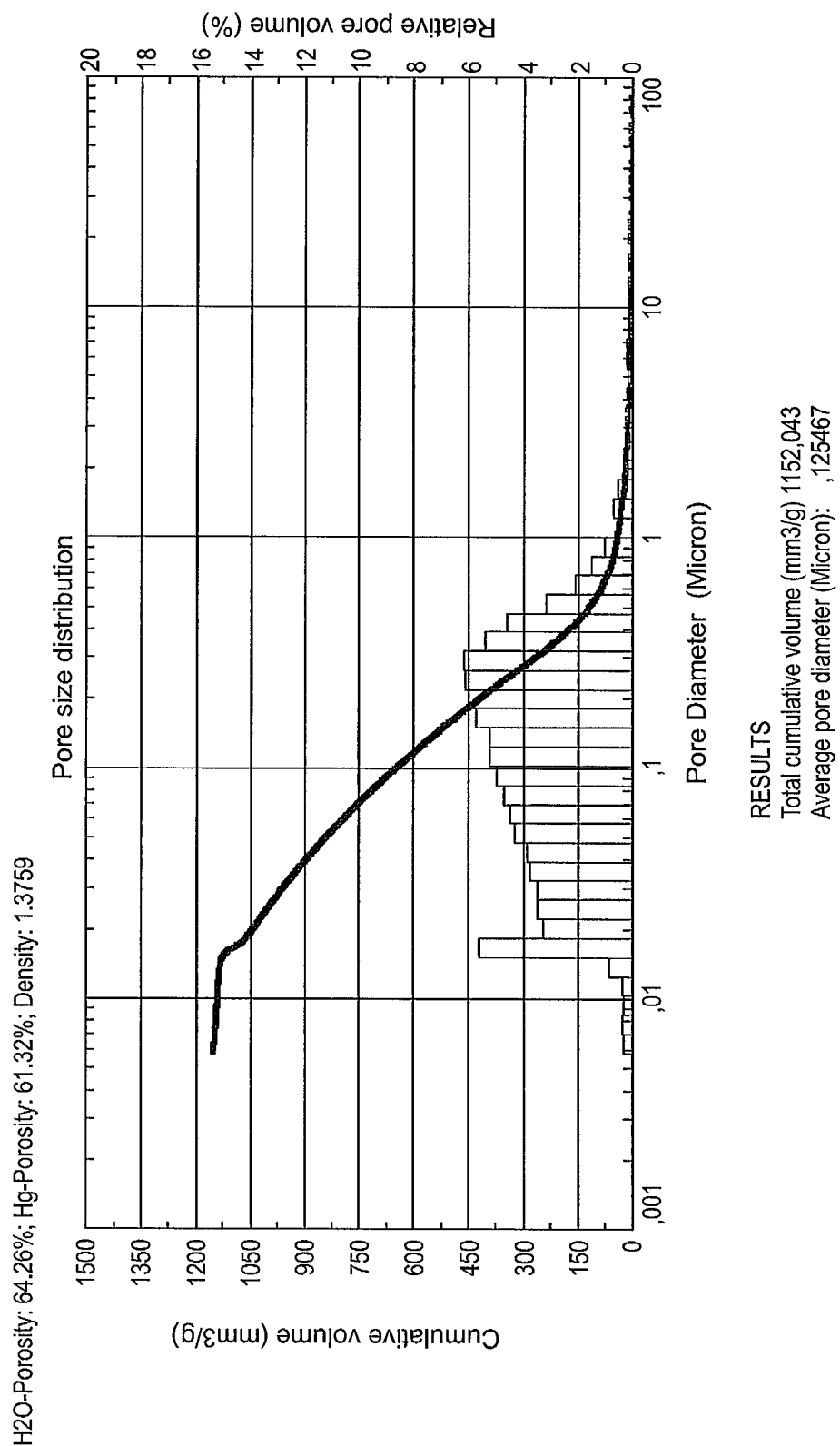
FIG. 30 depicts the pore diameter distribution of an inventive embodiment separator.
Figure 31:
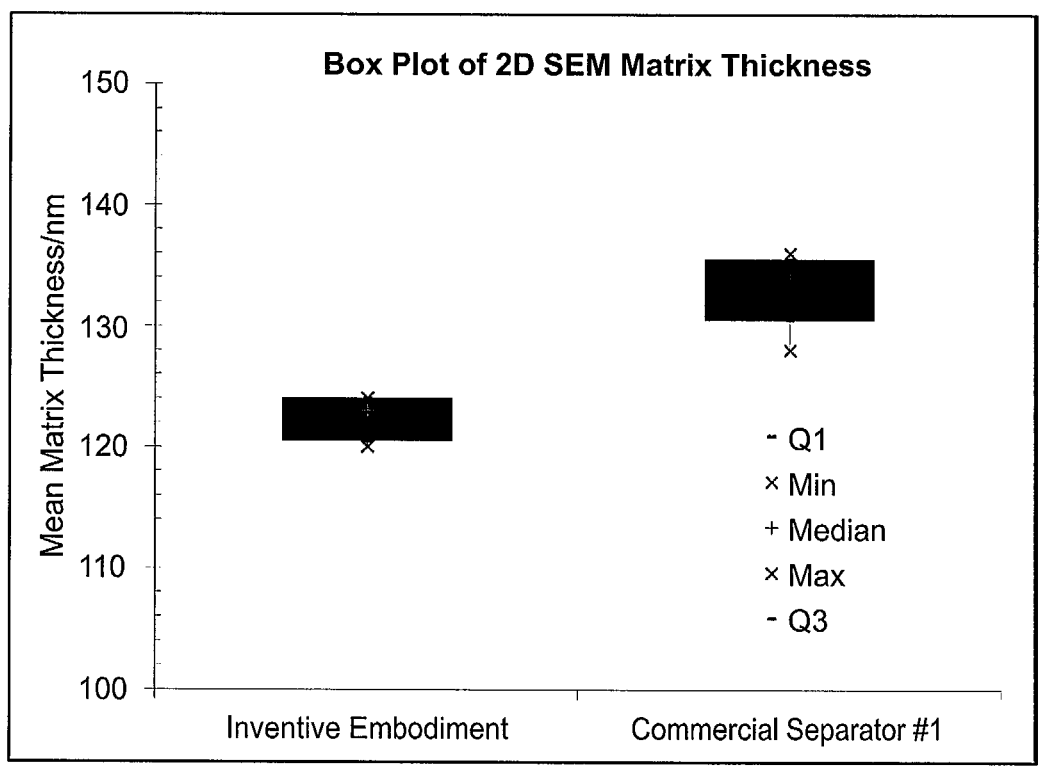
FIG. 31 is a chart that describes the dispersion of a new silica filler within an inventive embodiment separator and a standard silica within a commercially available separator.

FIG. 30 depicts the pore diameter distribution of an inventive embodiment separator. FIG. 31 illustrates a chart that describes the dispersion of a new silica filler within an inventive embodiment separator and a standard silica within a commercially separator #1. Where the box plot represents the distribution between the $25^{th}$ percentile (Q1) and the $75^{th}$ percentile (Q3). In this chart, the lower the values, the better the silica distribution.

Electrical Resistance

In certain selected embodiments, the disclosed separators exhibit decreased electrical resistance, for instance, an electrical resistance no greater than about 200 mΩ·cm², 180 mΩ·cm², 160 mΩ·cm², 140 mΩ·cm², 120 mΩ·cm², 100 mΩ·cm², 80 mΩ·cm², 60 mΩ·cm², 50 mΩ·cm², 40 mΩ·cm², 30 Ω·cm², or 20 mΩ·cm². In various embodiments, the separators described herein exhibit about a 20% or more reduction in ER compared with a known separator of the same thickness. For example, a known separator may have an ER value of 60 mΩ·cm²; thus, a separator according to the present invention at the same thickness would have an ER value of less than about 48 mΩ·cm².

To test a sample separator for ER testing evaluation in accordance with the present invention, it must first be prepared. To do so, a sample separator is preferably submerged in a bath of demineralized water, the water is then brought to a boil and the separator is then removed after 10 minutes in the boiling demineralized water bath. After removal, excess water is shaken off the separator and then placed in a bath of sulfuric acid having a specific gravity of 1.280 at 27° C.±1° C. The separator is soaked in the sulfuric acid bath for 20 minutes. The separator is then ready to be tested for electrical resistance.

Puncture Resistance

In certain selected embodiments, exemplary separators may be characterized with an increased puncture resistance. For instance a puncture resistance of approximately 9 N or higher, 9.5 N or higher, 10 N or higher, 10.5 N or higher, 11 N or higher, 11.5 N or higher 12 N or higher, 12.5 N or higher, 13 N or higher, 13.5 N or higher, 14 N or higher, 14.5 N or higher, 15 N or higher, 15.5 N or higher, 16 N or higher, 16.5 N or higher, 17 N or higher, 17.5 N or higher, 18 N or higher, 18.5 N or higher, 19 N or higher, 19.5 N or higher, or 20 N or higher. In certain embodiments, exemplary separators may be preferably defined with a puncture resistance of approximately 9 N-20 N or higher, or more preferably approximately 12 N-20 N or higher.

Figure 25:
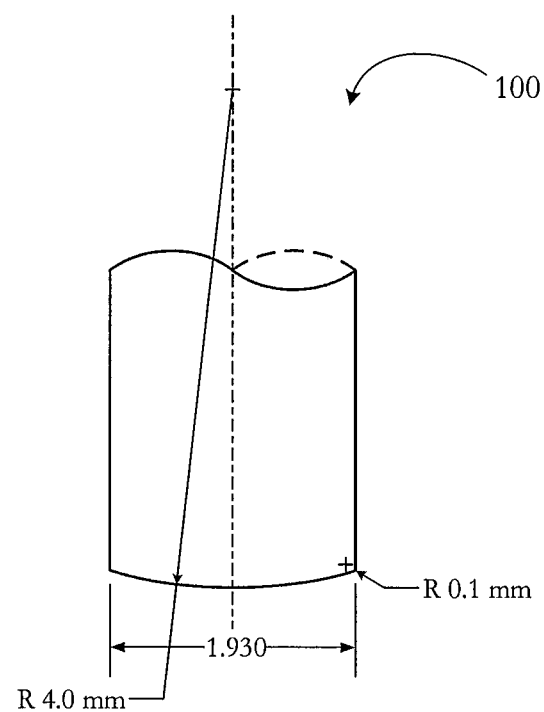
FIG. 25 illustrates a tip used to puncture test separators.
Figure 26A:
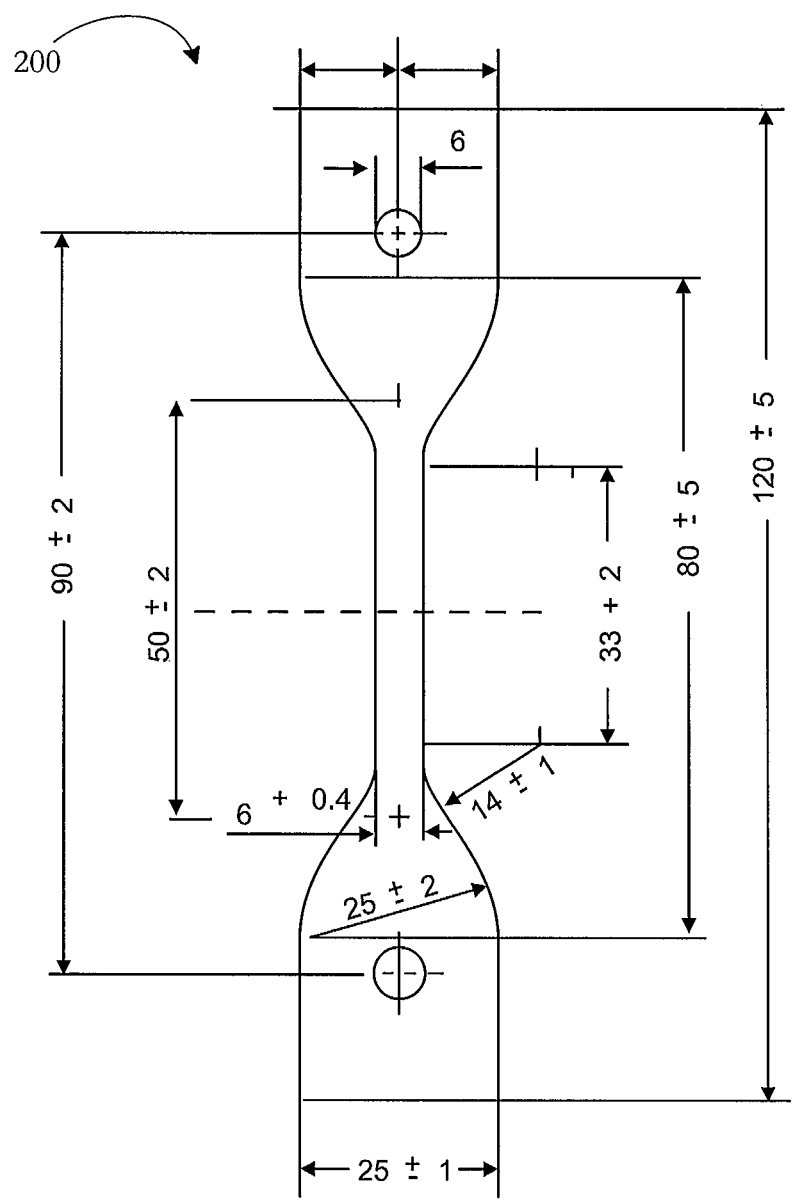
FIG. 26A is a schematic rendering of an elongation test sample.
Figure 26B:
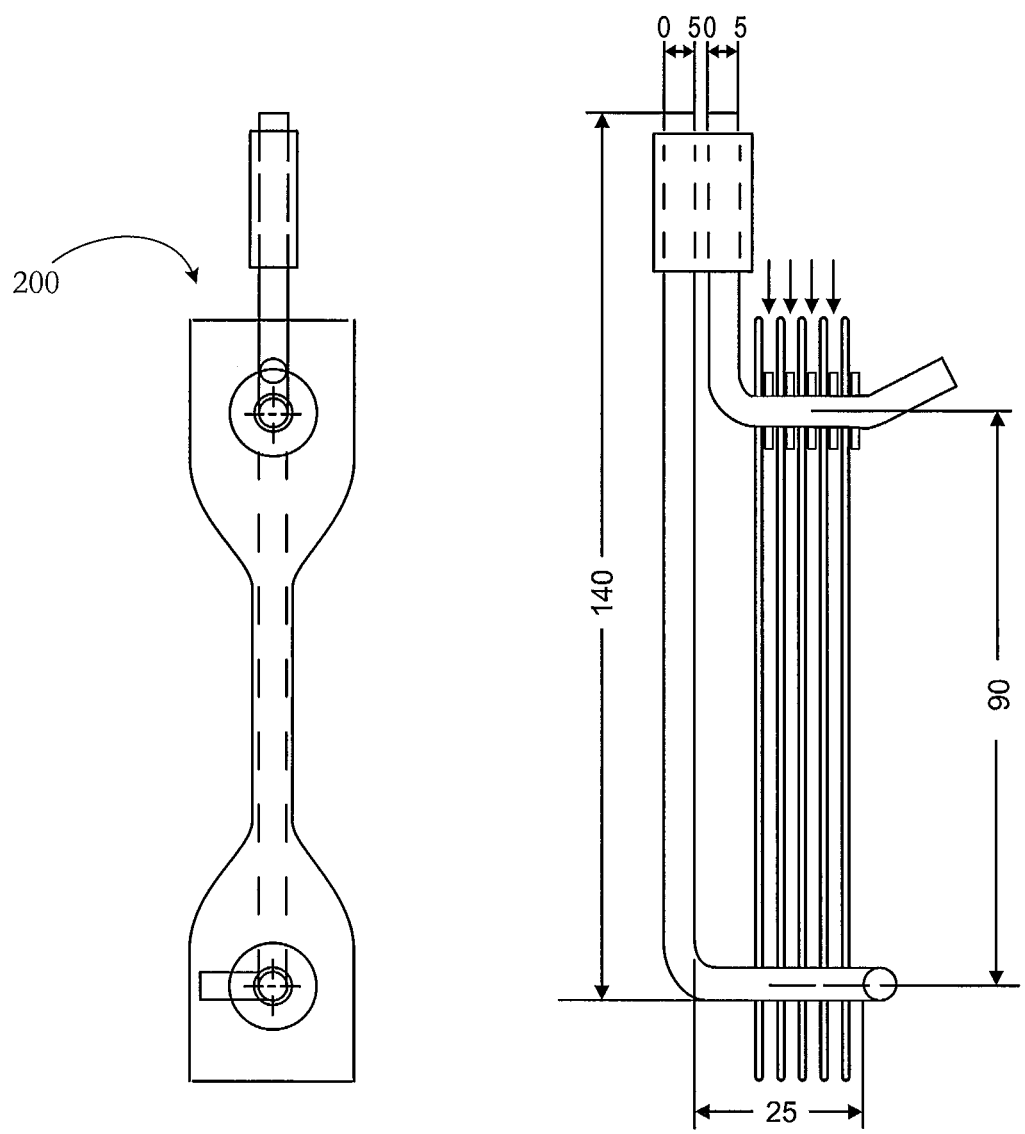
FIG. 26B illustrates a sample holder for an elongation test.

The puncture resistance may be measured as the force required to puncture the porous membrane utilizing the tip 100 as generally depicted in FIG. 25. The puncture base in which the porous membrane is supported while the tip 100 punctures the membrane may generally be described as a base having a 6.5 mm diameter straight hole with a 10 mm depth. The travel limit of the tip may be approximately 4 mm-8 mm below the puncture base surface. The puncture tip 100 is linearly moved into the membrane at a rate of approximately 5 mm/s.

EXAMPLES

The following examples further illustrate at least selected separator embodiments of the instant invention.

In certain embodiments, the following precipitated silicas can be employed to obtain separators according to the invention:

Median particle size 20.48 µm, mean particle size, 24.87 µm (as measured using Coulter LS230)

Silica samples shown below in Table 3 having the following characteristics were employed in the preparation of separators:

TABLE 3

|  | Oil Absorption ml/100 g | Surface Area m²/g | Tap Density g/l |
|---|---|---|---|
| Silica A | 225 | 180 | 170 |
| Silica B | 275 | 180 | 140 |

Polyethylene separators made using the above silica had the following properties shown below in Tables 4 and 5:

TABLE 4

| Product Properties | Unit | Separator 1 | Separator 2 |
|---|---|---|---|
| Backweb thickness | mm | 0.250 | 0.250 |
| Silica type |  | Silica A | Silica B |
| Si/PE ratio |  | 2.6:1 | 2.6:1 |
| Starting oil content | % | 64.0 | 67.0 |
| Final oil content | % | 15.5 | 16.5 |
| Basis weight | g/m² | 161 | 157 |
| Puncture resistance | N | 14.1 | 13.1 |
| Porosity | % | 61.5 | 65.1 |
| Wettability | Sec | 49 | 29 |
| ER 10 min boil | mΩ · cm² | 49 | 40 |
| ER 20 min soak | mΩ · cm² | 65 | 50 |
| Elongation - MD | % | 23 | 25 |
| Elongation - CMD | % | 430 | 484 |
| Perox 20 hrs | % | 388 | 350 |
| Perox 40 hrs | % | 333 | 283 |
| Acid shrinkage | % | −0.9 | −0.8 |
| Hg-Pore Size | µm | 0.099 | 0.126 |

Additionally, in further embodiments, the following silica fillers, described below in Table 6, were employed in the separators described in Table 7, below:

TABLE 6

|  |  | Silica C | Silica D | Silica E | Silica F |
|---|---|---|---|---|---|
| Oil Absorption | ml/100 g | 245 | 215 | 270 | 210 |
| Surface Area | m²/g | 180 | 130 | 195 | 180 |
| Bulk Density | g/l | 100 | 125 | No data | No data |

TABLE 7

|  |  | Separator 7 | Separator 8 | Separator 9 | Separator 10 |
|---|---|---|---|---|---|
| Backweb Thickness | mm | 0.200 | 0.206 | 0.200 | 0.201 |
| Silica Type |  | C | D | E | F |
| Si/PE ratio |  | 2.6:1 | 2.6:1 | 2.6:1 | 2.6:1 |
| Starting oil content | % | 68.0 | 65.1 | 67.0 | 65.2 |
| Basis Weight | g/m² | 109.6 | 122.4 | 122.0 | 125.3 |
| Final oil content | % | 15.1 | 16.4 | 15.8 | 14.9 |
| Porosity | % | 65.9 | 63.6 | 65.7 | 63.4 |
| ER 10' Boil | mΩ · cm² | 36 | 46 | 33 | 48 |
| Wettability | sec | 2 | 2 | 4 | 3 |
| Elongation - CMD | % | 275 | 329 | 294 | 311 |
| Puncture Resistance | N | 12.4 | 13.0 | 10.8 | 13.9 |

FURTHER EXAMPLES

In the following set of examples, inventive enhanced flooded separators were made according to various embodiments of the present invention and tested compared with a control separator. The results are shown just below in Table 8.

TABLE 5

| Product Properties | Unit | Separator 3 (Corresponds to Example 3 in Table 9 Below) | Separator 4 | Separator 5 | Separator 6 |
|---|---|---|---|---|---|
| Profile |  | Ribbed PE, greater than 12 major ribs, lower rib height | Ribbed PE, greater than 12 major ribs, lower rib height | Ribbed PE, fewer than 12 major ribs, higher rib height | Ribbed PE, fewer than 12 major ribs, higher rib height |
| Backweb thickness | µm | 250 | 250 | 250 | 250 |
| Silica type |  | B | A | B | A |
| Si/PE ratio |  | 2.6:1 | 2.6:1 | 2.6:1 | 2.6:1 |
| Starting oil content | % | 67 | 64 | 67 | 64 |
| Final oil content | % | 16.0 | 16.3 | 15.0 | 16.7 |
| Coating |  | NI (non-ionic) Surfactant | None | NI (non-ionic) Surfactant | None |
| Porosity | % | 63.8 | 61.7 | 64.4 | 60.6 |
| Electrical Resistance | mΩ · cm² | 42 | 50 | 45 | 62 |
| 20 minute soak ER | mΩ · cm² | 43 | 55 | 46 | 65 |
| Wettability | sec | 6 | 39 | 10 | 73 |
| Puncture Resistance | N | 12.9 | 14.7 | 12.2 | 13.9 |
| Elongation - CMD | % | 528 | 419 | 587 | 383 |
| Acid Shrinkage | % | −0.7 | −0.8 | −0.3 | −0.1 |

TABLE 8

| Property | Example A Enhanced Flooded Separator A | Control Separator A | Example B Enhanced Flooded Separator B | SPEC (BS-DA-961-4) |
|---|---|---|---|---|
| Profile | Ribbed PE, fewer than 12 major ribs | Ribbed PE, fewer than 12 major ribs | Ribbed PE, greater than 12 major ribs, lower rib height | — |
| Backweb thickness (mm) | 0.256 | 0.257 | 0.253 | 0.250 ± 0.040 |
| Puncture resistance (N) | 12.5 | 12.2 | — | Min. 10.0 |
| Total oil content (%) | 15.3 | 16.1 | 14.9 | 17.0 ± 3.0 |
| Backweb oil content (%) | 14.4 | 14.4 | — | Min. 8.0 |
| CMD elongation (%) | 530 (100%) | 482 (100%) | — | Min. 150 |
| Elongation after Perox 20 h (%) | 379 (72%) | 355 (74%) | — | Min. 100 |
| Elongation after Perox 40 h (%) | 165 (31%) | — | — | — |
| ER 10' boil (mΩ · cm$^2$) | 71 | 86 | 65 | Max. 140 |
| Wettability (sec) | 45 | 141 | 39 | — |
| Porosity (%) | 64.3 | 57.6 | 65.5 | 60.0 ± 7.5 |

The results above in Table 8 show that the separator of Example A exhibited almost 20% lower ER compared with the control separator A. Similarly, the separator of Example B exhibited more than 20% lower ER compared with the control separator A. These desirable lower ER results occurred despite the fact that the porosity percentages for the inventive separators A and B were within the tolerances (60%+/−7.5%) for the porosity of such a separator. Thus, the novel and unexpected pore structure of the separator contributed to the lowered ER combined with a porosity percentage for the separator that is in line with (not much more than) the porosity of a known separator.

ADDITIONAL EXAMPLES

Several separators were formed according to the present invention. Those separators were compared to comparative separators. SEMs of the inventive separators were taken to image the shish-kebab formations of the inventive separators.

Example 1

In Example 1, an enhanced flooded separator having a backweb thickness of 250 μm was made according to the present invention using UHMWPE, silica, and oil, and the silica used was a high oil absorption silica. An SEM of the inventive, low ER separator, was taken, see FIG. 15A.

Figure 15A:
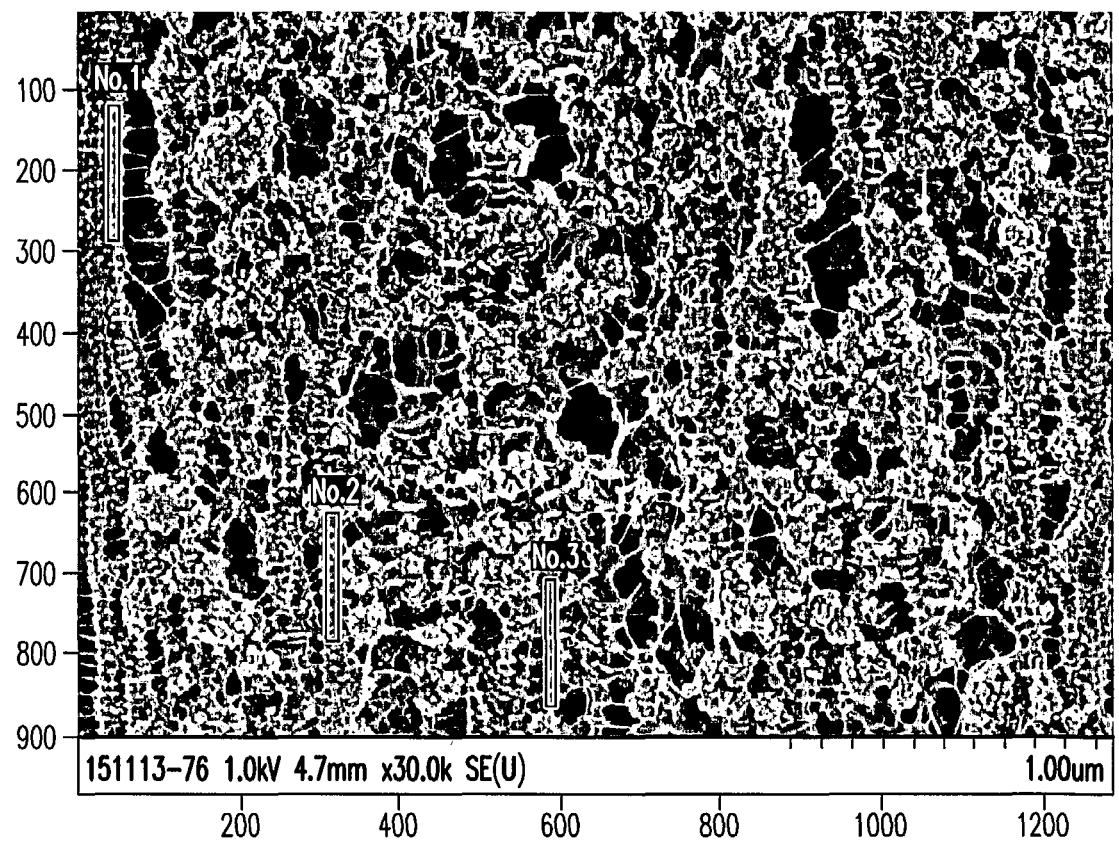
FIG. 15A includes an SEM of the inventive separator of Example 1.
Figure 15B:
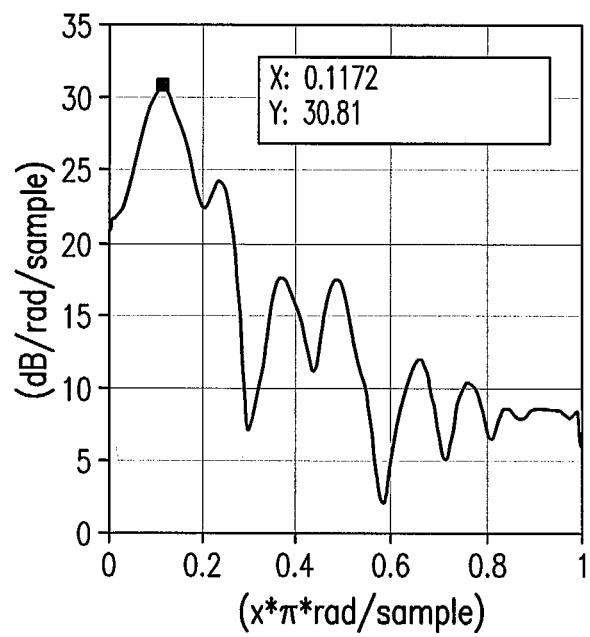
FIGS. 15B-15D include Welch Power Spectral Density Estimate graphs showing results from the FTIR spectral tests performed on the three shish-kebab regions (Nos. 1, 2, and 3), respectively, shown and marked in FIG. 15A, wherein the x-axis of the graphs in FIGS. 15B-15D is normalized frequency (×πrad/sample), and wherein the y-axis of those graphs=power/frequency (dB/rad/sample).
Figure 15C:
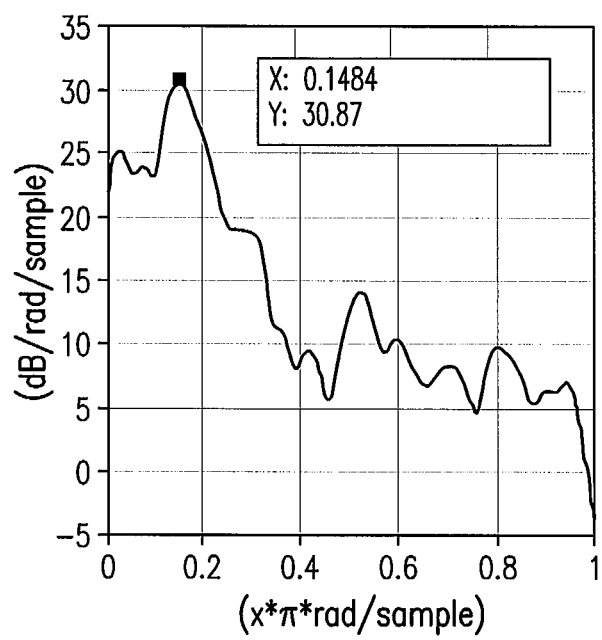
Figure 15D:
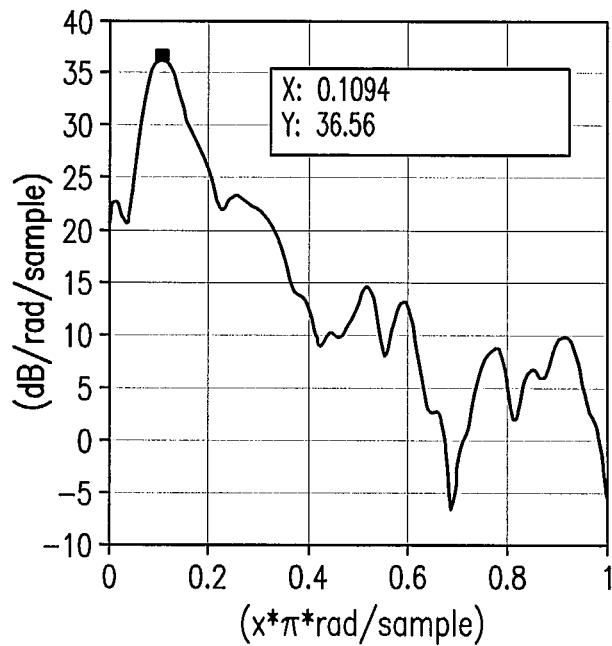

Three shish-kebab regions, numbered Nos. 1, 2 and 3 respectively, were identified on the SEM of FIG. 15A, the SEM of the separator of Example 1. Then, FTIR spectra profiles were taken of each of the three shish-kebab regions, see FIGS. 15B-15D. The FTIR spectra taken of each of the three shish-kebab regions (Nos. 1, 2, and 3) of the SEM of FIG. 15A of the separator of Example 1 revealed the following peak position information and periodicity or repetition of the shish-kebab formations or morphology, shown in Table 9, below.

TABLE 9

| | Shish-kebab region number | | |
|---|---|---|---|
| | No. 1 | No. 2 | No. 3 |
| Peak position | 0.1172 | 0.1484 | 0.1094 |
| Periodicity or repetition of the shish-kebab formation | 0.057 (57 nm) | 0.047 (47 nm) | 0.085 (85 nm) |

Ultimately, an average repetition or periodicity of the shish-kebab morphology or structure was obtained, of 63 nm.

Example 2

Further, for Example 2, an enhanced flooded separator having a backweb thickness of 200 μm was made according to the present invention, in the same manner as Example 1 above, using UHMWPE, silica, and oil, and the silica used was a high oil absorption silica. An SEM of the inventive, low ER separator, was taken, see FIG. 16A.

Figure 16A:
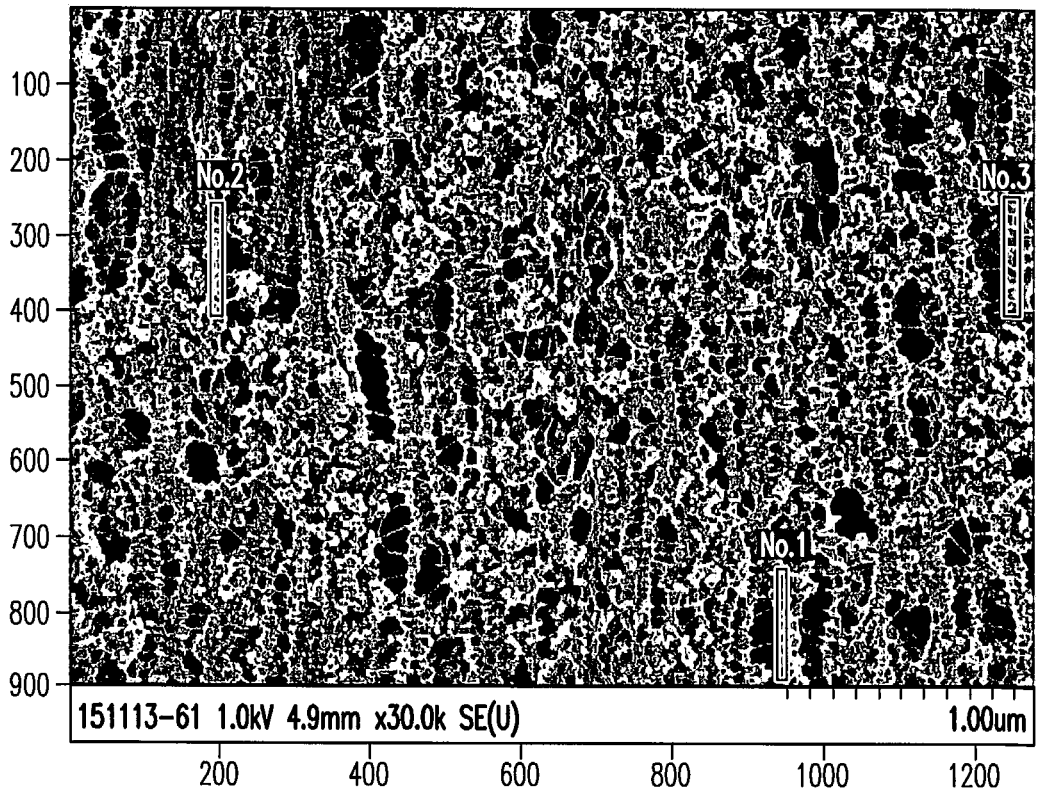
FIGS. 16A-16D are similar to FIGS. 15A-15D, respectively, but are representative of the inventive separator of Example 2.
Figure 16B:
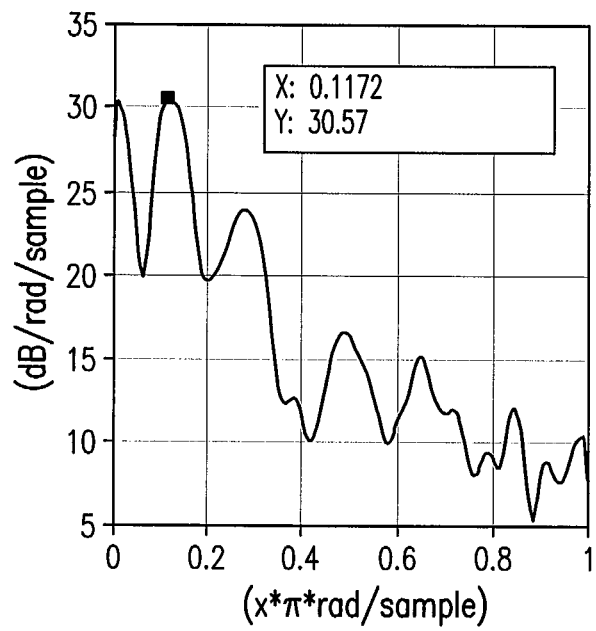
Figure 16C:
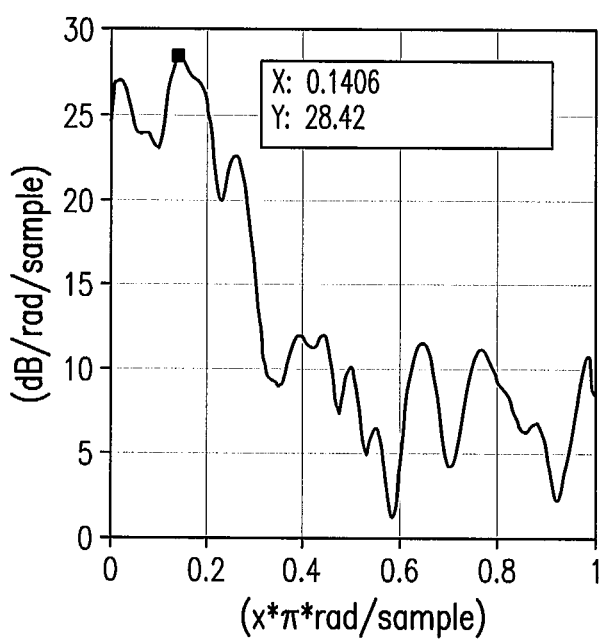
Figure 16D:
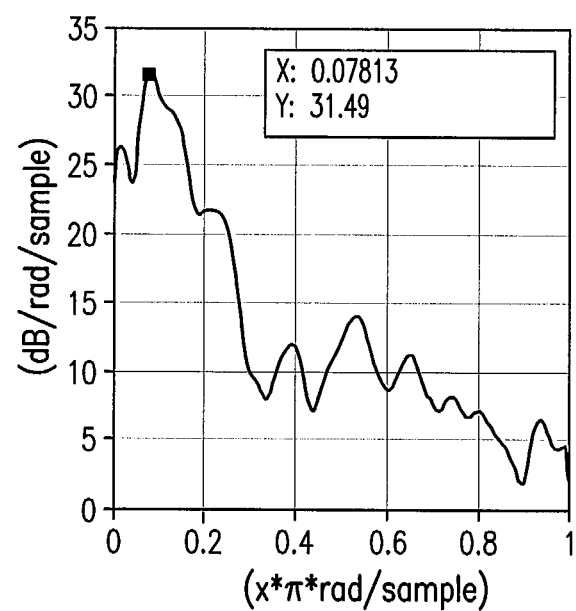

Three shish-kebab regions, numbered Nos. 1, 2 and 3 respectively, were identified on the SEM of FIG. 16A, the SEM of the separator of Example 2. Then, FTIR spectra profiles were taken of each of the three shish-kebab regions, see FIGS. 16B-16D. The FTIR spectra taken of each of the three shish-kebab regions (Nos. 1, 2, and 3) of the SEM of FIG. 16A of the separator of Example 2 revealed the following peak position information and periodicity or repetition of the shish-kebab formations or morphology, shown in Table 10, below.

TABLE 10

| | Shish-kebab region number | | |
|---|---|---|---|
| | No. 1 | No. 2 | No. 3 |
| Peak position | 0.1172 | 0.1406 | 0.07813 |
| Periodicity or repetition of the shish-kebab formation | 0.057 (57 nm) | 0.047 (47 nm) | 0.085 (85 nm) |

Ultimately, an average repetition or periodicity of the shish-kebab morphology or structure was obtained, of 63 nm.

Example 3

For Example 3, an enhanced flooded separator having a backweb thickness of 250 µm was made according to the present invention, in the same manner as Example 1 above, using UHMWPE, silica, and oil, and the silica used was a high oil absorption silica. An SEM of the inventive, low ER separator, was taken, see FIG. 17A.

Figure 17A:
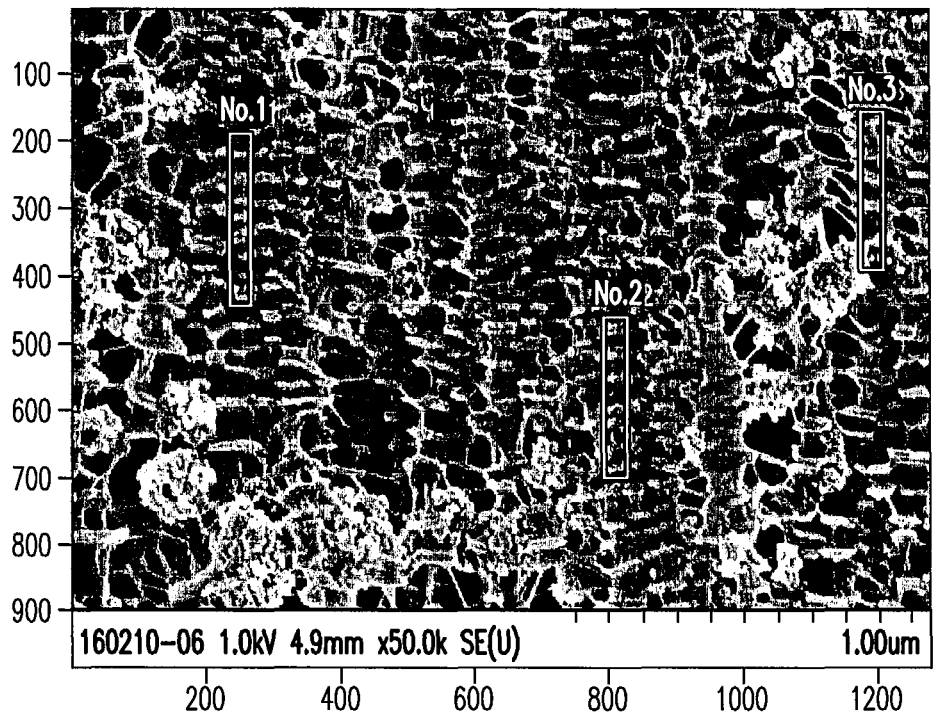
FIGS. 17A-17D are similar to FIGS. 15A-15D, respectively, but are representative of the inventive separator of Example 3.
Figure 17B:
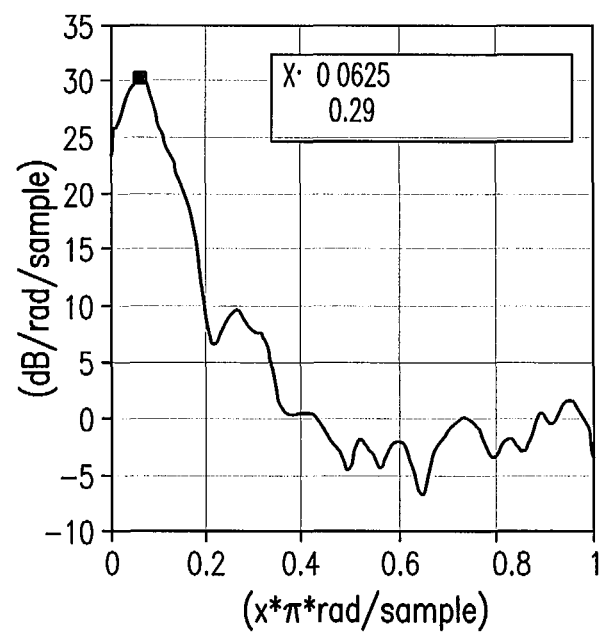
Figure 17C:
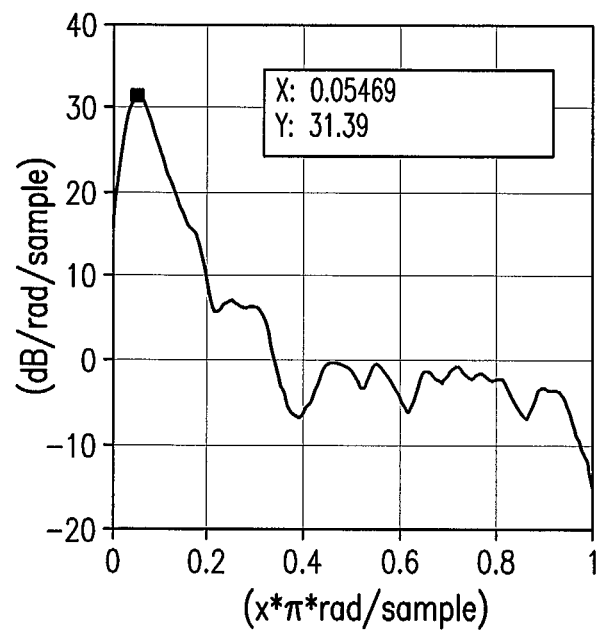
Figure 17D:
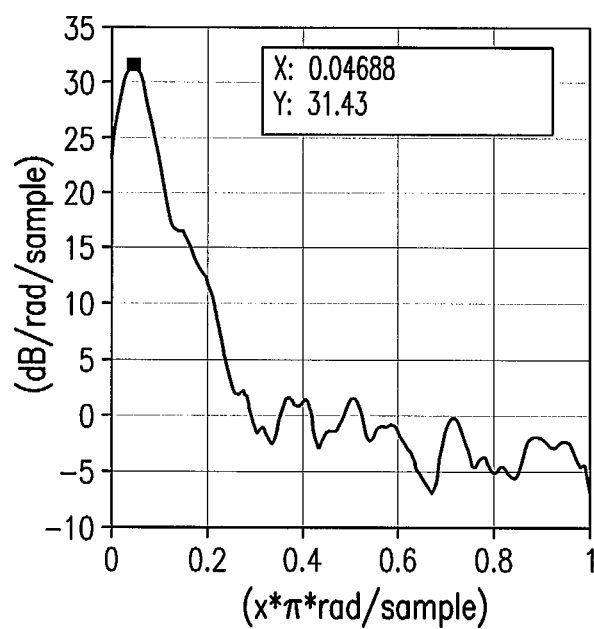

Three shish-kebab regions, numbered Nos. 1, 2 and 3 respectively, were identified on the SEM of FIG. 17A, the SEM of the separator of Example 3. Then, FTIR spectra profiles were taken of each of the three shish-kebab regions, see FIGS. 17B-17D. The FTIR spectra taken of each of the three shish-kebab regions (Nos. 1, 2, and 3) of the SEM of FIG. 17A of the separator of Example 3 revealed the following peak position information and periodicity or repetition of the shish-kebab formations or morphology, shown in Table 11, below.

TABLE 11

| | Shish-kebab region number | | |
|---|---|---|---|
| | No. 1 | No. 2 | No. 3 |
| Peak position | 0.0625 | 0.05469 | 0.04688 |
| Periodicity or repetition of the shish-kebab formation | 0.063 (63 nm) | 0.073 (73 nm) | 0.085 (85 nm) |

Ultimately, an average repetition or periodicity of the shish-kebab morphology or structure was obtained, of 74 nm.

Example 4

For Example 4, an enhanced flooded separator having a backweb thickness of 250 µm was made according to the present invention, in the same manner as Example 1 above, using UHMWPE, silica, and oil, and the silica used was a high oil absorption silica (a different high oil absorption silica from the silica used in Examples 1-3 above; each of the high oil absorption silicas used to make the separators of Examples 1-5 range from about 230 to about 280 ml/100 g). An SEM of the inventive, low ER separator, was taken, see FIG. 18A.

Figure 18A:
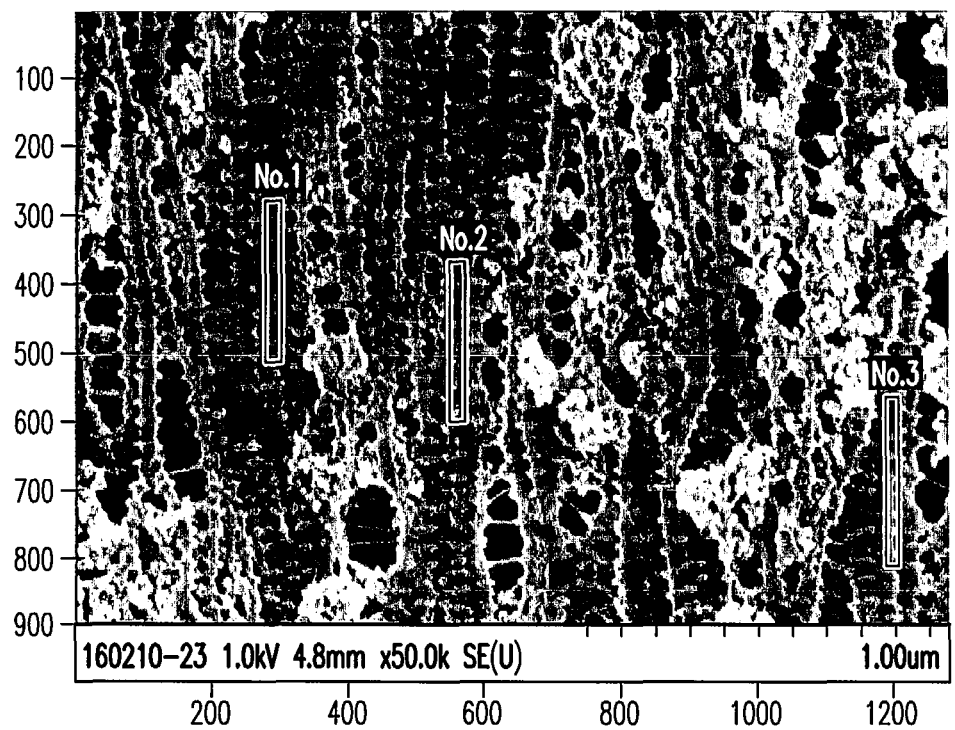
FIGS. 18A-18D are similar to FIGS. 15A-15D, respectively, but are representative of the inventive separator of Example 4.
Figure 18B:
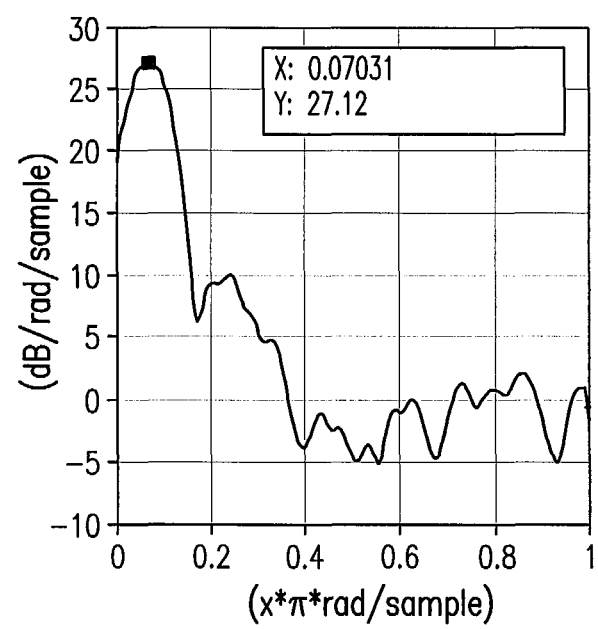
Figure 18C:
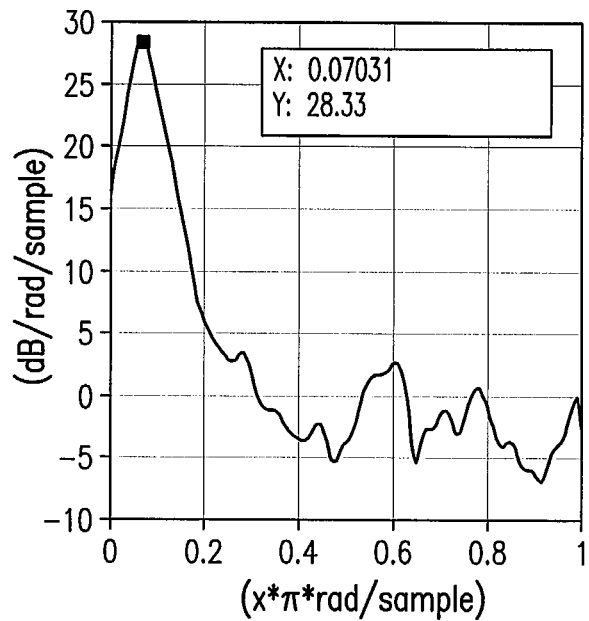
Figure 18D:
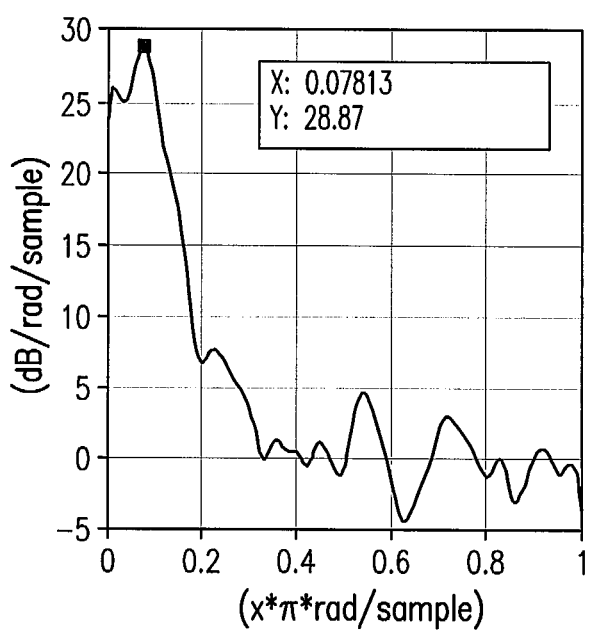

Three shish-kebab regions, numbered Nos. 1, 2 and 3 respectively, were identified on the SEM of FIG. 18A, the SEM of the separator of Example 4. Then, FTIR spectra profiles were taken of each of the three shish-kebab regions, see FIGS. 18B-18D. The FTIR spectra taken of each of the three shish-kebab regions (Nos. 1, 2, and 3) of the SEM of FIG. 18A of the separator of Example 4 revealed the following peak position information and periodicity or repetition of the shish-kebab formations or morphology, shown in Table 12, below.

TABLE 12

| | Shish-kebab region number | | |
|---|---|---|---|
| | No. 1 | No. 2 | No. 3 |
| Peak position | 0.07031 | 0.07031 | 0.07813 |
| Periodicity or repetition of the shish-kebab formation | 0.056 (56 nm) | 0.056 (56 nm) | 0.051 (51 nm) |

Ultimately, an average repetition or periodicity of the shish-kebab morphology or structure was obtained, of 55 nm.

Example 5

For this example, Example 5, an enhanced flooded separator having a backweb thickness of 250 µm was made according to the present invention, in the same manner as Example 1 above, using UHMWPE, silica, and oil, and the silica used was a high oil absorption silica (a different high oil absorption silica from the silica used in Examples 1-3 above and from the silica used in Example 4 above). An SEM of the inventive, low ER separator, was taken, see FIG. 19A.

Figure 19A:
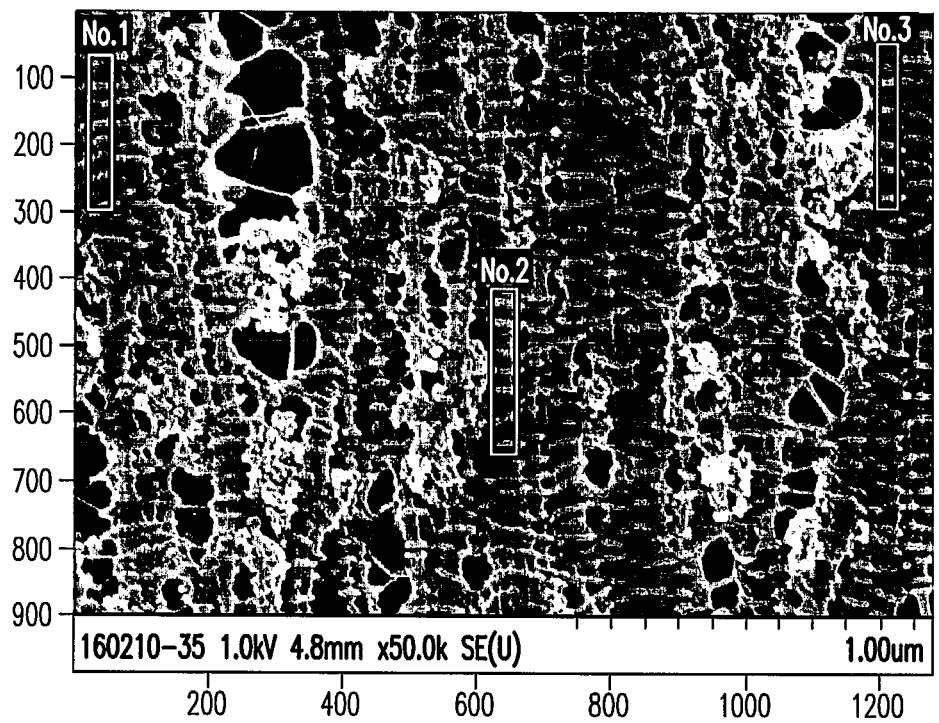
FIGS. 19A-19D are similar to FIGS. 15A-15D, respectively, but are representative of the inventive separator of Example 5.
Figure 19B:
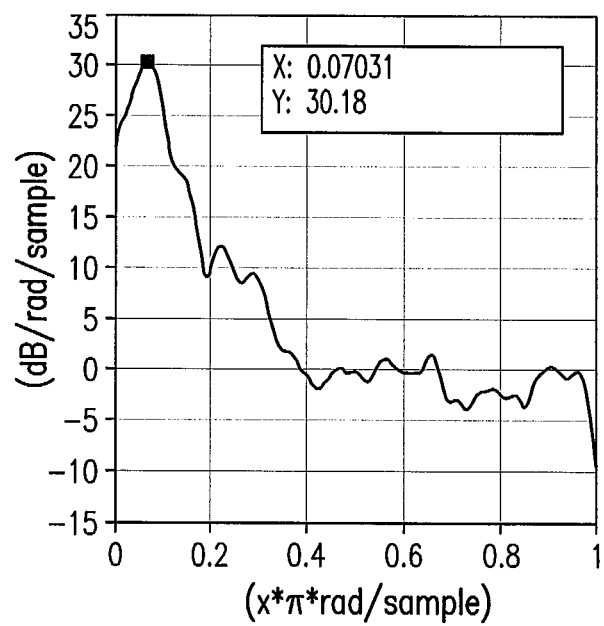
Figure 19C:
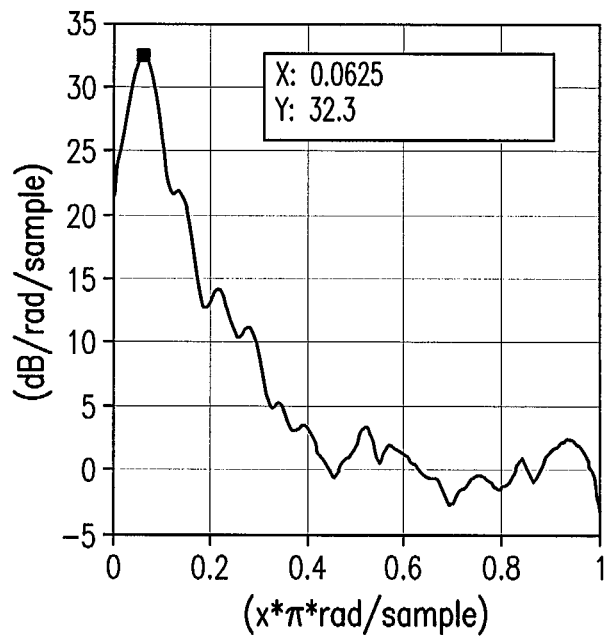
Figure 19D:
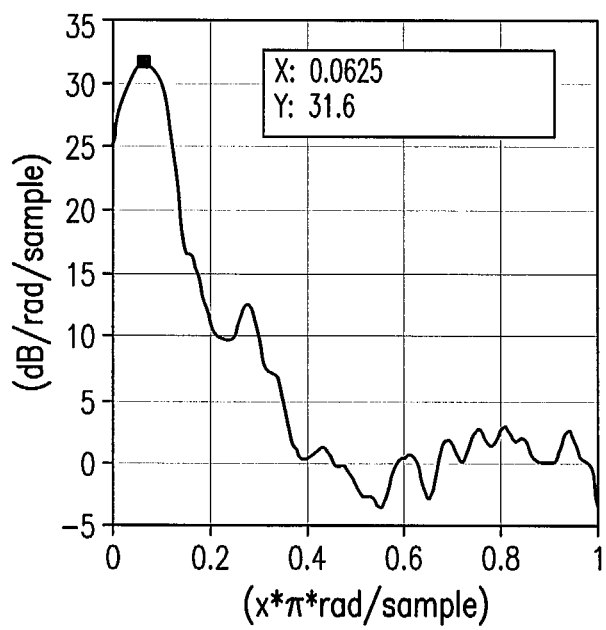

Three shish-kebab regions, numbered Nos. 1, 2 and 3 respectively, were identified on the SEM of FIG. 19A, the SEM of the separator of Example 5. Then, FTIR spectra profiles were taken of each of the three shish-kebab regions, see FIGS. 19B-19D. The FTIR spectra taken of each of the three shish-kebab regions (Nos. 1, 2, and 3) of the SEM of FIG. 19A of the separator of Example 5 revealed the following peak position information and periodicity or repetition of the shish-kebab formations or morphology, shown in Table 13, below.

TABLE 13

| | Shish-kebab region number | | |
|---|---|---|---|
| | No. 1 | No. 2 | No. 3 |
| Peak position | 0.07031 | 0.0625 | 0.0625 |
| Periodicity or repetition of the shish-kebab formation | 0.056 (56 nm) | 0.063 (63 nm) | 0.063 (63 nm) |

Ultimately, an average repetition or periodicity of the shish-kebab morphology or structure was obtained, of 61 nm.

Comparative Example 1

A comparative polyethylene lead acid battery separator was obtained, the separator having a backweb thickness of 250 µm. An SEM of the Comparative Example 1 separator was taken, see FIG. 20A.

Figure 20A:
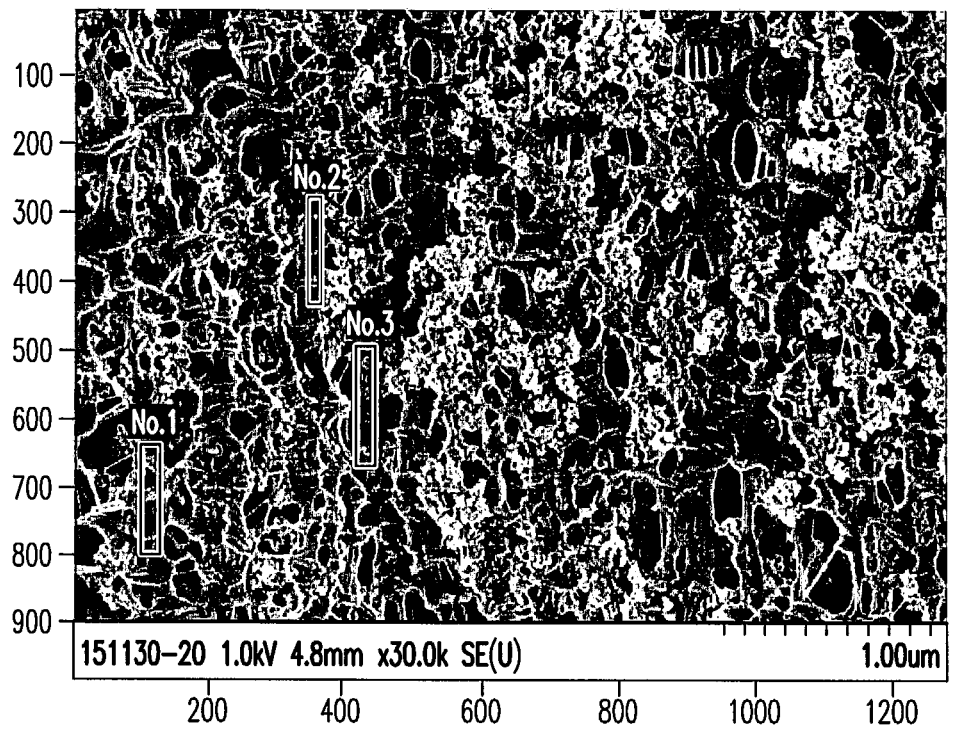
FIGS. 20A-20D are similar to FIGS. 15A-15D, respectively, but are representative of the separator of Comparative Example 1 (CE1).
Figure 20B:
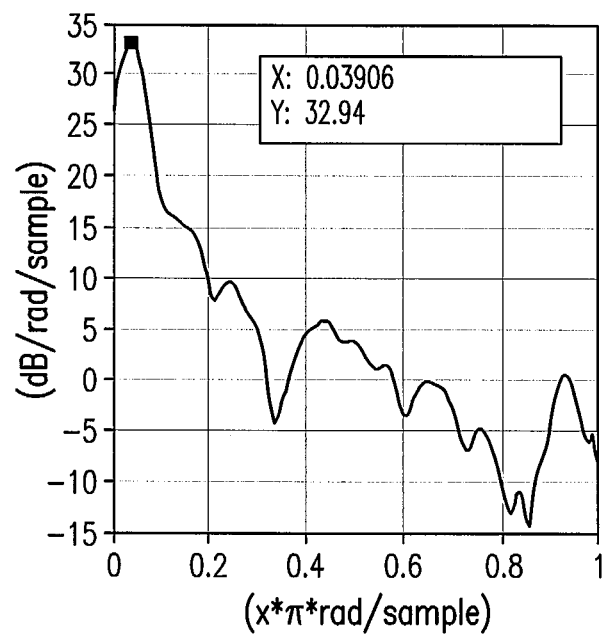
Figure 20C:
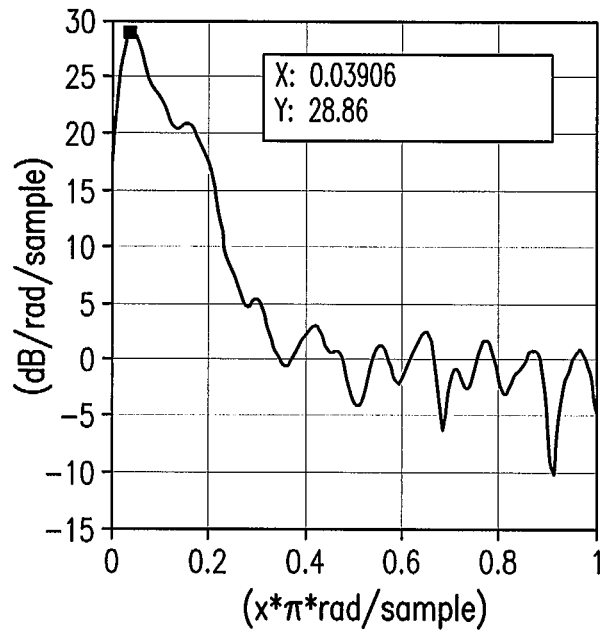
Figure 20D:
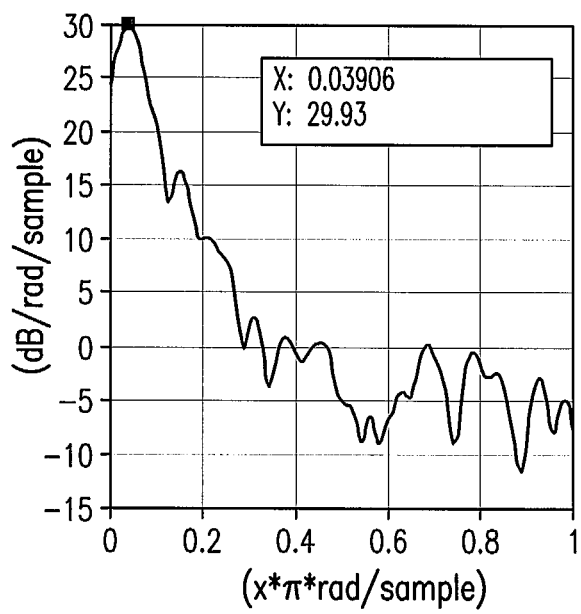

Three regions, numbered Nos. 1, 2 and 3 respectively, were identified on the SEM of FIG. 20A, the SEM of the separator of Comparative Example 1. Then, FTIR spectra profiles were taken of each of those three regions, see FIGS. 20B-20D. The FTIR spectra taken of each of the three numbered regions (Nos. 1, 2, and 3) of the SEM of FIG. 20A of the separator of Comparative Example 1 revealed the following peak position information and periodicity or repetition information regarding the crystalline structure and/or morphology of those three regions, shown in Table 14, below.

TABLE 14

| Region number | No. 1 | No. 2 | No. 3 |
|---|---|---|---|
| Peak position | 0.03906 | 0.03906 | 0.03906 |
| Periodicity or repetition of the crystalline structure of morphology of the region | 0.170 (170 nm) | 0.170 (170 nm) | 0.170 (170 nm) |

Ultimately, an average repetition or periodicity of the crystalline structure or morphology of the identified regions was obtained, of 170 nm.

Comparative Example 2

Another comparative polyethylene lead acid battery separator was obtained, the separator having a backweb thickness of 250 μm. An SEM of the Comparative Example 2 separator was taken, see FIG. 21A.

Figure 21A:
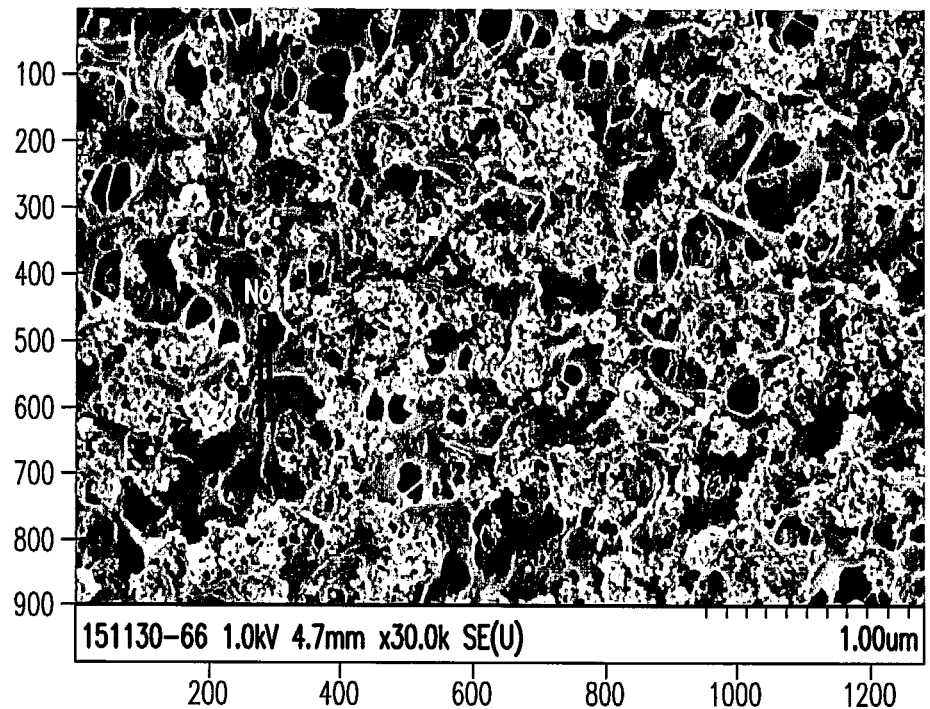
FIGS. 21A and 21B are similar to FIGS. 15A and 15B, respectively, but are representative of the separator of Comparative Example 2.
Figure 21B:
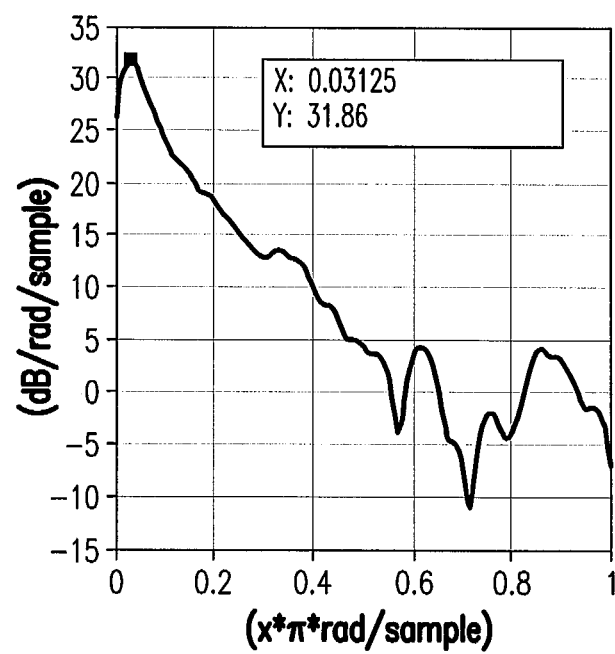

A region of the separator SEM image, numbered No. 1, was identified on the SEM of FIG. 21A, the SEM of the separator of Comparative Example 2. Then, an FTIR spectra profile was taken of that region, see FIG. 21B. The FTIR spectrum taken of the region (No. 1) of the SEM of FIG. 21A of the separator of Comparative Example 2 revealed the following peak position information and periodicity or repetition information regarding the crystalline structure and/or morphology of that region, shown in Table 15, below.

TABLE 15

| Region number | No. 1 |
|---|---|
| Peak position | 0.03125 |
| Periodicity or repetition of the crystalline structure of morphology of the region | 0.212 (212 nm) |

Thus, the repetition or periodicity of the crystalline structure or morphology of the identified region was 212 nm.

Comparative Example 3

Yet another comparative polyethylene lead acid battery separator was obtained, this one commercially available from Daramic, LLC. The separator had a backweb thickness of 250 μm. This separator was made similarly to the separators described in Examples 1-5 above, but the silica used to make this separator was not one with a high oil absorption value.

Figure 22:
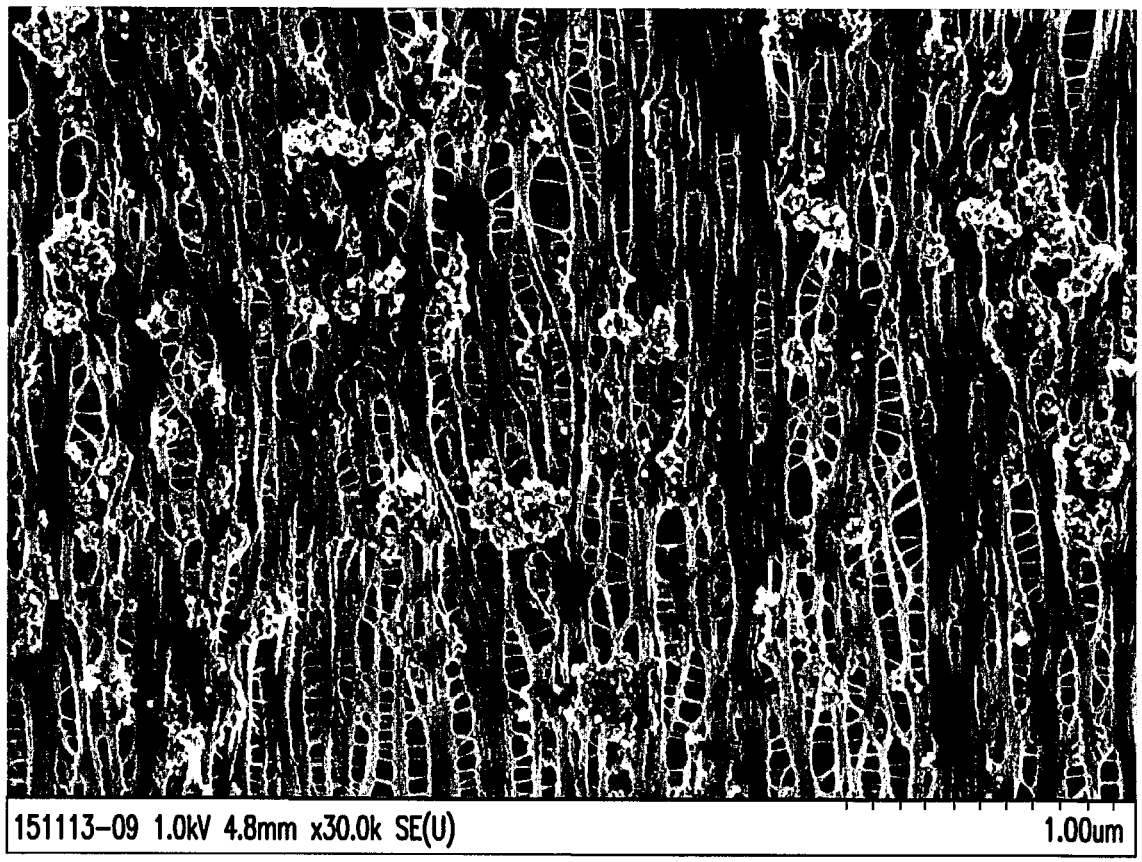
FIG. 22 is an SEM of the separator of Comparative Example 3.

An SEM of the Comparative Example 3 separator was taken, see FIG. 22. Observing FIG. 22, there were no shish-kebab formations which were continuously extending in the length of at least 0.5 μm or longer in this SEM image of the polyolefin microporous membrane. Therefore, no regions were marked on the SEM or further analyzed.

Table 16, below, compares the results obtained for the periodicity or repetition of the shish-kebab regions of Examples 1-5 versus results obtained for Comparative Examples 1-3.

TABLE 16

| | Example | | | | | | | |
|---|---|---|---|---|---|---|---|---|
| Region Number | Ex. 1 | Ex. 2 | Ex. 3 | Ex. 4 | Ex. 5 | CE1 | CE2 | CE3 |
| No. 1 | 57 nm | 57 nm | 63 nm | 56 nm | 56 nm | 170 nm | 212 nm | — |
| No. 2 | 47 nm | 47 nm | 73 nm | 56 nm | 63 nm | 170 nm | — | — |
| No. 3 | 85 nm | 85 nm | 85 nm | 51 nm | 64 nm | 170 nm | — | — |
| Average | 63 nm | 63 nm | 74 nm | 55 nm | 61 nm | 170 nm | 212 nm | — |

For Examples 1-5, the average repetition or periodicity of the shish-kebab formations and/or crystalline structures and/or morphologies was from 1 nm to 150 nm, preferably from 10 nm to 120 nm, and even more preferably from 20 nm to 100 nm. That type of structure was not observed for the separators of Comparative Examples 1-3.

Additional properties and features of the separators of Examples 1-2 and 4-5 are shown below in Table 17 (whereas Table 3 above includes properties of the separator of Example 3).

TABLE 17

| Product Properties | Unit | Example 1 | Example 2 | Example 4 | Example 5 |
|---|---|---|---|---|---|
| Profile | | Ribbed PE, greater than 12 major ribs, lower rib height | Ribbed PE, greater than 12 major ribs, lower rib height | Ribbed PE, fewer than 12 major ribs | Ribbed PE, fewer than 12 major ribs |
| Backweb thickness | μm | 250 | 200 | 250 | 250 |
| Final oil content | % | 17.1 | 14.3 | 17.0 | 11.3 |
| Porosity | % | 62.5 | 65.8 | 58.7 | 65.2 |

TABLE 17-continued

| Product Properties | Unit | Example 1 | Example 2 | Example 4 | Example 5 |
|---|---|---|---|---|---|
| Electrical Resistance | mΩ · cm$^2$ | 53 | 38 | 52 | 45 |
| 20 minute soak ER | mΩ · cm$^2$ | 57 | 36 | — | — |
| Puncture Resistance | N | 13.6 | 12.7 | 11.6 | 12.0 |
| Wettability | seconds | 25 | 8 | 6 | 6 |
| Elongation - CMD | % | 587 | 470 | 713 | 616 |
| Acid Shrinkage | % | −1.4 | −1.5 | −0.1 | −0.4 |

Solid State NMR Examples

For two separator samples, the ratio (Si—OH)/Si of silanol groups (Si—OH) to elemental silicon (Si) was measured using the $^{29}$Si solid-state NMR technique described in great detail above. A sample of the separator of Example 1 was prepared for this NMR testing as well as a sample of a comparative separator, Comparative Example 4, which was a commercially available polyethylene separator from Daramic, LLC, having a 250 μm backweb thickness, made with the same type of polyethylene polymer and silica as the separator described above as Comparative Example 3.

Figure 23A:
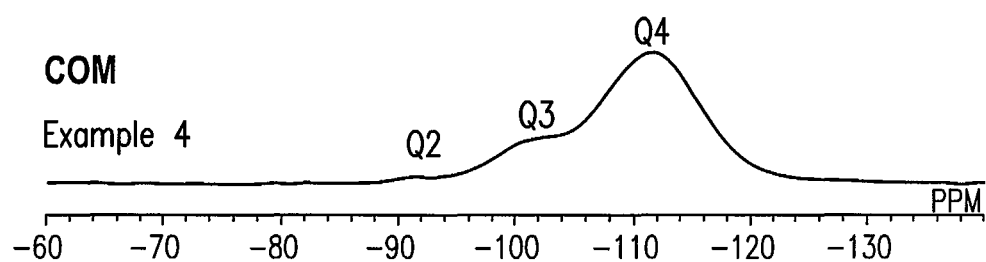
FIG. 23A and FIG. 23B include 29Si-NMR spectra for Comparative Example 4 and Example 1, respectively.
Figure 23B:
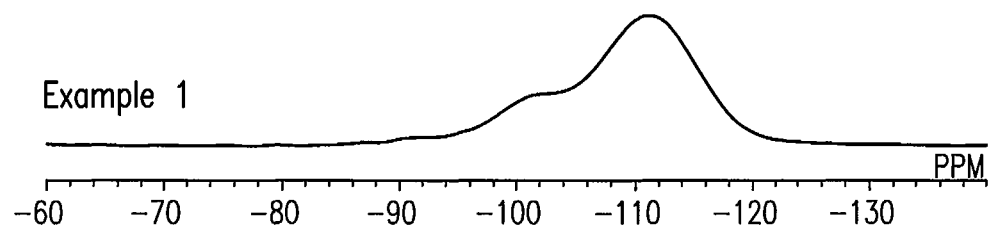

A $^{29}$Si-NMR spectrum of each sample was obtained, and these spectra are included as FIG. 23. The $Q_2$ signal was observed at ca. −93 ppm, while the $Q_3$ signal was observed at ca. −103 ppm, and the $Q_4$ signal was observed at ca. −111 ppm. Each component peak was deconvoluted as shown in FIG. 24, and the $Q_2:Q_3:Q_4$ molecular ratios were calculated using that information from FIG. 24, with results shown below in Table 18:

TABLE 18

| Observed $^{29}$Si-NMR Signal Area Ratio | | | | Molecular Ratio | | |
|---|---|---|---|---|---|---|
| $Q_1$ | $Q_2$ | $Q_3$ | $Q_4$ | OH | Si | OH/Si |
| CE4 | 0 | 2 | 16 | 82 | 20 | 100 | 0.20 |
| Example 1 | 0 | 5 | 17 | 78 | 27 | 100 | 0.27 |
| Number of OH Bonding | 3 | 2 | 1 | 0 | | | |

In the results shown above, the OH/Si ratio of the separator of Example 1 is 35% higher than the OH/Si ratio for the separator of Comparative Example 4, meaning that the additional hydroxyl and/or silanol groups present for the silica for the inventive separator may contribute to the improved features of the inventive separator such as its desirable pore structure and/or morphology and its low ER.

In accordance with at least selected embodiments, the separator may include or exhibit performance enhancing additives or coatings, increased porosity, increased void volume, amorphous silica, higher oil absorption silica, fillers or silica with increased friability, increased ionic diffusion, higher silanol group silica, silica with an OH to Si ratio of 21:100 to 35:100, reduced electrical resistance, a shish-kebab structure or morphology, a polyolefin microporous membrane containing particle-like filler in an amount of 40% or more by weight of the membrane and ultrahigh molecular weight polyethylene having shish-kebab formations with extended chain crystal (shish formation) and folded chain crystal (kebab formation) and the average repetition periodicity of the kebab formation from 1 nm to 150 nm, decreased sheet thickness, decreased tortuosity, and/or the like, or any combination thereof. Such inventive separators may be especially well suited for enhanced flooded batteries (EFB) built for higher performance and reliability than conventional flooded batteries, that support at least certain start-stop functionality, with enhanced starting power, that meet the ever-increasing electrical demands of many vehicles, that provide a longer lifespan of recovering from deep discharges, that power electrical loads during engine-off periods and that support a high number of starts per trip, with superior cycling capability, charge acceptance and/or the ability to operate at a low state of charge and/or a partial state of charge, with tight packed components, with battery vibration resistance, with reliable starting performance, excellent cycling ability, improved cycling of batteries operating in a low state and/or partial state of charge, and/or longer life than traditional lead-acid batteries, and/or the like.

Example 6

An additional example, with results shown below in Tables 19 and 20, depicts expanded battery testing data. Batteries were manufactured then the estimated CCA was measured. The "new" samples were batteries utilizing a separator having a serrated positive rib profile with a formulation as substantially described herein. The "control" batteries utilized a standard commercially available separator having solid positive ribs. These results proved out surprisingly unexpected findings regarding the improvement in battery performance for start/stop enhanced flooded lead-acid batteries using enhanced separators according to the present disclosure. Significantly and surprisingly, the results in the table below showed improvements even when the batteries had not been placed into significant motion in a vehicle but rather had just been in general motion while moving from place to place within a plant for testing. Thus, combined with the motion from a vehicle and/or the energy from various start/stop events, the battery performance results may improve even more significantly. As shown in Table 19, the new samples had a higher discharge performance with improved quality, and improved estimated CCA with the standard deviation.

TABLE 19

| Sample | Estimated CCA | Voltage | Sample | Estimated CCA | Voltage |
|---|---|---|---|---|---|
| New-1 | 930 | 12.98 | Control-1 | 874 | 12.86 |
| New-2 | 935 | 12.98 | Control-2 | 902 | 12.86 |
| New-3 | 910 | 12.96 | Control-3 | 884 | 12.86 |
| New-4 | 925 | 12.96 | Control-4 | 890 | 12.89 |

TABLE 19-continued

| Sample | Estimated CCA | Voltage | Sample | Estimated CCA | Voltage |
|---|---|---|---|---|---|
| New-5 | 913 | 12.98 | Control-5 | 894 | 12.87 |
| New-6 | 931 | 12.98 | Control-6 | 883 | 12.88 |
| New-7 | 930 | 12.98 | Control-7 | 895 | 12.86 |
| New-8 | 933 | 12.98 | Control-8 | 897 | 12.86 |
| New-9 | 934 | 12.98 | Control-9 | 886 | 12.89 |
| New-10 | 927 | 12.95 | Control-10 | 928 | 12.89 |
| Average | 927 | 12.97 | Average | 893 | 12.87 |
| Std deviation | 8.64 | 0.01 | Std deviation | 14.63 | 0.01 |

Table 20, below, shows the improvement of the new samples as compared to the control samples, with respect to the above data in Table 19.

TABLE 20

| | Estimated CCA | Voltage |
|---|---|---|
| New to Control Avg. Improvement | 33.5 | 0.101 |
| New to Control Avg. % Improvement | 3.60% | 0.80% |
| Std deviation improvement | −5.99 | 0 |

Example 7

Batteries were tested by measuring an estimated CCA while they sat at standard conditions for over 30 days. Batteries using a control battery utilizing a typical commercially available battery separator, a first sample battery utilizing a first sample separator of the present invention ("sample 1"), and a second sample battery utilizing a second sample separator of the present invention ("sample 2"). Sample 1 utilized a separator as generally described herein. Sample 2 utilized a separator as generally described herein with a wetting agent.

The batteries' estimated CCA were measured at various intervals over a 34 day period of sitting at standard conditions without being charged or discharged. Table 21 shows the estimated CCA of the Control Batteries over a 34 day period. Table 22 shows the estimated CCA of the Sample 1 Batteries over a 34 day period. Table 23 shows the estimated CCA of the Sample 2 Batteries over a 34 day period. The average % loss for all tables was measured by comparing the current CCA as compared to that measured on Day 2. Day 1 measurements were not available as the batteries were in transit from the manufacturer.

TABLE 21

| Day: | | 2 | 3 | 6 | 7 | 8 | 9 | 10 | 20 | 34 |
|---|---|---|---|---|---|---|---|---|---|---|
| Control | #1 | 1032 | 1013 | 1005 | 997 | 989 | 985 | 984 | 964 | 931 |
| Battery | #2 | 999 | 988 | 967 | 964 | 958 | 958 | 957 | 937 | 905 |
| | #3 | 1003 | 993 | 975 | 971 | 971 | 968 | 964 | 945 | 913 |
| | #4 | 1016 | 1003 | 980 | 980 | 974 | 968 | 968 | 957 | 925 |
| | #5 | 985 | 972 | 955 | 956 | 947 | 946 | 947 | 923 | 899 |
| | #6 | 999 | 984 | 965 | 964 | 963 | 959 | 958 | 937 | 910 |
| Average | | 1006 | 992 | 975 | 972 | 967 | 964 | 963 | 944 | 914 |
| Confidence | | | 13.02 | 11.56 | 13.80 | 11.73 | 11.57 | 10.48 | 10.02 | 11.92 | 9.69 |
| Avg. % Loss | | | 1.34% | 3.10% | 3.35% | 3.84% | 4.14% | 4.24% | 6.15% | 9.13% |

TABLE 22

| Day: | | 2 | 3 | 6 | 7 | 8 | 9 | 10 | 20 | 34 |
|---|---|---|---|---|---|---|---|---|---|---|
| Sample 1 | #1 | 1038 | 1040 | 1004 | 994 | 992 | 990 | 993 | 966 | 958 |
| Battery | #2 | 1055 | 1050 | 1021 | 1017 | 1022 | 1013 | 1012 | 991 | 977 |
| | #3 | 1043 | 1030 | 1003 | 1001 | 1002 | 994 | 997 | 976 | 970 |
| | #4 | 1046 | 1030 | 1001 | 999 | 993 | 995 | 996 | 971 | 962 |
| | #5 | 1047 | 1031 | 1011 | 1004 | 1003 | 1001 | 994 | 964 | 955 |
| | #6 | 1018 | 1014 | 992 | 985 | 986 | 980 | 975 | 962 | 948 |
| Average | | 1041 | 1033 | 1005 | 1000 | 1000 | 996 | 995 | 972 | 962 |
| Confidence | | | 10.11 | 9.60 | 7.85 | 8.53 | 10.15 | 8.83 | 9.45 | 8.60 | 8.39 |
| Avg. % Loss | | | 0.83% | 3.44% | 3.95% | 3.99% | 4.39% | 4.48% | 6.68% | 7.64% |

TABLE 23

| Day: | | 2 | 3 | 6 | 7 | 8 | 9 | 10 | 20 | 34 |
|---|---|---|---|---|---|---|---|---|---|---|
| Sample 2 | #1 | 1036 | 1035 | 1017 | 1008 | 1004 | 1003 | 1004 | 983 | 975 |
| Battery | #2 | 1030 | 1020 | 1005 | 1000 | 996 | 999 | 999 | 984 | 977 |
| | #3 | 1050 | 1002 | 1022 | 1021 | 1002 | 1020 | 1016 | 1002 | 985 |
| | #4 | 1009 | 1031 | 987 | 984 | 982 | 980 | 975 | 963 | 954 |
| | #5 | 1043 | 1018 | 1009 | 1006 | 1006 | 1001 | 1001 | 982 | 964 |
| | #6 | 1025 | 1040 | 1003 | 995 | 996 | 989 | 991 | 977 | 974 |
| Average | | 1032 | 1024 | 1007 | 1002 | 998 | 999 | 998 | 982 | 972 |
| Confidence | | | 11.56 | 11.09 | 9.79 | 10.05 | 6.97 | 10.86 | 11.01 | 10.06 | 8.72 |
| Avg. % Loss | | | 0.76% | 2.42% | 2.89% | 3.34% | 3.25% | 3.34% | 4.88% | 5.88% |

Figure 35:
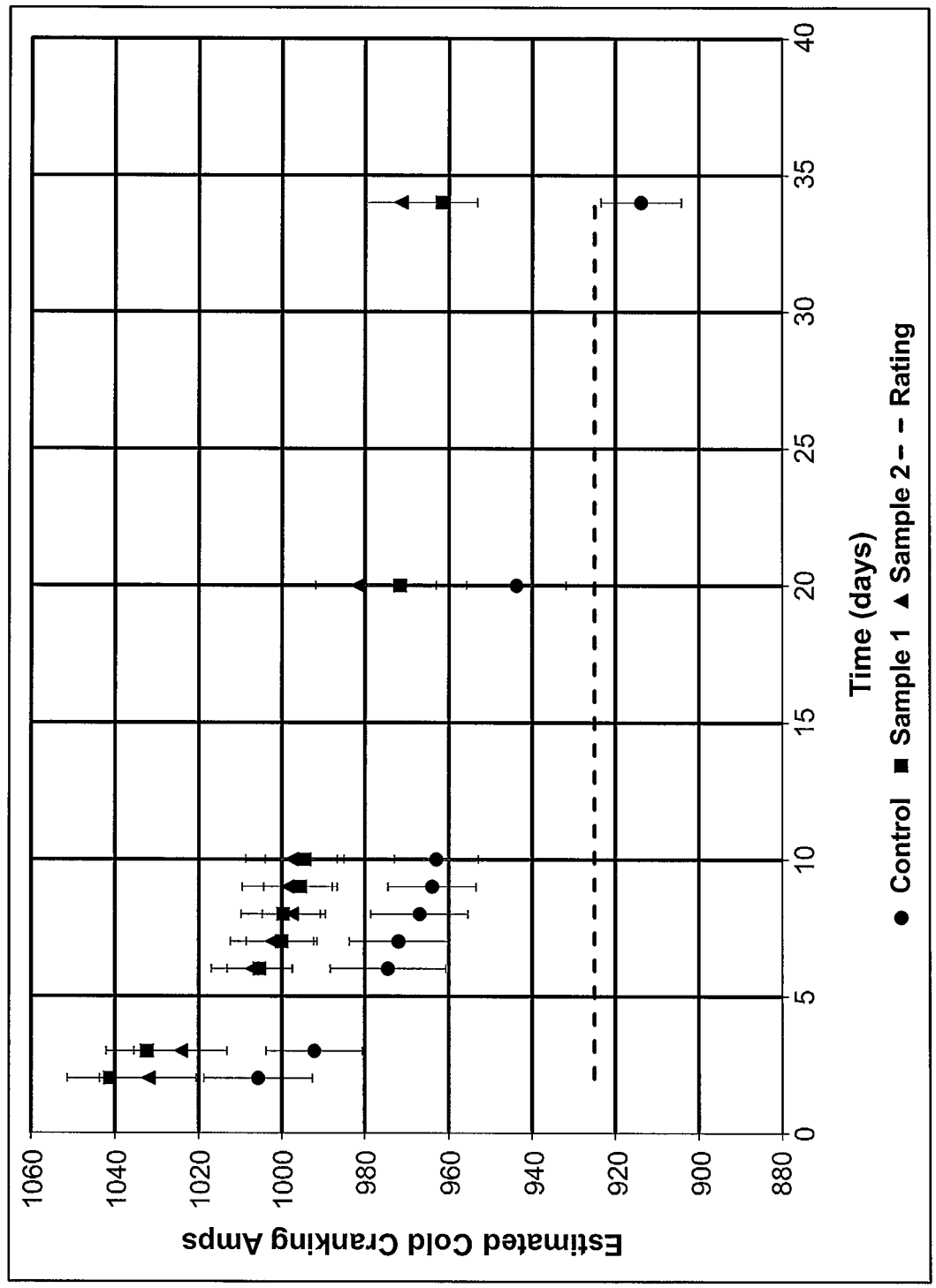
FIG. 35 is a graph depicting the Cold Cranking Amps (CCA) of batteries equipped with an inventive Low ER separator (an inventive Low ER Low Water Loss separator (EFS-V), and a conventional control separator (Control).

As shown in Table 21, the Control Batteries exhibited on average a greater than 9% loss in CCA over the span of the test. Table 22 shows the Sample 1 Batteries exhibited on average a less than 8% loss in CCA over the span of the test. Table 23 shows the Sample 2 Batteries exhibited on average a less than 6% loss in CCA over the span of the test. This data is graphically represented in FIG. 35. The loss in CCA of the batteries over time can be correlated to the static conductance loss of the separators used therein.

The significance of this battery analyzer test is that it is not a Global Standard test, but that these analyzers are typically hand held devices using an algorithm to quickly and easily calculate the performance of the battery. As such, they are typically used in the field, such as for example at a retail store, an oil change shop, or at a mechanic's shop, to quickly assess a battery's performance and to determine if a battery needs to be replaced.

In a Lead Acid battery certain rib profiles (broken, discontinuous, serrated, nubs, protrusions, or combinations may limit rib contact surface area with the Positive Active Material (PAM) on the positive electrode. Thereby maximizing the available acid, conductivity and overall PAM utilization, and thereby provide an improved signal with a higher score on a battery analyzer test and also provide an improved signal to a Battery Management System ("BMS") used to monitor the State of Health ("SOH") in a Micro-Hybrid Start-Stop Car or Uninterruptible Power Supply ("UPS") Data Center back up power system. This improvement is demonstrated over time as the battery rests and can be valued in two ways:

First: This will help batteries meet or exceed the stated battery ratings in which batteries are measured on the shelf for 30 days. Point of sale locations such as auto parts and farm supply stores, garages and battery shops are using battery analyzers to judge good or bad lead acid batteries (new or used). Customers and purchasing agents use battery analyzers to make purchasing decisions after the battery is over 30 days old.

Second: This will help the reliability of both the UPS back up power and Start-Stop system with and improved BMS communications to the battery allowing for improved SOH resulting in improved battery energy throughput, charge acceptance, reserve capacity providing the system with longer engine off periods saving $CO_2$ emissions, or overall more back up power time.

Conclusion

In accordance with at least selected embodiments, aspects or objects, the present disclosure or invention is directed to improved battery separators, high conductance separators, separators with improved conductance, improved lead-acid batteries, such as flooded lead-acid batteries, high conductance batteries, improved systems, and/or improved vehicles including such batteries, and/or methods of manufacture or use of such separators, systems, or batteries, and/or combinations thereof. In accordance with at least certain embodiments, the present disclosure or invention is directed to improved lead acid batteries incorporating the improved separators and which exhibit increased or acceptable conductance especially when subjected to modern battery performance or battery health testing, and preferably even after a certain period of battery storage or usage (such as cycles, months or years).

In accordance with at least selected embodiments, aspects or objects, disclosed herein or provided are novel or improved separators, battery separators, enhanced flooded battery separators, batteries, cells, and/or methods of manufacture and/or use of such separators, battery separators, enhanced flooded battery separators, cells, and/or batteries. In accordance with at least certain embodiments, the present disclosure or invention is directed to novel or improved battery separators for enhanced flooded batteries. In addition, disclosed herein are methods, systems and battery separators for enhancing battery life, reducing internal electrical resistance, increasing cold cranking amps, and/or improving uniformity in at least enhanced flooded batteries. In accordance with at least particular embodiments, the present disclosure or invention is directed to an improved separator for enhanced flooded batteries wherein the separator has performance enhancing additives or coatings, improved fillers, decreased tortuosity, increased wettability, reduced oil content, reduced thickness, decreased electrical resistance, and/or increased porosity, and where the use of such a separator in a battery reduces the water loss of the battery, lowers acid stratification of the battery, lowers the voltage drop of the battery, and/or increases the CCA of the battery. In accordance with at least certain embodiments, separators are provided that include or exhibit performance enhancing additives or coatings, increased porosity, increased void volume, amorphous silica, higher oil absorption silica, fillers or silica with increased friability, increased ionic diffusion, higher silanol group silica, silica with an OH to Si ratio of 21:100 to 35:100, silica with an OH to Si ratio of at least 27:100, reduced electrical resistance, a shish-kebab structure or morphology, a polyolefin microporous membrane containing particle-like filler in an amount of 40% or more by weight of the membrane and ultrahigh molecular weight polyethylene having shish-kebab formations with extended chain crystal (shish formation) and folded chain crystal (kebab formation) and the average repetition periodicity of the kebab formation from 1 nm to 150 nm, an average repetition periodicity of the kebab formation of 150 nm or less, an average repetition periodicity of the kebab formation of 120 nm or less, an average repetition periodicity of the kebab formation of 100 nm or less, having shish-kebab formations with extended chain crystal (shish formation) and folded chain crystal (kebab formation) on at least the ribbed side and an average repetition periodicity of the kebab formation from 1 nm to 150 nm, decreased sheet thickness, decreased tortuosity, and/or the like, separators especially well-suited for enhanced flooded batteries, and/or the like.

In an exemplary embodiment of the present invention, a separator for a lead acid battery is provided with a microporous membrane having a polyolefin polymer, a particle-like filler, and a processing plasticizer; wherein the particle-like filler is present in an amount of 40% or more by weight; and wherein the polyethylene comprises polymer in a shish-kebab formation having a plurality of extended chain crystals (the shish formations) and a plurality of folded chain crystals (the kebab formations) and wherein the average repetition or periodicity of the kebab formations is from 1 nm to 150 nm, preferably less than 120 nm. Further, the separator has a shelf life estimated static conductance loss as compared to an initial value of less than approximately 9%, less than approximately 8%, less than approximately 7%, less than approximately 6%, and less than approximately 5%. One aspect of the present invention provides that the shelf life estimated static conductance is measured at greater than 30 days of resting at standard conditions.

In certain embodiments, the average repetition or periodicity of the kebab formations is defined by: taking an image of the surface of the polyolefin microporous membrane with a SEM, indicating at least three rectangular regions where the shish-kebab formation is continuously extended in the length of at least 0.5 μm or longer in the same SEM image, and specifying the repetition or periodicity by Fourier Transform of contrast profile projected in the vertical direction to the length direction of the each indicated rectangular region to calculate the average of the repetition periods.

In select embodiments, the filler is selected from the group consisting of silica, precipitated silica, fumed silica, and precipitated amorphous silica; and wherein the molecular ratio of OH to Si groups within the filler, measured by $^{29}$Si-NMR, is within a range of from 21:100 to 35:100, preferably 27:100 or more. In certain aspects of the present invention, silica is present at the kebab formations of polymer.

In certain selected aspects of the present invention, the microporous membrane may be characterized by one of the following: a) an average pore size of no greater than 1 μm; b) an electrical resistance less than 75 mΩ·cm$^2$, or less than 70 mΩ·cm$^2$, or less than 65 mΩ·cm$^2$, or less than 60 mΩ·cm$^2$, or less than 55 mΩ·cm$^2$, or less than 50 mΩ·cm$^2$, or less than 45 mΩ·cm$^2$, or less than 40 mΩ·cm$^2$, or less than 35 mΩ·cm$^2$, or even less; cyan electrical resistance more than 20% less than an electrical resistance of a known separator for a flooded lead acid battery; d) a porosity greater than 50%; e) a final oil content of between about 10-20% by weight, in some embodiments, about 14-20% by weight; and f) ribbing, serrated ribbing, embossed ribbing, and/or negative cross ribs; and combinations thereof.

In other aspects of the present invention, the microporous membrane may be provided with a filler having high structural morphology. The filler may be characterized by a) an average particle size of 5 μm or less; b) a surface area of at least 100 m$^2$/g; c) an oil absorption rate of at least 150 ml/100 mg, or combinations thereof.

The polyolefin polymer microporous membrane may be a polyolefin, polyethylene (such as, for example, ultra-high molecular weight polyethylene), polypropylene, rubber, polyvinyl chloride, phenolic resins, cellulosic, synthetic wood pulp, glass fibers, synthetic fibers, natural rubbers, synthetic rubbers, latex, bisphenol formaldehyde, and combinations thereof.

The microporous membrane may be provided with a filler to polymer weight ratio of 1.5:1 to 6:1. The filler may be precipitated silica. Furthermore, the particle-like silica may be friable to such a degree that after 30 seconds of ultra-sonication, the median silica particle size is approximately 5.2 μm or less. In addition, the particle-like filler may be friable to such a degree that after 60 seconds of ultra-sonication, the median silica particle size is approximately 0.5 μm or less.

In some exemplary embodiments, exemplary embodiments of separators of the present invention may have one or more of the following: a mean pore size of at least approximately 120 nm; a diffusion coefficient of at least approximately 1.6·10-10 at −5° C., and an electrical resistance of approximately 40 mΩ·cm2 or lower; a diffusion coefficient of at least approximately 8.8·10-10 at 30° C., and an electrical resistance of approximately 40 mΩ·cm2 or lower.

In certain embodiments of the present invention, a separator may be provided with one or more of the following: a polyolefin microporous membrane, wherein the polyolefin microporous membrane comprises polyethylene, a particle-like filler, and a processing plasticizer, wherein the particle-like filler is friable to such a degree that after 30 seconds of ultra-sonication, the median silica particle size is approximately 5.2 μm or less; a polyolefin microporous membrane, wherein the polyolefin microporous membrane comprises polyethylene, a particle-like filler, and a processing plasticizer, wherein the particle-like filler is friable to such a degree that after 60 seconds of ultra-sonication, the median silica particle size is approximately 0.5 μm or less; a polyolefin microporous membrane, wherein the polyolefin microporous membrane comprises polyethylene, a particle-like filler, and a processing plasticizer, a diffusion coefficient of at least approximately $1.6 \cdot 10^{-10}$ at −5° C., and an electrical resistance of approximately 40 mΩ·cm$^2$ or lower; a polyolefin microporous membrane, wherein the polyolefin microporous membrane comprises polyethylene, a particle-like filler, and a processing plasticizer, a diffusion coefficient of at least approximately $8.8 \cdot 10^{-10}$ at 30° C., and an electrical resistance of approximately 40 mΩ·cm$^2$ or lower; a polyolefin microporous membrane, wherein the polyolefin microporous membrane comprises polyethylene, a particle-like filler, and a processing plasticizer, a diffusion coefficient of at least approximately $1.6 \cdot 10^{-10}$ at −5° C., and the particle-like filler is friable to such a degree that after 30 seconds of ultra-sonication, the median silica particle size is approximately 5 μm or less; a polyolefin microporous membrane, wherein the polyolefin microporous membrane comprises polyethylene, a particle-like filler, and a processing plasticizer, a diffusion coefficient of at least approximately $8.8 \cdot 10^{-10}$ at 30° C., and the particle-like filler is friable to such a degree that after 60 seconds of ultra-sonication, the median silica particle size is approximately 0.5 μm or less; a polyolefin microporous membrane, wherein the polyolefin microporous membrane comprises polyethylene, a particle-like filler, and a processing plasticizer, a diffusion coefficient of at least approximately $1.6 \cdot 10^{-10}$ at −5° C., and a mean pore size of at least approximately 120 nm; and a polyolefin microporous membrane, wherein the polyolefin microporous membrane comprises polyethylene, a particle-like filler, and a processing plasticizer, a diffusion coefficient of at least approximately $8.8 \cdot 10^{-10}$ at 30° C., a mean pore size of at least approximately 120 nm; and combinations thereof.

The separator above wherein the separator comprises at least one of:
one or more of a surfactant, coating, wetting agent, colorant, antistatic additive, antioxidant, agent for reducing oxidation, and combinations thereof; and at least one surfactant, wherein such surfactant is a non-ionic surfactant, an anionic surfactant, or a combination thereof.

In accordance with at least certain aspects of the present invention, lead acid batteries may be provided utilizing separators as generally described herein.

In particular embodiments disclosed herein, a lead acid battery may be provided with a polyolefin microporous membrane having polyethylene, preferably, ultrahigh molecular weight polyethylene, a particle-like filler, and a processing plasticizer; wherein the particle-like filler is present in an amount of 40% or more by weight; and wherein the polyethylene comprises polymer in a shish-kebab formation having a plurality of extended chain crystals (the shish formations) and a plurality of folded chain crystals (the kebab formations) and wherein the average repetition or periodicity of the kebab formations is from 1 nm to 150 nm, preferably less than 120 nm. The battery may further be provided with a shelf life estimated cold cranking amps loss as compared to an initial value of less than approximately 9%, less than approximately 8%, less than approximately 7%, less than approximately 6%, and less than approximately 5%. One aspect of the present invention provides that the shelf life estimated static cold cranking amps is measured at greater than approximately 30 days of resting at standard conditions.

In select embodiments of the present invention, the lead acid battery may be any one of the following: a flat-plate battery, a flooded lead acid battery, an enhanced flooded lead acid battery, a deep-cycle battery, an absorptive glass mat battery, a tubular battery, an inverter battery, a vehicle battery, a SLI battery, an ISS battery, an automobile battery, a truck battery, a motorcycle battery, an all-terrain vehicle battery, a forklift battery, a golf cart battery, a hybrid-electric vehicle battery, an electric vehicle battery, an e-rickshaw battery, an e-trike battery, and an e-bike battery.

In accordance with at least certain aspects of the present invention, vehicles may be provided utilizing batteries and separators as generally described herein.

In particular embodiments disclosed herein, a vehicle may be provided with a lead acid battery having a polyolefin microporous membrane having polyethylene, preferably, ultrahigh molecular weight polyethylene, a particle-like filler, and a processing plasticizer; wherein the particle-like filler is present in an amount of 40% or more by weight; and wherein the polyethylene comprises polymer in a shish-kebab formation having a plurality of extended chain crystals (the shish formations) and a plurality of folded chain crystals (the kebab formations) and wherein the average repetition or periodicity of the kebab formations is from 1 nm to 150 nm, preferably less than 120 nm. The battery may further be provided with a shelf life estimated cold cranking amps loss as compared to an initial value of less than approximately 9%, less than approximately 8%, less than approximately 7%, less than approximately 6%, and less than approximately 5%. One aspect of the present invention provides that the shelf life estimated static cold cranking amps is measured at greater than approximately 30 days of resting at standard conditions.

In select embodiments of the present invention, the vehicle may be one of the following: an automobile, a truck, a motorcycle, an all-terrain vehicle, a forklift, a golf cart, a hybrid-electric vehicle, an electric vehicle, an e-rickshaw, an e-trike, and an e-bike.

In accordance with at least certain aspects of the present invention, a system may be provided utilizing batteries, separators, and battery analyzers as generally described herein.

In particular embodiments disclosed herein, a system may be provided with a lead acid battery having a polyolefin microporous membrane having polyethylene, preferably, ultrahigh molecular weight polyethylene, a particle-like filler, and a processing plasticizer; wherein the particle-like filler is present in an amount of 40% or more by weight; and wherein the polyethylene comprises polymer in a shish-kebab formation having a plurality of extended chain crystals (the shish formations) and a plurality of folded chain crystals (the kebab formations) and wherein the average repetition or periodicity of the kebab formations is from 1 nm to 150 nm, preferably less than 120 nm. The system may further be provided with a battery analyzer capable of measuring battery conductance. The battery may further be provided with a shelf life estimated cold cranking amps loss as measured by said battery analyzer, and as compared to an initial value, of less than approximately 9%, less than approximately 8%, less than approximately 7%, less than approximately 6%, and less than approximately 5%. One aspect of the present invention provides that the shelf life estimated static cold cranking amps is measured at greater than approximately 30 days of resting at standard conditions.

In accordance with at least selected embodiments, aspects, or objects, the present disclosure or invention may provide improved battery separators, high conductance separators, improved lead-acid batteries, such as flooded lead-acid batteries, high conductance batteries, and/or, improved vehicles including such batteries, and/or methods of manufacture or use of such separators or batteries, and/or combinations thereof; improved lead acid batteries incorporating the improved separators and which exhibit increased conductance; lead acid battery separators having structure or features, or topological features designed to provide membranes with improved conductance, low ER, low water loss, and/or the like, and/or particular, non-limiting examples may include lead acid battery separators having structure or features designed to improve battery conductance, lower ER, lower water loss, and/or the like.

In accordance with at least selected embodiments, aspects, or objects, the present disclosure or invention may provide an improved conductance battery separator comprising a microporous polymeric membrane providing high conductance, wherein the membrane comprises one selected from the group consisting of: Low ER, Low Water Loss, a profile providing limited contact with or obstruction of the positive plate or PAM, a profile providing a large acid volume adjacent the positive plate or PAM, and combinations thereof.

In accordance with at least selected embodiments, aspects, or objects, the present disclosure or invention may provide an improved separator, improving the membrane-electrode contact and continuity, improving the membrane-electrode interfacial resistance, improving conductivity, providing lead acid batteries that exhibit reduced conductivity loss over time, providing improved battery components, and combinations thereof.

In accordance with at least selected embodiments, aspects, or objects, the present disclosure or invention may provide an improved high conductance battery.

In accordance with at least selected embodiments, aspects, or objects, the present disclosure or invention may provide improved battery separators, high conductance separators, improved lead-acid batteries, such as flooded lead-acid batteries, high conductance batteries, improved vehicles including such batteries, methods of manufacture or use of such separators or batteries, improved lead acid batteries incorporating the improved separators and which exhibit increased effective static conductance, and combinations thereof as shown or described herein.

In accordance with at least selected embodiments, the present disclosure or invention is directed to improved battery separators, high conductance separators, improved lead-acid batteries, such as flooded lead-acid batteries, high conductance batteries, and/or, improved vehicles including such batteries, and/or methods of manufacture or use of such separators or batteries, and/or combinations thereof. In accordance with at least certain embodiments, the present disclosure or invention is directed to improved lead acid batteries incorporating the improved separators and which exhibit increased conductance. Particular, non-limiting examples may include lead acid battery separators having structure, features, or topological features designed to improve conductance, low ER membranes, low water loss membranes, and the like. In accordance with at least selected embodiments, the present disclosure or invention is directed to improved lead acid batteries that do not suffer substantial conductivity loss over time, improved battery components, including separators that provide lead-acid batteries that do not exhibit conductivity loss or exhibit a reduced conductivity loss over time, improved systems or cells, and/or the like.

The present invention may be embodied in other forms without departing from the spirit and the essential attributes thereof, and, accordingly, reference should be made to the appended claims, rather than to the foregoing specification, as indicating the scope of the invention.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" can be used in place of "comprising" and "including" to provide for more specific embodiments of the invention and are also disclosed. "Exemplary" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

What is claimed is:

1. A lead acid battery comprising:
a polyolefin microporous membrane comprising polyethylene, preferably, ultrahigh molecular weight polyethylene, a particle-like filler, and a processing plasticizer; wherein the particle-like filler is present in an amount of 40% or more by weight; and wherein the polyethylene comprises polymer in a shish-kebab formation comprising a plurality of extended chain crystals (the shish formations) and a plurality of folded chain crystals (the kebab formations) and wherein the average repetition or periodicity of the kebab formations is from 1 nm to 150 nm, preferably less than 120 nm; and
having a shelf life estimated cold cranking amps loss as compared to an initial value of less than approximately 9%.

2. The lead acid battery according to claim 1, wherein said shelf life estimated cold cranking amps loss as compared to an initial value of less than approximately 8%.

3. The lead acid battery according to claim 1, wherein said shelf life estimated cold cranking amps loss as compared to an initial value of less than approximately 7%.

4. The lead acid battery according to claim 1, wherein said shelf life estimated cold cranking amps loss as compared to an initial value of less than approximately 6%.

5. The lead acid battery according to claim 1, wherein said shelf life estimated cold cranking amps loss as compared to an initial value of less than approximately 5%.

6. The lead acid battery according to claim 1, wherein said shelf life estimated cold cranking amps is measured at greater than approximately 30 days of resting at standard conditions.

7. The lead acid battery according to claim 1, wherein said battery is selected from the group consisting of: a flat-plate battery, a flooded lead acid battery, an enhanced flooded lead acid battery, a deep-cycle battery, an absorptive glass mat battery, a tubular battery, an inverter battery, a vehicle battery, a SLI battery, an ISS battery, an automobile battery, a truck battery, a motorcycle battery, an all-terrain vehicle battery, a forklift battery, a golf cart battery, a hybrid-electric vehicle battery, an electric vehicle battery, an e-rickshaw battery, an e-trike battery, and an e-bike battery.

8. A vehicle comprising a lead acid battery comprising:
a polyolefin microporous membrane comprising polyethylene, preferably, ultrahigh molecular weight polyethylene, a particle-like filler, and a processing plasticizer; wherein the particle-like filler is present in an amount of 40% or more by weight; and wherein the polyethylene comprises polymer in a shish-kebab formation comprising a plurality of extended chain crystals (the shish formations) and a plurality of folded chain crystals (the kebab formations) and wherein the average repetition or periodicity of the kebab formations is from 1 nm to 150 nm, preferably less than 120 nm; and
having a shelf life estimated cold cranking amps loss as compared to an initial value of less than approximately 9%.

9. The vehicle according to claim 8, wherein said vehicle comprises one from the group consisting of: an automobile, a truck, a motorcycle, an all-terrain vehicle, a forklift, a golf cart, a hybrid-electric vehicle, an electric vehicle, an e-rickshaw, an e-trike, and an e-bike.

* * * * *